(12) United States Patent
Yoshimoto et al.

(10) Patent No.: US 8,556,406 B2
(45) Date of Patent: Oct. 15, 2013

(54) COLORING MATTER CONSISTING OF TRISAZO COMPOUND, INK COMPOSITIONS, RECORDING METHOD, AND COLORED BODY

(75) Inventors: Takashi Yoshimoto, Tokyo (JP); Noriko Kajiura, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 44 days.

(21) Appl. No.: 13/377,400

(22) PCT Filed: Jun. 7, 2010

(86) PCT No.: PCT/JP2010/059632
§ 371 (c)(1),
(2), (4) Date: Jan. 30, 2012

(87) PCT Pub. No.: WO2010/143610
PCT Pub. Date: Dec. 16, 2010

(65) Prior Publication Data
US 2012/0120148 A1    May 17, 2012

(30) Foreign Application Priority Data

Jun. 12, 2009 (JP) ................. 2009-141198

(51) Int. Cl.
*G01D 11/00* (2006.01)
*C09D 11/00* (2006.01)

(52) U.S. Cl.
USPC ..................... 347/100; 106/31.5

(58) Field of Classification Search
None
See application file for complete search history.

(56) References Cited

U.S. PATENT DOCUMENTS 4,565,424 A    1/1986 Huffman et al.

FOREIGN PATENT DOCUMENTS

| DE | 2004488 | 8/1971 |
|---|---|---|
| DE | 2023295 | 11/1971 |
| DE | 223149 A1 | 3/1984 |
| JP | S58-120671 | 7/1983 |
| JP | H05-134435 | 5/1993 |
| JP | 3383469 B | 12/1995 |
| JP | 2003-183545 | 3/2003 |
| JP | 2003-201412 | 7/2003 |
| JP | 2007-517082 | 6/2007 |
| WO | WO 2004/050768 A3 | 6/2004 |
| WO | WO 2005/052065 A1 | 6/2005 |
| WO | WO 2005/054374 A1 | 6/2005 |
| WO | WO 2007/077931 A1 | 7/2007 |
| WO | WO 2008/096697 A1 | 8/2008 |
| WO | WO 2009/069279 A1 | 4/2009 |
| WO | WO 2009/136575 A1 | 11/2009 |
| WO | WO 2009/136577 A1 | 11/2009 |

*Primary Examiner* — Matthew Luu
*Assistant Examiner* — Michael Konczal
(74) *Attorney, Agent, or Firm* — Knobbe Martens Olson & Bear LLP

(57) ABSTRACT

A coloring matter for black ink which is highly soluble in water-based media, and ink compositions containing the same. The ink compositions can produce black recorded images which exhibit excellent fastness and ozone gas fastness. The coloring matter consists of at least one trisazo compound represented by general formula (1), tautomers thereof, and salts of both. In general formula (1), $R^1$ is unsubstituted $C_{1-4}$ alkyl or the like; $R^2$ is cyano or the like; $R^3$ is a chlorine atom or the like; $R^5$ to $R^7$ are a hydrogen atom, unsubstituted $C_{1-4}$ alkyl, sulfo-substituted $C_{1-4}$ alkoxy, or the like; $R^8$ to $R^{10}$ are a hydrogen atom, unsubstituted $C_{1-4}$ alkyl, sulfo-substituted $C_{1-4}$ alkylthio, or the like; A is sulfo-substituted 2-naphthothiazolyl or the like; and a to d represent the positions at which the ring is substituted with $R^3$ and sulfo.

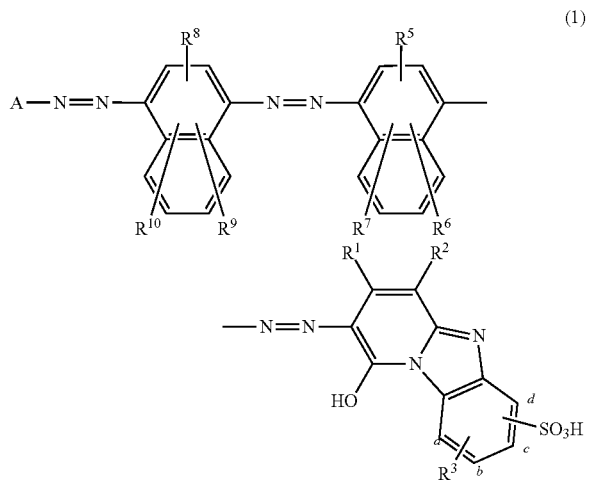

20 Claims, No Drawings

COLORING MATTER CONSISTING OF TRISAZO COMPOUND, INK COMPOSITIONS, RECORDING METHOD, AND COLORED BODY

This application is the U.S. National Phase under 35 U.S.C. §371 of International Application PCT/JP2010/059632, filed Jun. 7, 2010, designating the U.S., and published in Japanese as WO 2010/143610 on Dec. 16, 2010, which claims priority to Japanese Patent Application No. 2009-141198, filed Jun. 12, 2009, the entire contents of which are incorporated herein by reference.

TECHNICAL FIELD

The present invention relates to a coloring matter consisting of a novel trisazo compound or a salt thereof, an ink composition containing the coloring matter, and a colored body which was colored with the coloring matter or the ink composition.

BACKGROUND ART

In a recording method by an ink jet printer, which is one typical method among a variety of color recording methods, recording is executed by generating ink droplets, and attaching the same to any of a variety of record-receiving materials (e.g., paper, film, and fabric, etc.). According to this method, a recording head is not brought into direct contact with the record-receiving material; therefore, generation of noise can be reduced thus achieving silent recording. In addition, due to having the features of a reduced size and an increased speed that can be readily achieved, prevalence in recent years has rapidly progressed, and great advancement hereafter is expected.

Aqueous inks containing a water soluble coloring matter dissolved in an aqueous medium have been used as conventional inks for fountain pens, felt pens etc., and inks for ink jet recording. To these aqueous inks is generally added a water soluble organic solvent in order to prevent pen tips or ink discharge nozzles from clogging with the ink. For these inks, demanded are abilities to generate a recorded image with satisfactory density, probability of avoiding occurrence of clogging at pen tips and nozzles, favorable drying characteristics on the record-receiving materials, suppression of bleeding, superior storage stability, and the like. Additionally, particularly high water solubility, and high solubility in a water soluble organic solvent added to an ink are required for the water soluble coloring matter to be used. Moreover, fastness such as water resistance, light resistance, gas resistance and moisture resistance has been required of the recorded image.

Of these, gas resistance means resistance to a phenomenon of causing discoloration of a printed image via an action of ozone gas or the like present in the air and having an oxidizing action on a coloring matter in the record-receiving material. In addition to the ozone gas, NOx, SOx, and the like are exemplified as the oxidizing gas having this type of action; however, among these oxidizing gases, ozone gas is considered to be the main causative substance that promotes the discoloration phenomenon of ink jet recorded images. Therefore, particularly ozone gas resistance among resistance to gasses tends to attract the most importance. A material entity such as a porous white inorganic substance is often used in ink-receiving layers provided on the surface of photo image-quality exclusive ink jet paper in order to accelerate drying of the ink, and also to suppress bleeding of high quality images. Discoloration due to ozone gas is markedly found on such recording papers. Since this discoloration phenomenon resulting from oxidizing gas is characteristic in ink jet images, improvement of the ozone gas resistance is one of the most significant problems involved in ink jet recording methods.

Hence, in order to expand a field of application of printing methods in which an ink is used, further improvement of light resistance, ozone gas resistance, moisture resistance and water resistance is strongly demanded on ink compositions for use in ink jet recording and colored bodies obtained by coloring with the same.

Inks having a variety of hues are prepared from a variety of coloring matters, and black inks among them are important inks used in both mono color and full color images. Although many coloring matters have been proposed for use in black inks to date, products that meet market requirements have not yet been provided. Many of coloring matters proposed are azo coloring matters, and disazo coloring matters such as C. I. Food Black 2, etc., among these have problems of inferior color rendering properties, unfavorable water resistance and moisture resistance, as well as insufficient light resistance and gas resistance, and the like. With respect to polyazo coloring matters having an extended conjugated system, there are problems of generally low water solubility, a bronzing phenomenon likely to occur that provides a recorded image having metallic luster in part, as well as insufficient light resistance and gas resistance, and the like. In addition, in the case of azo-containing metal coloring matters proposed similarly in large numbers, some have favorable light resistance, but there exist problems of safety for living organisms, unfavorable environmental influences due to metal ions included, extremely inferior ozone gas resistance, and the like.

As the black coloring matter for ink jet having improved ozone gas resistance which has been the most significant problem in recent years, for example, compounds disclosed in Patent Documents 1 to 3 are exemplified. These compounds do not have ozone gas resistance that sufficiently meets market requirements, and the light resistance is also unsatisfactory. Furthermore, in regard to azo compounds having a benzimidazolopyrrolidone skeleton that is one characteristic feature of trisazo compounds, descriptions are found in Patent Documents 4 to 7 and the like. Patent Documents 5 and 6 also disclose trisazo compounds, and these trisazo compounds have a symmetric structure provided by allowing both ends of a linking group including an azo structure to be further bound to two benzimidazolopyrrolidone skeletons via an azo structure; however, compounds similar to the asymmetric trisazo compound of the present invention are not disclosed. Additionally, Patent Documents 5 and 6 only disclose a small number of water soluble compounds and do not disclose any examples of use of black coloring matter as an ink jet ink. As an example of trisazo compounds for use in an ink jet ink having superior ozone gas resistance, a compound disclosed in Patent Document 8 is exemplified, which discloses that the compound can be used as a black coloring matter for use in a water soluble ink jet ink. Although these compounds have superior fastness, it tends to result in high chroma saturation for use in a black ink. Examples of black trisazo compounds for use in an ink jet ink having superior ozone gas resistance also include a compound disclosed in Patent Document 9; however, such compound has not sufficiently satisfied market requirements.

Patent Document 1: Japanese Unexamined Patent Application, Publication No. 2003-183545

Patent Document 2: Japanese Unexamined Patent Application, Publication No. 2003-201412

Patent Document 3: Japanese Unexamined Patent Application (translation of PCT Application), Publication No. 2007-517082

Patent Document 4: International Publication No. 2004/050768

Patent Document 5: German Patent Invention No. 2004488

Patent Document 6: German Patent Invention No. 2023295

Patent Document 7: Japanese Unexamined Patent Application, Publication No. H05-134435

Patent Document 8: International Publication No. 2007/077931

Patent Document 9: International Publication No. 2005/054374

Patent Document 10: German Patent Invention No. 223149

Patent Document 11: Japanese Patent No. 3383469

DISCLOSURE OF THE INVENTION

Problems to be Solved by the Invention

An object of the present invention is to provide a coloring matter consisting of a trisazo compound or a salt thereof which can be used for black inks that are particularly suitable for ink jet recording, and an ink composition containing the coloring matter and being capable of providing recorded images that are superior in ozone gas resistance, light resistance, print density and hue. Further provided by the present invention is a colored body which was colored with the coloring matter or the ink composition.

Means for Solving the Problems

In order to solve the foregoing problems, the present inventors thoroughly investigated, and consequently found that a certain trisazo compound represented by the following formula (1) solves the problems described above. Thus, the present invention was completed.

Accordingly, a first aspect of the present invention provides a coloring matter consisting of at least one trisazo compound represented by the following formula (1) or a tautomer of the same, or a salt thereof, present; or a naphthalene ring provided that the ring represented by the dotted line is present, $R^5$ to $R^7$ each independently represent a hydrogen atom; a chlorine atom; a hydroxy group; a sulfo group; a carboxy group; a sulfamoyl group; a carbamoyl group; an unsubstituted C1-C4 alkyl group; an unsubstituted C1-C4 alkoxy group; a C1-C4 alkoxy group substituted with a hydroxy group, an unsubstituted C1-C4 alkoxy group, a hydroxy C1-C4 alkoxy group, a sulfo group or a carboxy group; an unsubstituted mono- or di-C1-C4 alkylamino group; a mono- or di-C1-C4 alkylamino group substituted with a hydroxy group, a sulfo group or a carboxy group; an unsubstituted C1-C4 alkylcarbonylamino group; a C1-C4 alkylcarbonylamino group substituted with a hydroxy group or a carboxy group; an unsubstituted N'-C1-C4 alkylureide group; an N'-C1-C4 alkylureide group substituted with a hydroxy group, a sulfo group or a carboxy group; an unsubstituted phenylamino group; a phenylamino group having a benzene ring substituted with a chlorine atom, an unsubstituted C1-C4 alkyl group, a nitro group, a sulfo group or a carboxy group; an unsubstituted benzoylamino group; a benzoylamino group having a benzene ring substituted with a chlorine atom, an unsubstituted C1-C4 alkyl group, a nitro group, a sulfo group or a carboxy group; an unsubstituted phenylsulfonylamino group; or a phenylsulfonylamino group having a benzene ring substituted with a chlorine atom, an unsubstituted C1-C4 alkyl group, a nitro group, a sulfo group or a carboxy group, the ring having substitution with $R^8$ to $R^{10}$ is a benzene ring provided that the ring represented by the dotted line is not present; or a naphthalene ring provided that the ring represented by the dotted line is present, $R^8$ to $R^{10}$ each independently represent a hydrogen atom; a chlorine atom; a hydroxy group; a sulfo group; a carboxy group; a sulfamoyl group; a carbamoyl group; an unsubstituted C1-C4 alkyl group; an unsubstituted C1-C4 alkoxy group; a C1-C4 alkoxy group substituted with a hydroxy group, an unsubstituted C1-C4 alkoxy group, a hydroxy C1-C4 alkoxy group, a sulfo group or a carboxy group; a C1-C4 alkylthio group substituted with a hydroxy group, a sulfo group or a carboxy group; an unsubstituted mono- or (1)

$$A-N=N-\underset{R^{10}}{\overset{R^8}{\bigcirc}}-N=N-\underset{R^7}{\overset{R^5}{\bigcirc}}-N=N-\underset{HO}{\overset{R^1}{\bigcirc}}\overset{R^2}{\underset{N}{\bigcirc}}\overset{d}{\underset{R^3\ b}{\bigcirc}}-SO_3H$$

in the formula (1), $R^1$ represents a carboxy group; an unsubstituted C1-C4 alkyl group; a C1-C4 alkyl group substituted with a carboxy group; an unsubstituted phenyl group; or a phenyl group substituted with a sulfo group, $R^2$ represents a cyano group; a carbamoyl group; or a carboxy group, $R^3$ represents a chlorine atom; an unsubstituted C1-C6 alkyl group; an unsubstituted C1-C6 alkoxy group; or an unsubstituted C1-C4 alkylcarbonylamino group, the ring having substitution with $R^5$ to $R^7$ is a benzene ring provided that the ring represented by the dotted line is not di-C1-C4 alkylamino group; a mono- or di-C1-C4 alkylamino group substituted with a hydroxy group, a sulfo group or a carboxy group; an unsubstituted C1-C4 alkylcarbonylamino group; a C1-C4 alkylcarbonylamino group substituted with a hydroxy group or a carboxy group; an unsubstituted N'-C1-C4 alkylureide group; an N'-C1-C4 alkylureide group substituted with a hydroxy group, a sulfo group or a carboxy group; an unsubstituted phenylamino group; a phenylamino group having a benzene ring substituted with a chlorine atom, an unsubstituted C1-C4 alkyl group, a nitro group, a sulfo group or a carboxy group; an unsubstituted benzoylamino group; a benzoylamino group having a benzene ring substituted with a chlorine atom, an unsubstituted C1-C4 alkyl group, a nitro group, a sulfo group or a carboxy group; an unsubstituted phenylsulfonylamino group; or a phenylsulfonylamino group having a benzene ring substituted with a chlorine atom, an unsubstituted C1-C4 alkyl group, a nitro group, a sulfo group or a carboxy group, the group A is an unsubstituted 2-naphthothiazolyl group; or a 2-naphthothiazolyl group having a substituent selected from the group consisting of a chlorine atom; a sulfo group; a nitro group; a hydroxy group; a sulfamoyl group; an unsubstituted C1-C4 alkyl group; an unsubstituted C1-C4 alkoxy group; a C1-C4 alkoxy group substituted with a hydroxy group, an unsubstituted C1-C4 alkoxy group, a sulfo group or a carboxy group; an unsubstituted C1-C4 alkylsulfonyl group; a C1-C4 alkylsulfonyl group substituted with a hydroxy group, a sulfo group or a carboxy group; an unsubstituted phenylsulfonyl group; and a phenylsulfonyl group having a benzene ring substituted with a chlorine atom, an unsubstituted C1-C4 alkyl group, a nitro group, a sulfo group or a carboxy group, a to d each represent the substitution position of $R^3$ and the sulfo group the substitution position of which is not specified.

A second aspect of the present invention provides the coloring matter according to the first aspect, wherein the trisazo compound represented by the above formula (1) is a trisazo compound represented by the following formula (2):

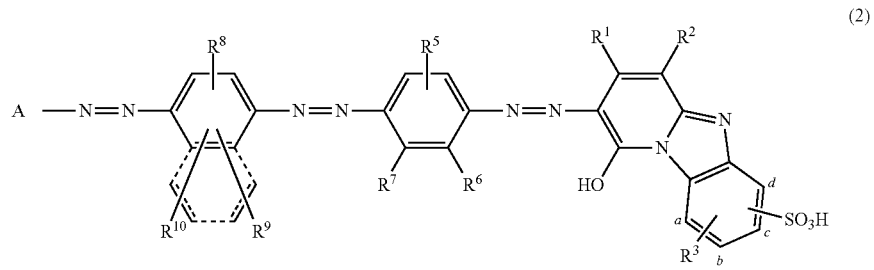

(2)

in the formula (2), the group A, $R^1$ to $R^3$, $R^5$ to $R^{10}$, and the ring having substitution with $R^8$ to $R^{10}$ have the same meanings as those in the formula (1) including the ring represented by the dotted line.

A third aspect of the present invention provides the coloring matter according to the first aspect, wherein the trisazo compound represented by the above formula (1) is a trisazo compound represented by the following formula (3):

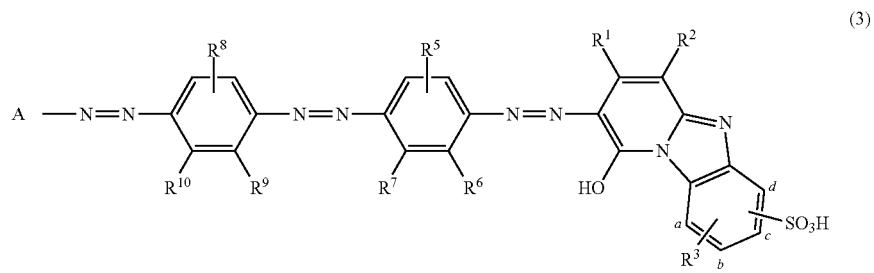

(3)

in the formula (3), the group A, $R^1$ to $R^3$, and $R^5$ to $R^{10}$ have the same meanings as those in the formula (1).

A fourth aspect of the present invention provides the coloring matter according to the first aspect, wherein the trisazo compound represented by the above formula (1) is a trisazo compound represented by the following formula (4):

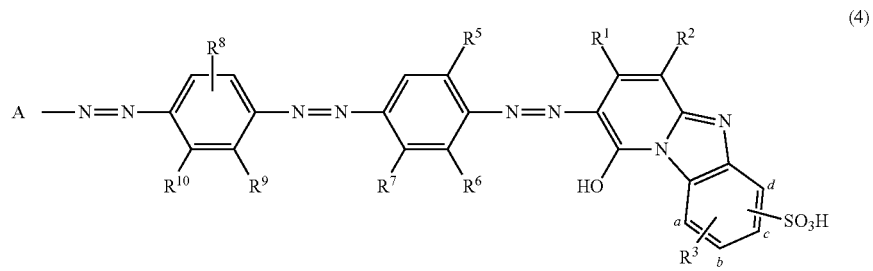

(4)

in the formula (4), the group A, $R^1$ to $R^3$, and $R^5$ to $R^{10}$ have the same meanings as those in the formula (1).

A fifth aspect of the present invention provides the coloring matter according to the first aspect, wherein the trisazo compound represented by the above formula (1) is a trisazo compound represented by the following formula (5):

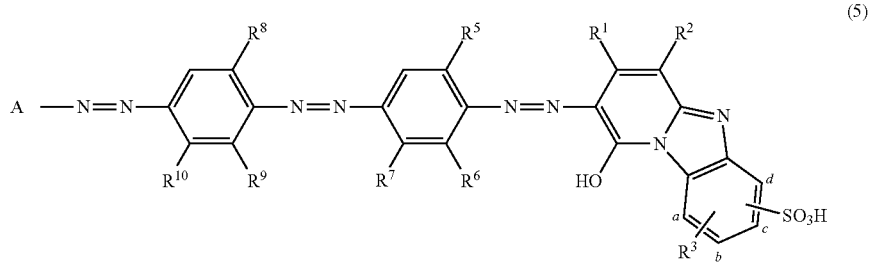

(5)

in the formula (5), the group A, $R^1$ to $R^3$, and $R^5$ to $R^{10}$ have the same meanings as those in the formula (1).

A sixth aspect of the present invention provides the coloring matter according to the first aspect, wherein the group A is represented by the following formula (6):

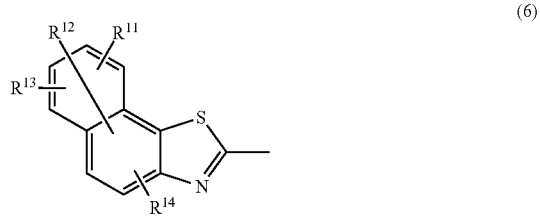

(6)

in the formula (6), $R^{11}$ to $R^{14}$ each independently represent a group selected from the group consisting of a hydrogen atom; chlorine atom; a sulfo group; a nitro group; a hydroxy group; a sulfamoyl group; an unsubstituted C1-C4 alkoxy group; a C1-C4 alkoxy group substituted with a hydroxy group, an unsubstituted C1-C4 alkoxy group, a sulfo group or a carboxy group; an unsubstituted C1-C4 alkylsulfonyl group; and a C1-C4 alkylsulfonyl group substituted with a hydroxy group, a sulfo group or a carboxy group.

A seventh aspect of the present invention provides the coloring matter according to the first aspect, wherein
in the above formula (1),
$R^1$ represents an unsubstituted C1-C4 alkyl group;
$R^2$ represents a cyano group;
$R^3$ represents a chlorine atom, an unsubstituted C1-C6 alkyl group, or an unsubstituted C1-C6 alkoxy group;
the ring having substitution with $R^5$ to $R^7$ is a benzene ring without being coupled to the ring represented by the dotted line,
$R^5$ represents a C1-C4 alkoxy group substituted with a sulfo group;
$R^6$ represents a hydrogen atom;
$R^2$ represents an unsubstituted C1-C4 alkyl group;
the ring having substitution with $R^8$ to $R^{10}$ is a benzene ring without being coupled to the ring represented by the dotted line,
$R^8$ represents a C1-C4 alkylthio group substituted with a sulfo group;
$R^9$ represents a hydrogen atom;
$R^{10}$ represents a chlorine atom, an unsubstituted C1-C4 alkoxy group, or an unsubstituted C1-C4 alkylcarbonylamino group; and
the group A is a 2-naphthothiazolyl group having two or three sulfo groups; or two sulfo groups and one unsubstituted C1-C4 alkoxy group.

An eighth aspect of the present invention provides the coloring matter according to the second aspect, wherein
in the above formula (2),
$R^1$ represents an unsubstituted C1-C4 alkyl group;
$R^2$ represents a cyano group;
$R^3$ represents a chlorine atom, an unsubstituted C1-C6 alkyl group, or an unsubstituted C1-C6 alkoxy group;
$R^5$ represents a C1-C4 alkoxy group substituted with a sulfo group;
$R^6$ represents a hydrogen atom;
$R^7$ represents an unsubstituted C1-C4 alkyl group;
the ring having substitution with $R^8$ to $R^{10}$ is a benzene ring without being coupled to the ring represented by the dotted line,
$R^8$ represents a C1-C4 alkylthio group substituted with a sulfo group;
$R^9$ represents a hydrogen atom;
$R^{10}$ represents a chlorine atom, an unsubstituted C1-C4 alkoxy group, or an unsubstituted C1-C4 alkylcarbonylamino group; and
the group A is a 2-naphthothiazolyl group having two or three sulfo groups; or two sulfo groups and one unsubstituted C1-C4 alkoxy group.

A ninth aspect of the present invention provides the coloring matter according to the third aspect, wherein
$R^1$ represents an unsubstituted C1-C4 alkyl group;
$R^2$ represents a cyano group;
$R^3$ represents a chlorine atom, an unsubstituted C1-C6 alkyl group, or an unsubstituted C1-C6 alkoxy group;
$R^5$ represents a C1-C4 alkoxy group substituted with a sulfo group;
$R^6$ represents a hydrogen atom;
$R^7$ represents an unsubstituted C1-C4 alkyl group;
$R^8$ represents a C1-C4 alkylthio group substituted with a sulfo group;
$R^9$ represents a hydrogen atom;
$R^{10}$ represents a chlorine atom, an unsubstituted C1-C4 alkoxy group, or an unsubstituted C1-C4 alkylcarbonylamino group; and
the group A is a 2-naphthothiazolyl group having two or three sulfo groups; or two sulfo groups and one unsubstituted C1-C4 alkoxy group.

A tenth aspect of the present invention provides the coloring matter according to the first aspect, wherein the group A is represented by the following formula (101):

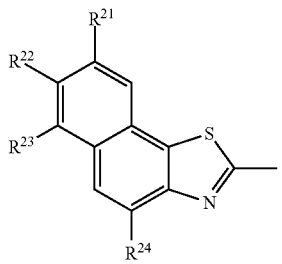

(101)

in the formula (101), $R^{24}$ represents a sulfo group, and any one of $R^{21}$ to $R^{23}$ represents a sulfo group and the remaining two represent a hydrogen atom; or $R^{21}$, $R^{23}$ and $R^{24}$ represent a sulfo group, and $R^{22}$ represents a hydrogen atom; or $R^{21}$ and $R^{24}$ represent a sulfo group, $R^{22}$ represents a hydrogen atom, and $R^{23}$ represents an unsubstituted C1-C4 alkoxy group.

An eleventh aspect of the present invention provides the coloring matter according to the first aspect, wherein
in the above formula (1),
$R^1$ represents an unsubstituted C1-C4 alkyl group;
$R^2$ represents a cyano group or a carbamoyl group,
$R^3$ represents an unsubstituted C1-C6 alkyl group, or an unsubstituted C1-C6 alkoxy group,
the ring having substitution with $R^5$ to $R^7$ is a benzene ring without being coupled to the ring represented by the dotted line,
$R^5$ represents a C1-C4 alkoxy group substituted with a sulfo group;
$R^6$ represents a hydrogen atom;
$R^7$ represents an unsubstituted C1-C4 alkyl group;
the ring having substitution with $R^8$ to $R^{10}$ is a benzene ring without being coupled to the ring represented by the dotted line,
$R^8$ represents a C1-C4 alkylthio group substituted with a sulfo group;
$R^9$ represents a hydrogen atom;
$R^{10}$ represents an unsubstituted C1-C4 alkyl group; and
the group A is a 2-naphthothiazolyl group having two or three sulfo groups; or two sulfo groups and one unsubstituted C1-C4 alkoxy group.

A twelfth aspect of the present invention provides the coloring matter according to the second aspect, wherein
in the above formula (2),
$R^1$ represents an unsubstituted C1-C4 alkyl group;
$R^2$ represents a cyano group or a carbamoyl group,
$R^3$ represents an unsubstituted C1-C6 alkyl group, or an unsubstituted C1-C6 alkoxy group,
the ring having substitution with $R^5$ to $R^7$ is a benzene ring without being coupled to the ring represented by the dotted line,
$R^5$ represents a C1-C4 alkoxy group substituted with a sulfo group;
$R^6$ represents a hydrogen atom;
$R^7$ represents an unsubstituted C1-C4 alkyl group;
the ring having substitution with $R^8$ to $R^{10}$ is a benzene ring without being coupled to the ring represented by the dotted line,
$R^8$ represents a C1-C4 alkylthio group substituted with a sulfo group;
$R^9$ represents a hydrogen atom;
$R^{10}$ represents an unsubstituted C1-C4 alkyl group; and
the group A is a 2-naphthothiazolyl group having two or three sulfo groups; or two sulfo groups and one unsubstituted C1-C4 alkoxy group.

A thirteenth aspect of the present invention provides the coloring matter according the third aspect, wherein
$R^1$ represents an unsubstituted C1-C4 alkyl group;
$R^2$ represents a cyano group or a carbamoyl group,
$R^3$ represents an unsubstituted C1-C6 alkyl group, or an unsubstituted C1-C6 alkoxy group,
$R^5$ represents a C1-C4 alkoxy group substituted with a sulfo group;
$R^6$ represents a hydrogen atom;
$R^7$ represents an unsubstituted C1-C4 alkyl group;
$R^8$ represents a C1-C4 alkylthio group substituted with a sulfo group;
$R^9$ represents a hydrogen atom;
$R^{10}$ represents an unsubstituted C1-C4 alkyl group; and
the group A is a 2-naphthothiazolyl group having two or three sulfo groups; or two sulfo groups and one unsubstituted C1-C4 alkoxy group.

A fourteenth aspect of the present invention provides an ink composition containing the coloring matter according the first aspect.

A fifteenth aspect of the present invention provides an ink jet recording method including recording using as an ink the ink composition according to the fourteenth aspect by discharging ink droplets of the ink in response to recording signals to attach on a record-receiving material.

A sixteenth aspect of the present invention provides the ink jet recording method according to the fifteenth aspect, wherein the record-receiving material is a communication sheet.

A seventeenth aspect of the present invention provides the ink jet recording method according to the sixteenth aspect, wherein the communication sheet is a sheet having an ink-receiving layer containing a porous white inorganic substance.

An eighteenth aspect of the present invention provides an ink jet printer equipped with a vessel containing the ink composition according to the fourteenth aspect.

A nineteenth aspect of the present invention provides a colored body which was colored with the coloring matter according to the first aspect.

A twentieth aspect of the present invention provides a colored body which was colored with the ink composition according to the fourteenth aspect Effects of the Invention The coloring matter of the present invention can be easily synthesized and is inexpensive, and due to having superior water solubility, filterability in the step of producing an ink composition containing the same on membrane filters is favorable. Also, superior discharge stability and storage stability of the ink composition containing the coloring matter or the ink prepared from the ink composition are attained. In other words, the ink composition of the present invention containing the coloring matter exhibits favorable storage stability, without being accompanied by solid deposition, physical property alteration, color change and the like after storage for a long period of time. In addition, the ink composition of the present invention containing the coloring matter is suitably used for ink jet recording, and when used for recording on exclusive ink jet paper, the print density of the recorded image becomes very high with a favorable and achromatic hue having a low chroma saturation, and various types of superior fastness, particularly both favorable light resistance and ozone gas resistance are attained. Accordingly, the coloring matter of the present invention and the ink composition containing the same are extremely useful as a black ink for ink jet recording.

PREFERRED MODE FOR CARRYING OUT THE INVENTION

The present invention is explained in detail below.

The coloring matter of the present invention is a black coloring matter consisting of at least one trisazo compound represented by the above formula (1) or a tautomer of the same, or a salt thereof. In the following description, "(a) trisazo compound or a tautomer of the same, or a salt thereof" is inclusively referred to expediently as merely "(a) trisazo compound", in brief.

The coloring matter of the present invention may consist of a single trisazo compound represented by the above formula (1); however, in light of ease of production, low cost and the like, a mixed coloring matter usually consisting of several types of the trisazo compound represented by the formula (1) is desired, and approximately, preferably one to eight types, more preferably one to seven types, and still more preferably two to six types of the trisazo compound may be included. It is to be noted that also such a mixed coloring matter can satisfactorily achieve the effects achievable by the present invention. If the production can be performed easily, the coloring matter of the present invention may consist of a single trisazo compound, as a matter of course.

Alternatively, the coloring matter of the present invention may be a mixed coloring matter as described above, but other compound not represented by the formula (1) is not substantially contained.

When the coloring matter of the present invention is the mixed coloring matter, $R^1$ to $R^3$, $R^5$ to $R^{10}$, group A, the substitution position represented by a to d for $R^3$ and the sulfo group the substitution position of which is not specified, $R^5$ to $R^7$ or the ring having substitution with $R^8$ to $R^{10}$ in the formula (1) including the ring represented by the dotted line may be each different within the above specified range. In an example, a mixed coloring matter is acceptable consisting of two types of the trisazo compound represented by the formula (1) in which, for example, $R^1$ represents a methyl group and $R^2$ represents a cyano group; and $R^1$ represents a carboxy group and $R^2$ represents a carbamoyl group.

On the other hand, the coloring matter of the present invention can be a mixed coloring matter consisting of a plurality of regioisomers of the trisazo compound in which $R^1$ to $R^3$, $R^5$ to $R^{10}$, the group A, $R^5$ to $R^7$ or the ring having substitution with $R^8$ to $R^{10}$ are each the same, and only the substitution positions of $R^3$ and sulfo group for a to d are different in the above formula (1). Such a mixed coloring matter is more preferred.

The trisazo compound represented by the above formula (1) has tautomers, and examples of the tautomer are considered to include in addition to the compound represented by the formula (1), those represented by the following formulae (7) and (8), and the like. These tautomers are also included in the present invention. It is to be noted that in the following formulae (7) and (8), the group A, $R^1$ to $R^3$, $R^5$ to $R^{10}$, $R^5$ to $R^7$ or the rings having substitution with $R^8$ to $R^{10}$ have the same meanings as in the above formula (1) including the ring represented by the dotted line.

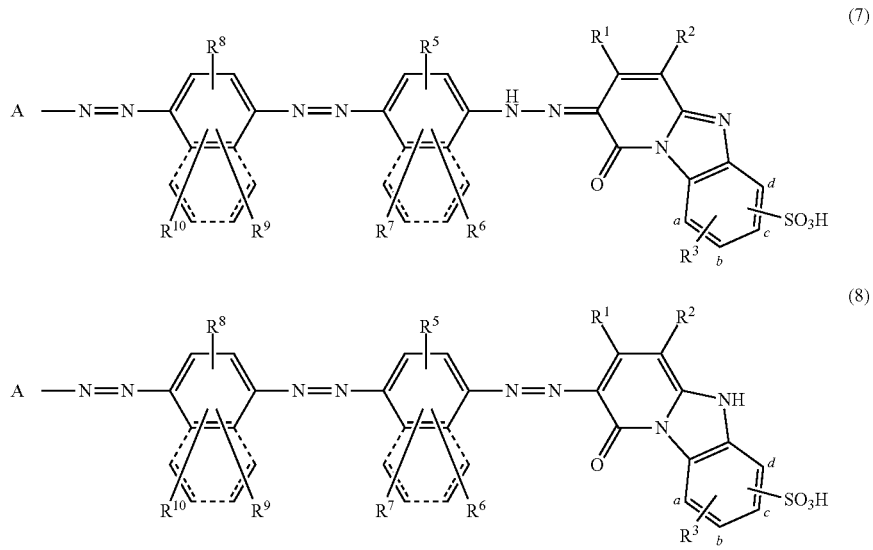

In the above formula (1), the unsubstituted C1-C4 alkyl group represented by $R^1$ may be exemplified by straight or branched alkyl groups, and straight alkyl groups are preferred. Specific examples of the unsubstituted C1-C4 alkyl group include, for example, straight alkyl groups such as methyl, ethyl, n-propyl and n-butyl; branched alkyl groups such as isopropyl, isobutyl, sec-butyl and t-butyl; and the like.

Among those in the foregoing, specific examples of preferable alkyl group are methyl, ethyl, n-propyl and t-butyl, more preferably methyl and n-propyl, and still more preferably methyl.

The C1-C4 alkyl group substituted with a carboxy group represented by $R^1$ may be exemplified by straight or branched substituted alkyl groups. Specific examples include carboxymethyl, 2-carboxyethyl, 3-carboxypropyl, 4-carboxybutyl, and the like.

The phenyl group substituted with a sulfo group represented by $R^1$ may be exemplified by phenyl groups substituted with usually one to four, preferably one to three, more preferably one to two sulfo groups. The position of the substituent is not particularly limited. Specific examples include 2-sulfophenyl, 4-sulfophenyl, 2,4-disulfophenyl, 3,5-disulfophenyl, and the like.

$R^1$ in the above formula (1) represents preferably an unsubstituted C1-C4 alkyl group or an unsubstituted phenyl group, more preferably an unsubstituted C1-C4 alkyl group, and still more preferably a straight unsubstituted C1-C4 alkyl group among those in the foregoing.

In the above formula (1), $R^2$ represents a cyano group; a carbamoyl group; or a carboxy group. $R^2$ represents preferably a cyano group or a carbamoyl group, and more preferably a cyano group.

In the above formula (1), the unsubstituted C1-C6 alkyl group represented by $R^3$ may be exemplified by straight, branched, or cyclic alkyl groups, preferably straight or branched alkyl groups, and more preferably straight alkyl groups. The number of carbon atoms falls within the range of usually 1 to 6, preferably 1 to 4, and more preferably 1 to 3.

Specific examples include straight alkyl groups such as methyl, ethyl, n-propyl, n-butyl, n-pentyl and n-hexyl; branched alkyl groups such as isopropyl, isobutyl, sec-butyl, t-butyl, isopentyl and isohexyl; cyclic alkyl groups such as cyclopropyl, cyclobutyl, cyclopentyl and cyclohexyl; and the like.

The unsubstituted C1-C6 alkoxy group represented by $R^3$ may be exemplified by straight or branched alkoxy groups, and straight alkoxy groups are preferred. The number of carbon atoms falls within the range of usually 1 to 6, preferably 1 to 4, and more preferably 1 to 3.

Specific examples include straight alkoxy groups such as methoxy, ethoxy, n-propoxy, n-butoxy, n-pentyloxy and n-hexyloxy; branched alkoxy groups such as isopropoxy, isobutoxy, sec-butoxy, t-butoxy, isopentyloxy and isohexyloxy; and the like.

The unsubstituted C1-C4 alkylcarbonylamino group represented by $R^3$ may be exemplified by straight or branched alkylcarbonylamino groups, and straight alkylcarbonylamino groups are preferred. The number of carbon atoms falls within the range of usually 1 to 4, preferably 1 to 2, and more preferably 1.

Specific examples include straight alkylcarbonylamino groups such as methylcarbonylamino(acetylamino), ethylcarbonylamino, n-propylcarbonylamino and n-butylcarbonylamino; branched alkylcarbonylamino groups such as isopropylcarbonylamino, isobutylcarbonylamino and t-butylcarbonylamino; and the like.

$R^3$ represents preferably a chlorine atom, an unsubstituted C1-C6 alkyl group, or an unsubstituted C1-C6 alkoxy group, and more preferably a chlorine atom, an unsubstituted C1-C4 alkyl group or an unsubstituted C1-C4 alkoxy group among those in the foregoing.

Specific examples of $R^3$ in the formula (1) include a chlorine atom, methyl, ethyl, n-propyl, n-butyl, isopropyl, t-butyl, methoxy, ethoxy, n-propoxy and n-butoxy. $R^3$ in the formula (1) is more preferably a chlorine atom, methyl, ethyl, methoxy and ethoxy, and still more preferably a chlorine atom, methyl and methoxy.

In the above formula (1), the ring having substitution with $R^5$ to $R^7$ each represents a benzene ring provided that the ring represented by the dotted line is not present; or a naphthalene ring provided that the ring represented by the dotted line is present. It is preferred that the ring represented by the dotted line is not present, i.e., the ring having substitution with $R^5$ to $R^7$ is a benzene ring.

In the above formula (1), the unsubstituted C1-C4 alkyl group represented by $R^5$ to $R^7$ may be the same as one described above in connection with the case of the unsubstituted C1-C4 alkyl group represented by $R^1$, including preferable options etc.

The unsubstituted C1-C4 alkoxy group represented by $R^5$ to $R^7$ may be exemplified by straight or branched alkoxy groups, and straight alkoxy groups are preferred.

Specific examples include straight alkoxy groups such as methoxy, ethoxy, n-propoxy and n-butoxy; branched alkoxy groups such as isopropoxy, isobutoxy, n-butoxy, sec-butoxy and t-butoxy; and the like.

The C1-C4 alkoxy group substituted with a hydroxy group represented by $R^5$ to $R^7$ may be exemplified by straight or branched substituted alkoxy groups, and straight substituted alkoxy groups are preferred.

Specific examples include 2-hydroxyethoxy, 2-hydroxypropoxy, 3-hydroxypropoxy, and the like.

The C1-C4 alkoxy group substituted with an unsubstituted C1-C4 alkoxy group represented by $R^5$ to $R^7$ may be exemplified by straight or branched substituted alkoxy groups, and straight substituted alkoxy groups are preferred.

Specific examples include methoxyethoxy, ethoxyethoxy, n-propoxyethoxy, isopropoxyethoxy, n-butoxyethoxy, methoxypropoxy, ethoxypropoxy, n-propoxy propoxy, isopropoxy butoxy, n-propoxy butoxy, and the like.

The C1-C4 alkoxy group substituted with a hydroxy C1-C4 alkoxy group represented by $R^5$ to $R^7$ may be exemplified by straight or branched substituted alkoxy groups, and straight substituted alkoxy groups are preferred.

Specific examples include 2-hydroxyethoxyethoxy, and the like.

The C1-C4 alkoxy group substituted with a sulfo group represented by $R^5$ to $R^7$ may be exemplified by straight or branched substituted alkoxy groups, and straight substituted alkoxy groups are preferred. The number of carbon atoms falls within the range of usually 1 to 4, preferably 3 or 4, and more preferably 3.

Specific examples include 3-sulfopropoxy, 4-sulfobutoxy, and the like.

The C1-C4 alkoxy group substituted with a carboxy group represented by $R^5$ to $R^7$ may be exemplified by substituted straight or branched alkoxy groups, and straight substituted alkoxy groups are preferred.

Specific examples include carboxymethoxy, 2-carboxyethoxy, 3-carboxypropoxy, and the like.

The unsubstituted mono- or di-C1-C4 alkylamino group represented by $R^5$ to $R^7$ may be exemplified by straight or branched mono- or di-alkylamino groups.

Specific examples include straight mono-C1-C4 alkylamino groups such as methylamino, ethylamino, n-propylamino, isopropylamino and n-butylamino; straight di-C1-C4 alkylamino groups such as dimethylamino, diethylamino, di-n-propylamino and di-n-butylamino; branched mono-C1-C4 alkylamino groups such as sec-butylamino and t-butylamino; branched di-C1-C4 alkylamino groups such as diisopropylamino; and the like.

The mono- or di-C1-C4 alkylamino group substituted with a hydroxy group represented by $R^5$ to $R^7$ may be exemplified by hydroxy-substituted mono-C1-C4 alkylamino groups such as 2-hydroxyethylamino and 2-hydroxypropylamino; di(hydroxy-substituted C1-C4 alkyl)amino groups such as 2,2'-dihydroxydiethylamino; and the like.

The mono- or di-C1-C4 alkylamino group substituted with a sulfo group represented by $R^5$ to $R^7$ may be exemplified by sulfo-substituted mono-C1-C4 alkylamino groups such as 2-sulfoethylamino, 3-sulfopropylamino and 4-sulfobutylamino; di(sulfo-substituted C1-C4 alkyl)amino groups such as 3,3'-disulfodipropylamino; and the like.

The mono- or di-C1-C4 alkylamino group substituted with a carboxy group represented by $R^5$ to $R^7$ may be exemplified by carboxy-substituted mono-C1-C4 alkylamino groups such as carboxymethylamino, 2-carboxyethylamino and 3-carboxypropylamino; di(carboxy-substituted C1-C4 alkyl) amino groups such as 2,2'-dicarboxydiethylamino; and the like.

The unsubstituted C1-C4 alkylcarbonylamino group represented by $R^5$ to $R^7$ may be the same as one described above in connection with the case of the unsubstituted C1-C4alkylcarbonylamino group represented by $R^3$, including preferable options etc.

The C1-C4 alkylcarbonylamino group substituted with a hydroxy group represented by $R^5$ to $R^7$ may be exemplified by straight or branched substituted alkylcarbonylamino groups, and straight substituted alkylcarbonylamino groups are preferred.

Specific examples include hydroxymethylcarbonylamino, 2-hydroxyethylcarbonylamino, 3-hydroxypropylcarbonylamino, and the like.

The C1-C4 alkylcarbonylamino group substituted with a carboxy group represented by $R^5$ to $R^7$ may be exemplified by straight or branched substituted alkylcarbonylamino groups, and straight substituted alkylcarbonylamino groups are preferred.

Specific examples include carboxymethylcarbonylamino, 2-carboxyethylcarbonylamino, and the like.

The unsubstituted N'-C1-C4 alkylureide group represented by $R^5$ to $R^7$ may be exemplified by straight or branched ones, and straight ones are preferred.

Specific examples include methylureide, ethylureide, propylureide, and the like.

The N'-C1-C4 alkylureide group substituted with a hydroxy group represented by $R^5$ to $R^7$ may be exemplified by N'-2-hydroxyethylureide, N'-3-hydroxyethylureide, and the like.

The N'-C1-C4 alkylureide group substituted with a sulfo group represented by $R^5$ to $R^7$ may be exemplified by N'-2-sulfoethylureide, N'-3-sulfopropylureide, and the like.

The N'-C1-C4 alkylureide group substituted with a carboxy group represented by $R^5$ to $R^7$ may be exemplified by N'-carboxymethylureide, N'-2-carboxyethylureide, N'-3-carboxypropylureide, N'-4-carboxybutylureide, and the like.

The phenylamino group having a benzene ring substituted with a chlorine atom represented by $R^5$ to $R^7$ may be exemplified by those substituted with one or two chlorine atoms such as 2-chlorophenylamino, 4-chlorophenylamino and 2,4-dichlorophenylamino.

The phenylamino group having a benzene ring substituted with an unsubstituted C1-C4 alkyl group represented by $R^5$ to $R^7$ may be exemplified by those substituted with a straight unsubstituted C1-C4 alkyl group such as 2-methylphenylamino, 4-methylphenylamino and 4-t-butylphenylamino.

The phenylamino group having a benzene ring substituted with a nitro group represented by $R^5$ to $R^7$ may be exemplified by those substituted with one nitro group such as 2-nitrophenylamino and 4-nitrophenylamino.

The phenylamino group having a benzene ring substituted with a sulfo group represented by $R^5$ to $R^7$ may be exemplified by those substituted with one or two sulfo groups such as 3-sulfophenylamino, 4-sulfophenylamino, 2,4-disulfophenylamino and 3,5-disulfophenylamino.

The phenylamino group having a benzene ring substituted with a carboxy group represented by $R^5$ to $R^7$ may be exemplified by those substituted with one or two carboxy groups such as 2-carboxyphenylamino, 4-carboxyphenylamino, 2,5-dicarboxyphenylamino and 3,5-dicarboxyphenylamino.

The benzoylamino group having a benzene ring substituted with a chlorine atom represented by $R^5$ to $R^7$ may be exemplified by those substituted with one or two chlorine atoms such as 2-chlorobenzoylamino, 4-chlorobenzoylamino, 2,4-dichlorophenylamino.

The benzoylamino group having a benzene ring substituted with an unsubstituted C1-C4 alkyl group represented by $R^5$ to $R^7$ may be exemplified by those substituted with a straight unsubstituted C1-C4 alkyl group such as 2-methylbenzoylamino, 3-methylbenzoylamino and 4-methylbenzoylamino.

The benzoylamino group having a benzene ring substituted with a nitro group represented by $R^5$ to $R^7$ may be exemplified by those substituted with one or two nitro group such as 2-nitrobenzoylamino, 4-nitrobenzoylamino and 3,5-dinitrobenzoylamino.

The benzoylamino group having a benzene ring substituted with a sulfo group represented by $R^5$ to $R^7$ may be exemplified by those substituted with one sulfo group such as 2-sulfobenzoylamino and 4-sulfobenzoylamino.

The benzoylamino group having a benzene ring substituted with a carboxy group represented by $R^5$ to $R^7$ may be exemplified by those substituted with one or two carboxy groups such as 2-carboxybenzoylamino, 4-carboxybenzoylamino and 3,5-dicarboxybenzoylamino.

The phenylsulfonylamino group having a benzene ring substituted with a chlorine atom represented by $R^5$ to $R^7$ may be exemplified by those substituted with one or two chlorine atoms such as 2-chlorophenylsulfonylamino and 4-chlorophenylsulfonylamino.

The phenylsulfonylamino group having a benzene ring substituted with an unsubstituted C1-C4 alkyl group represented by $R^5$ to $R^7$ may be exemplified by those substituted with a straight or branched, preferably straight, unsubstituted C1-C4 alkyl group such as 2-methylphenylsulfonylamino, 4-methylphenylsulfonylamino and 4-t-butylphenylsulfonylamino.

The phenylsulfonylamino group having a benzene ring substituted with a nitro group represented by $R^5$ to $R^7$ may be exemplified by those substituted with one nitro group such as 2-nitrophenylsulfonylamino, 3-nitrophenylsulfonylamino and 4-nitrophenylsulfonylamino.

The phenylsulfonylamino group having a benzene ring substituted with a sulfo group represented by $R^5$ to $R^7$ may be exemplified by those substituted with one sulfo group such as 3-sulfophenylsulfonylamino and 4-sulfophenylsulfonylamino.

The phenylsulfonylamino group having a benzene ring substituted with a carboxy group represented by $R^5$ to $R^7$ may be exemplified by those substituted with one carboxy group such as 3-carboxyphenylsulfonylamino and 4-carboxyphenylsulfonylamino.

Among those in the foregoing, it is preferred that $R^5$ to $R^7$ each independently represent a hydrogen atom, a C1-C4 alkoxy group substituted with a sulfo group or an unsubstituted C1-C4 alkyl group, and at least two of $R^5$ to $R^7$ represents a group other than a hydrogen atom, and it is more preferred that $R^6$ represents a hydrogen atom, $R^5$ and $R^7$ represent a group other than a hydrogen atom. Still more preferably, $R^5$ represents a C1-C4 alkoxy group substituted with a sulfo group, $R^6$ represents a hydrogen atom, and $R^7$ represents an unsubstituted C1-C4 alkyl group.

In the above formula (1), the ring having substitution with $R^8$ to $R^{10}$ represents: a benzene ring provided that the ring represented by the dotted line is not present; or a naphthalene ring provided that the ring represented by the dotted line is present. It is preferred that the ring represented by the dotted line is not present, in other words, the ring having substitution with $R^8$ to $R^{10}$ is a benzene ring.

In the above formula (1), the unsubstituted C1-C4 alkyl group represented by $R^8$ to $R^{10}$ may be the same as one described above in connection with the case of the unsubstituted C1-C4 alkyl group represented by $R^1$, including preferable options etc.

The unsubstituted C1-C4 alkoxy group represented by $R^8$ to $R^{10}$ may be the same as one described above in connection with the case of the unsubstituted C1-C4 alkoxy group represented by $R^5$ to $R^7$, including preferable options etc.

The C1-C4 alkoxy group substituted with a hydroxy group represented by $R^8$ to $R^{10}$ may be the same as one described above in connection with the case of the unsubstituted C1-C4 alkoxy group represented by $R^5$ to $R^7$, including preferable options etc.

The C1-C4 alkoxy group substituted with an unsubstituted C1-C4 alkoxy group represented by $R^8$ to $R^{10}$ may be the same as one described above in connection with the case of the unsubstituted C1-C4 alkoxy group represented by $R^5$ to $R^7$, including preferable options etc.

The C1-C4 alkoxy group substituted with a hydroxy C1-C4 alkoxy group represented by $R^8$ to $R^{10}$ may be the same as one described above in connection with the case of the unsubstituted C1-C4 alkoxy group represented by $R^5$ to $R^7$ including preferable options etc.

The C1-C4 alkoxy group substituted with a sulfo group represented by $R^8$ to $R^{10}$ may be the same as one described above in connection with the case of the unsubstituted C1-C4 alkoxy group represented by $R^5$ to $R^7$, including preferable options etc.

The C1-C4 alkoxy group substituted with a carboxy group represented by $R^8$ to $R^{10}$ may be the same as one described above in connection with the case of the unsubstituted C1-C4 alkoxy group represented by $R^5$ to $R^7$, including preferable options etc.

The C1-C4 alkylthio group substituted with a hydroxy group, a sulfo group or a carboxy group represented by $R^8$ to $R^{10}$ may be exemplified by the following straight or branched, preferably straight unsubstituted C1-C4 alkylthio groups in which one or two, preferably one hydrogen atom(s) is/are substituted with the group described above. The unsubstituted C1-C4 alkylthio group may be exemplified by straight alkylthio groups such as methylthio, ethylthio, n-propylthio, isopropylthio, n-butylthio, dimethylthio, diethylthio, di-n-propylthio and di-n-butylthio; branched alkylthio groups such as sec-butylthio, t-butylthio and diisopropylthio; and the like. However, when substituted with a hydroxy group, it is preferred that an arbitrary hydrogen atom other than the hydrogen atom carried by the carbon atom, which is bound to a sulfur atom, is substituted with a hydroxy group.

The C1-C4 alkylthio group substituted with a hydroxy group represented by $R^8$ to $R^{10}$ may be exemplified by 2-hydroxyethylthio, 2-hydroxypropylthio, and the like.

The C1-C4 alkylthio group substituted with a sulfo group represented by $R^8$ to $R^{10}$ may be exemplified by 2-sulfoethylthio, 3-sulfopropylthio, 4-sulfobutylthio, and the like.

The C1-C4 alkylthio group substituted with a carboxy group represented by $R^8$ to $R^{10}$ may be exemplified by carboxymethylthio, 2-carboxyethylthio, 3-carboxypropylthio, and the like.

The unsubstituted mono- or di-C1-C4 alkylamino group represented by $R^8$ to $R^{10}$ may be the same as one described above in connection with the case of the unsubstituted mono- or di-C1-C4 alkylamino group represented by $R^5$ to $R^7$, including preferable options etc.

The mono- or di-C1-C4 alkylamino group substituted with a hydroxy group represented by $R^8$ to $R^{10}$ may be the same as one described above in connection with the case of the mono-or di-C1-C4 alkylamino group substituted with a hydroxy group represented by $R^5$ to $R^7$, including preferable options etc.

The mono- or di-C1-C4 alkylamino group substituted with a sulfo group represented by $R^8$ to $R^{10}$ may be the same as one described above in connection with the case of the mono- or di-C1-C4 alkylamino group substituted with a sulfo group represented by $R^5$ to $R^7$, including preferable options etc.

The mono- or di-C1-C4 alkylamino group substituted with a carboxy group represented by $R^8$ to $R^{10}$ may be the same as one described above in connection with the case of the mono- or di-C1-C4 alkylamino group substituted with a carboxy group represented by $R^5$ to $R^7$, including preferable options etc.

The unsubstituted C1-C4 alkylcarbonylamino group represented by $R^8$ to $R^{10}$ may be the same as one described above in connection with the case of the unsubstituted C1-C4 alkylcarbonylamino group represented by $R^5$ to $R^7$, including preferable options etc.

The C1-C4 alkylcarbonylamino group substituted with a hydroxy group represented by $R^8$ to $R^{10}$ may be the same as one described above in connection with the case of the C1-C4 alkylcarbonylamino group substituted with a hydroxy group represented by $R^5$ to $R^7$, including preferable options etc.

The C1-C4 alkylcarbonylamino group substituted with a carboxy group represented by $R^8$ to $R^{10}$ may be the same as one described above in connection with the case of the C1-C4 alkylcarbonylamino group substituted with a carboxy group represented by $R^5$ to $R^7$, including preferable options etc.

The unsubstituted N'-C1-C4 alkylureide group represented by $R^8$ to $R^{10}$ may be the same as one described above in connection with the case of the unsubstituted N'-C1-C4 alkylureide group represented by $R^5$ to $R^7$, including preferable options etc.

The N'-C1-C4 alkylureide group substituted with a hydroxy group represented by $R^8$ to $R^{10}$ may be the same as one described above in connection with the case of the N'-C1-C4 alkylureide group substituted with a hydroxy group represented by $R^5$ to $R^7$, including preferable options etc.

The N'-C1-C4 alkylureide group substituted with a carboxy group represented by $R^8$ to $R^{10}$ may be the same as one described above in connection with the case of the N'-C1-C4 alkylureide group substituted with a carboxy group represented by $R^5$ to $R^7$, including preferable options etc.

The phenylamino group having a benzene ring substituted with a chlorine atom represented by $R^8$ to $R^{10}$ may be the same as one described above in connection with the case of the phenylamino group having a benzene ring substituted with a chlorine atom represented by $R^5$ to $R^7$, including preferable options etc.

The phenylamino group having a benzene ring substituted with an unsubstituted C1-C4 alkyl group represented by $R^8$ to $R^{10}$ may be the same as one described above in connection with the case of the phenylamino group having a benzene ring substituted with an unsubstituted C1-C4 alkyl group represented by $R^5$ to $R^7$, including preferable options etc.

The phenylamino group having a benzene ring substituted with a nitro group represented by $R^8$ to $R^{10}$ may be the same as one described above in connection with the case of the phenylamino group having a benzene ring substituted with a nitro group represented by $R^5$ to $R^7$, including preferable options etc.

The phenylamino group having a benzene ring substituted with a sulfo group represented by $R^8$ to $R^{10}$ may be the same as one described above in connection with the case of the phenylamino group having a benzene ring substituted with a sulfo group represented by $R^5$ to $R^7$, including preferable options etc.

The phenylamino group having a benzene ring substituted with a carboxy group represented by $R^8$ to $R^{10}$ may be the same as one described above in connection with the case of the phenylamino group having a benzene ring substituted with a carboxy group represented by $R^5$ to $R^7$, including preferable options etc.

The benzoylamino group having a benzene ring substituted with a chlorine atom represented by $R^8$ to $R^{10}$ may be the same as one described above in connection with the case of the benzoylamino group having a benzene ring substituted with a chlorine atom represented by $R^5$ to $R^7$, including preferable options etc.

The benzoylamino group having a benzene ring substituted with an unsubstituted C1-C4 alkyl group represented by $R^8$ to $R^{10}$ may be the same as one described above in connection with the case of the benzoylamino group having a benzene ring substituted with an unsubstituted C1-C4 alkyl group represented by $R^5$ to $R^7$, including preferable options etc.

The benzoylamino group having a benzene ring substituted with a nitro group represented by $R^8$ to $R^{10}$ may be the same as one described above in connection with the case of the benzoylamino group having a benzene ring substituted with a nitro group represented by $R^5$ to $R^7$, including preferable options etc.

The benzoylamino group having a benzene ring substituted with a sulfo group represented by $R^8$ to $R^{10}$ may be the same as one described above in connection with the case of the benzoylamino group having a benzene ring substituted with a sulfo group represented by $R^5$ to $R^7$, including preferable options etc.

The benzoylamino group having a benzene ring substituted with a carboxy group represented by $R^8$ to $R^{10}$ may be the same as one described above in connection with the case of the benzoylamino group having a benzene ring substituted with a carboxy group represented by $R^5$ to $R^7$, including preferable options etc.

The phenylsulfonylamino group having a benzene ring substituted with a chlorine atom represented by $R^8$ to $R^{10}$ may be the same as one described above in connection with the case of the phenylsulfonylamino group having a benzene ring substituted with a chlorine atom represented by $R^5$ to $R^7$, including preferable options etc.

The phenylsulfonylamino group having a benzene ring substituted with an unsubstituted C1-C4 alkyl group represented by $R^8$ to $R^{10}$ may be the same as one described above in connection with the case of the phenylsulfonylamino group having a benzene ring substituted with an unsubstituted C1-C4 alkyl group represented by $R^5$ to $R^7$, including preferable options etc.

The phenylsulfonylamino group having a benzene ring substituted with a nitro group represented by $R^8$ to $R^{10}$ may be the same as one described above in connection with the case of the phenylsulfonylamino group having a benzene ring substituted with a nitro group represented by $R^5$ to $R^7$, including preferable options etc.

The phenylsulfonylamino group having a benzene ring substituted with a sulfo group represented by $R^8$ to $R^{10}$ may be the same as one described above in connection with the case of the phenylsulfonylamino group having a benzene ring substituted with a sulfo group represented by $R^5$ to $R^7$, including preferable options etc.

The phenylsulfonylamino group having a benzene ring substituted with a carboxy group represented by $R^8$ to $R^{10}$ may be the same as one described above in connection with the case of the phenylsulfonylamino group having a benzene ring substituted with a carboxy group represented by $R^5$ to $R^7$, including preferable options etc.

Among those in the foregoing, it is preferred that $R^8$ to $R^{10}$ each independently represent a hydrogen atom, a C1-C4 alkylthio group substituted with a sulfo group, a chlorine atom, an unsubstituted C1-C4 alkyl group, an unsubstituted C1-C4 alkoxy group or an unsubstituted C1-C4 alkylcarbonylamino group, and at least two of $R^8$ to $R^{10}$ represent a group other than a hydrogen atom; it is more preferred that $R^9$ represents a hydrogen atom, and $R^8$ and $R^{10}$ represent a group other than a hydrogen atom. It is even more preferred that $R^8$ represents a C1-C4 alkylthio group substituted with a sulfo group, $R^9$ represents a hydrogen atom, $R^{10}$ represents a chlorine atom, an unsubstituted C1-C4 alkyl group, an unsubstituted C1-C4 alkoxy group or an unsubstituted C1-C4 alkylcarbonylamino group; and it is particularly preferred that $R^8$ represents a C1-C4 alkylthio group substituted with a sulfo group, $R^9$ represents a hydrogen atom, and $R^{10}$ represents an unsubstituted C1-C4 alkyl group, an unsubstituted C1-C4 alkoxy group or an unsubstituted C1-C4 alkylcarbonylamino group.

In the above formula (1), the group A represents an unsubstituted 2-naphthothiazolyl group, or a 2-naphthothiazolyl group having (a) substituent(s) selected from the group consisting of the aforementioned certain groups. The group A desirably has usually one to four, preferably one to three, more preferably two or three, and still more preferably three substituents. Although the position of the substituent(s) is not particularly limited, provided that a sulfur atom is present at position 1, and that a nitrogen atom is present at position 2, it is preferred that: four substituents are present at position 3, and position 5 to position 7; three substituents are present at position 3, position 5 and position 7; two substituents are present at position 3 and position 5, position 3 and position 6, position 3 and position 7, or position 5 and position 7.

The unsubstituted C1-C4 alkyl group as the substituent in the group A may be the same as one described above in connection with the case of the unsubstituted C1-C4 alkyl group represented by $R^5$ to $R^7$, including preferable options etc.

The unsubstituted C1-C4 alkoxy group as the substituent in the group A may be the same as one described above in connection with the case of the unsubstituted C1-C4 alkoxy group represented by $R^5$ to $R^7$, including preferable options etc.

The C1-C4 alkoxy group substituted with a hydroxy group as the substituent in the group A may be the same as one described above in connection with the case of the C1-C4 alkoxy group substituted with a hydroxy group represented by $R^5$ to $R^7$, including preferable options etc.

The C1-C4 alkoxy group substituted with an unsubstituted C1-C4 alkoxy group as the substituent in the group A may be the same as one described above in connection with the case of the C1-C4 alkoxy group substituted with an unsubstituted C1-C4 alkoxy group represented by $R^5$ to $R^7$, including preferable options etc.

The C1-C4 alkoxy group substituted with a sulfo group as the substituent in the group A may be the same as one described above in connection with the case of the C1-C4 alkoxy group substituted with a sulfo group represented by $R^5$ to $R^7$, including preferable options etc.

The C1-C4 alkoxy group substituted with a carboxy group as the substituent in the group A may be the same as one described above in connection with the case of the C1-C4 alkoxy group substituted with a carboxy group represented by $R^5$ to $R^7$, including preferable options etc.

The unsubstituted C1-C4 alkylsulfonyl group as the substituent in the group A may be the same as one described above in connection with the case of the unsubstituted C1-C4 alkylsulfonyl group represented by $R^5$ to $R^7$, including preferable options etc.

The C1-C4 alkylsulfonyl group substituted with a hydroxy group as the substituent in the group A may be the same as one described above in connection with the case of the C1-C4 alkylsulfonyl group substituted with a hydroxy group represented by $R^5$ to $R^7$, including preferable options etc.

The C1-C4 alkylsulfonyl group substituted with a sulfo group as the substituent in the group A may be the same as one described above in connection with the case of the C1-C4 alkylsulfonyl group substituted with a sulfo group represented by $R^5$ to $R^7$, including preferable options etc.

The C1-C4 alkylsulfonyl group substituted with a carboxy group as the substituent in the group A may be the same as one described above in connection with the case of the C1-C4 alkylsulfonyl group substituted with a carboxy group represented by $R^5$ to $R^7$, including preferable options etc.

The phenylsulfonyl group having a benzene ring substituted with a chlorine atom as the substituent in the group A may be the same as one described above in connection with the case of the phenylsulfonyl group having a benzene ring substituted with a chlorine atom represented by $R^5$ to $R^7$, including preferable options etc.

The phenylsulfonyl group having a benzene ring substituted with an unsubstituted C1-C4 alkyl group as the substituent in the group A may be the same as one described above in connection with the case of the phenylsulfonyl group having a benzene ring substituted with an unsubstituted C1-C4 alkyl group represented by $R^5$ to $R^7$, including preferable options etc.

The phenylsulfonyl group having a benzene ring substituted with a nitro group as the substituent in the group A may be the same as one described above in connection with the case of the phenylsulfonyl group having a benzene ring substituted with a nitro group represented by $R^5$ to $R^7$, including preferable options etc.

The phenylsulfonyl group having a benzene ring substituted with a sulfo group as the substituent in the group A may be the same as one described above in connection with the case of the phenylsulfonyl group having a benzene ring substituted with a sulfo group represented by $R^5$ to $R^7$, including preferable options etc.

The phenylsulfonyl group having a benzene ring substituted with a carboxy group as the substituent in the group A may be the same as one described above in connection with the case of the phenylsulfonyl group having a benzene ring substituted with a carboxy group represented by $R^5$ to $R^7$, including preferable options etc.

Among those in the foregoing, the group A is preferably a 2-naphthothiazolyl group having two or three sulfo groups; or having two sulfo groups and one unsubstituted C1-C4 alkoxy group, and is more preferably a 2-naphthothiazolyl group having three sulfo groups.

Preferable options of the trisazo compound represented by the above formula (1) include trisazo compounds represented by the above formula (2), more preferable options thereof include those represented by the above formula (3), still more preferable options include those represented by the above formula (4), and particularly preferable options include those represented by the above formula (5). In the formula (2) to the formula (5), appropriately employed group A, $R^1$ to $R^3$, $R^5$ to $R^7$, $R^8$ to $R^{10}$, a to d, $R^5$ to $R^7$ or the ring having substitution with $R^8$ to $R^{10}$ may be the same as those in the above formula (1) including the ring represented by the dotted line as well as preferable options, etc.

In the above formula (1) to the formula (5), preferable options as the group A are the groups represented by the above formula (6).

In the formula (6), the unsubstituted C1-C4 alkoxy group represented by $R^{11}$ to $R^{14}$ may be the same as one described above in connection with the case of the unsubstituted C1-C4 alkoxy group represented by $R^5$ to $R^7$, including preferable options etc.

The C1-C4 alkoxy group substituted with a hydroxy group represented by $R^{11}$ to $R^{14}$ may be the same as one described above in connection with the case of the C1-C4 alkoxy group substituted with a hydroxy group represented by $R^5$ to $R^7$, including preferable options etc.

The C1-C4 alkoxy group substituted with an unsubstituted C1-C4 alkoxy group represented by $R^{11}$ to $R^{14}$ may be the same as one described above in connection with the case of the unsubstituted C1-C4 alkoxy group represented by $R^5$ to $R^7$, including preferable options etc.

The C1-C4 alkoxy group substituted with a sulfo group represented by $R^{11}$ to $R^{14}$ may be the same as one described above in connection with the case of the C1-C4 alkoxy group substituted with a sulfo group represented by $R^5$ to $R^7$, including preferable options etc.

The C1-C4 alkoxy group substituted with a carboxy group represented by $R^{11}$ to $R^{14}$ may be the same as one described above in connection with the case of the C1-C4 alkoxy group substituted with a carboxy group represented by $R^5$ to $R^7$, including preferable options etc.

The unsubstituted C1-C4 alkylsulfonyl group represented by $R^{11}$ to $R^{14}$ may be exemplified by straight or branched alkylsulfonyl groups, and straight alkylsulfonyl groups are preferred. Specific examples include straight alkylsulfonyl groups such as methylsulfonyl, ethylsulfonyl, n-propylsulfonyl and n-butylsulfonyl; branched alkylsulfonyl groups such as isopropyl sulfonyl, isobutyl sulfonyl, sec-butylsulfonyl and t-butylsulfonyl; and the like.

The C1-C4 alkylsulfonyl group substituted with a hydroxy group represented by $R^{11}$ to $R^{14}$ may be exemplified by straight or branched substituted alkylsulfonyl groups, and straight substituted alkylsulfonyl groups are preferred. Specific examples include 2-hydroxyethylsulfonyl, 3-hydroxypropylsulfonyl, and the like.

The C1-C4 alkylsulfonyl group substituted with a sulfo group represented by $R^{11}$ to $R^{14}$ may be exemplified by straight or branched substituted alkylsulfonyl groups, and straight substituted alkylsulfonyl groups are preferred. Specific examples include 2-sulfopropylsulfonyl, 3-sulfopropylsulfonyl, 4-sulfobutylsulfonyl, and the like.

The C1-C4 alkylsulfonyl group substituted with a carboxy group represented by $R^{11}$ to $R^{14}$ may be exemplified by straight or branched substituted alkylsulfonyl groups, and straight substituted alkylsulfonyl groups are preferred. Specific examples include carboxymethylsulfonyl, 2-carboxyethylsulfonyl, 3-carboxypropylsulfonyl, and the like.

Among those in the foregoing, $R^{11}$ to $R^{14}$ in the formula (6) may be exemplified by a group selected from the groups consisting of a hydrogen atom, a sulfo group, and an unsubstituted C1-C4 alkoxy group, and any one of $R^{11}$ to $R^{14}$ is preferably a hydrogen atom. More preferably, any one of $R^{11}$ to $R^{14}$ represents a hydrogen atom, and the remaining three represent a sulfo group; any two thereof represent a hydrogen atom, and the remaining two represent a sulfo group; or any one thereof represents a hydrogen atom, two thereof represent a sulfo group, and the remaining one represents an unsubstituted C1-C4 alkoxy group. Still more preferably, any one thereof represents a hydrogen atom, and the remaining three represent a sulfo group. The substitution positions of $R^{11}$ to $R^{14}$ are not particularly limited.

Of candidates of the group A represented by the formula (6), preferred is a group represented by the above formula (101). In the formula (101), $R^{24}$ represents a sulfo group, and any one of $R^{21}$ to $R^{23}$ represents a sulfo group and the remaining two represent a hydrogen atom; or $R^{21}$, $R^{23}$ and $R^{24}$ represent a sulfo group, and $R^{22}$ represents a hydrogen atom; or $R^{21}$ and $R^{24}$ represent a sulfo group, $R^{22}$ represents a hydrogen atom, and $R^{23}$ represents an unsubstituted C1-C4 alkoxy group. Among these, the group A in which $R^{21}$, $R^{23}$ and $R^{24}$ represent a sulfo group, and $R^{22}$ represents a hydrogen atom is preferred.

Compounds in which preferable options are combined are more preferred, and compounds in which more preferable options are combined are still more preferred as described in connection with the above formula (1) to the formula (6) and the formula (101), and substituents thereof. In addition, compounds in which still more preferable options are combined are similarly even more preferred. It is to be noted that as described above, in the formulae (7) to the formula (8), n, group A, the rings having substitution with $R^1$ to $R^{10}$ represent the same meanings as those in the above formula (1) including the ring represented by the dotted line. Also, the same may be applied to preferable options, compounds in which preferable options are combined, and the like.

Specific examples of the combination of preferable substituents in the above formula (1) include the following (I) and (II).

(I) A combination in which
$R^1$ represents an unsubstituted C1-C4 alkyl group,
$R^2$ represents a cyano group,
$R^3$ represents a chlorine atom, an unsubstituted C1-C6 alkyl group, or an unsubstituted C1-C6 alkoxy group,
the ring having substitution with $R^5$ to $R^7$ represents a benzene ring without being coupled to the ring represented by the dotted line,
$R^5$ represents a C1-C4 alkoxy group substituted with a sulfo group,
$R^6$ represents a hydrogen atom,
$R^7$ represents an unsubstituted C1-C4 alkyl group,
the ring having substitution with $R^8$ to $R^{10}$ represents a benzene ring without being coupled to the ring represented by the dotted line,
$R^8$ represents a C1-C4 alkylthio group substituted with a sulfo group,
$R^9$ represents a hydrogen atom,
$R^{10}$ represents a chlorine atom, an unsubstituted C1-C4 alkoxy group, or an unsubstituted C1-C4 alkylcarbonylamino group, and
the group A represents a 2-naphthothiazolyl group having two or three sulfo groups; or two sulfo groups and one unsubstituted C1-C4 alkoxy group.

(II) A combination in which
$R^1$ represents an unsubstituted C1-C4 alkyl group,
$R^2$ represents a cyano group or a carbamoyl group,
$R^3$ represents an unsubstituted C1-C6 alkyl group, or an unsubstituted C1-C6 alkoxy group,
the ring having substitution with $R^5$ to $R^7$ represents a benzene ring without being coupled to the ring represented by the dotted line,
$R^5$ represents a C1-C4 alkoxy group substituted with a sulfo group,
$R^6$ represents a hydrogen atom,
$R^7$ represents an unsubstituted C1-C4 alkyl group,
the ring having substitution with $R^8$ to $R^{10}$ represents a benzene ring without being coupled to the ring represented by the dotted line,
$R^8$ represents a C1-C4 alkylthio group substituted with a sulfo group,
$R^9$ represents a hydrogen atom,
$R^{10}$ represents an unsubstituted C1-C4 alkyl group, and the group A represents a 2-naphthothiazolyl group having two or three sulfo groups; or two sulfo groups and one unsubstituted C1-C4 alkoxy group.

Specific examples of the combination of preferable substituents in the above formula (2) include the following (III) and (IV).

(III) A combination in which
$R^1$ represents an unsubstituted C1-C4 alkyl group,
$R^2$ represents a cyano group,
$R^3$ represents a chlorine atom, an unsubstituted C1-C6 alkyl group, or an unsubstituted C1-C6 alkoxy group,
$R^5$ represents a C1-C4 alkoxy group substituted with a sulfo group,
$R^6$ represents a hydrogen atom,
$R^7$ represents an unsubstituted C1-C4 alkyl group,
the ring having substitution with $R^8$ to $R^{10}$ represents a benzene ring without being coupled to the ring represented by the dotted line,
$R^8$ represents a C1-C4 alkylthio group substituted with a sulfo group,
$R^9$ represents a hydrogen atom,
$R^{10}$ represents a chlorine atom, an unsubstituted C1-C4 alkoxy group, or an unsubstituted C1-C4 alkylcarbonylamino group, and
the group A represents a 2-naphthothiazolyl group having two or three sulfo groups; or two sulfo groups and one unsubstituted C1-C4 alkoxy group.

(IV) A combination in which
$R^1$ represents an unsubstituted C1-C4 alkyl group,
$R^2$ represents a cyano group or carbamoyl group,
$R^3$ represents an unsubstituted C1-C6 alkyl group, or an unsubstituted C1-C6 alkoxy group,
the ring having substitution with $R^5$ to $R^7$ represents a benzene ring without being coupled to the ring represented by the dotted line,
$R^5$ represents a C1-C4 alkoxy group substituted with a sulfo group,
$R^6$ represents a hydrogen atom,
$R^7$ represents an unsubstituted C1-C4 alkyl group,
the ring having substitution with $R^8$ to $R^{10}$ represents a benzene ring without being coupled to the ring represented by the dotted line,
$R^8$ represents a C1-C4 alkylthio group substituted with a sulfo group,
$R^9$ represents a hydrogen atom,
$R^{10}$ represents an unsubstituted C1-C4 alkyl group, and the group A represents a 2-naphthothiazolyl group having two or three sulfo groups; or two sulfo groups and one unsubstituted C1-C4 alkoxy group.

Specific examples of the combination of preferable substituents in the above formula (3) to formula (5) include the following (V) and (VI).

(V) A combination in which
$R^1$ represents an unsubstituted C1-C4 alkyl group,
$R^2$ represents a cyano group,
$R^3$ represents a chlorine atom, an unsubstituted C1-C6 alkyl group, or an unsubstituted C1-C6 alkoxy group,
$R^5$ represents a C1-C4 alkoxy group substituted with a sulfo group,
$R^6$ represents a hydrogen atom, $R^7$ represents an unsubstituted C1-C4 alkyl group,
$R^8$ represents a C1-C4 alkylthio group substituted with a sulfo group,
$R^9$ represents a hydrogen atom,
$R^{10}$ represents a chlorine atom, an unsubstituted C1-C4 alkoxy group, or an unsubstituted C1-C4 alkylcarbonylamino group, and
the group A represents a 2-naphthothiazolyl group having two or three sulfo groups; or two sulfo groups and one unsubstituted C1-C4 alkoxy group.
(VI) A combination in which
$R^1$ represents an unsubstituted C1-C4 alkyl group,
$R^2$ represents a cyano group or carbamoyl group,
$R^3$ represents an unsubstituted C1-C6 alkyl group, or an unsubstituted C1-C6 alkoxy group,
$R^5$ represents a C1-C4 alkoxy group substituted with a sulfo group,
$R^6$ represents a hydrogen atom,
$R^7$ represents an unsubstituted C1-C4 alkyl group,
$R^8$ represents a C1-C4 alkylthio group substituted with a sulfo group,
$R^9$ represents a hydrogen atom,
$R^{10}$ represents an unsubstituted C1-C4 alkyl group, and
the group A represents a 2-naphthothiazolyl group having two or three sulfo groups; or two sulfo groups and one unsubstituted C1-C4 alkoxy group.

The salt of the trisazo compound represented by the above formula (1) is an inorganic or organic cation salt. Of these, specific examples of the inorganic salt include alkali metal salts, alkaline earth metal salts and ammonium salts, and preferable inorganic salts include lithium, sodium and potassium salts, and ammonium salts. On the other hand, examples of the organic cation salt include salts with a quaternary ammonium compound represented by the following formula (9) but not limited thereto. Moreover, the free acids, tautomers thereof, and their various types of salts may be a mixture of the same. For example, any combination of mixtures of a sodium salt and ammonium salt, mixtures of a free acid and sodium salt, mixtures of a lithium salt, sodium salt and ammonium salt, etc., may be used. Physical property values such as solubility may vary corresponding to the type of the salt, and thus a mixture having physical properties appropriate for the object can be obtained by selecting the type of the salt as needed ad libitum, or changing the ratio of the salts when a plurality of salts and the like are included.

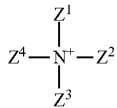

(9)

In the formula (9), $Z^1$, $Z^2$, $Z^3$ and $Z^4$ each independently represent a group selected from the group consisting of a hydrogen atom, an alkyl group, a hydroxyalkyl group, and a hydroxyalkoxyalkyl group, and at least one thereof represents a group other than a hydrogen atom.

Specific examples of the alkyl group represented and $Z^1$, $Z^2$, $Z^3$ or $Z^4$ in the formula (9) include methyl, ethyl, n-propyl, isopropyl, n-butyl, isobutyl, sec-butyl, t-butyl, and the like. Specific examples of the hydroxyalkyl group include hydroxy C1-C4 alkyl groups such as hydroxymethyl, hydroxyethyl, 3-hydroxypropyl, 2-hydroxypropyl, 4-hydroxybutyl, 3-hydroxybutyl and 2-hydroxybutyl. Examples of the hydroxyalkoxyalkyl group include hydroxy C1-C4 alkoxy C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl and 2-hydroxyethoxybutyl, and hydroxyethoxy C1-C4 alkyl is preferred among these. Particularly preferable options include a hydrogen atom; methyl; hydroxy C1-C4 alkyl groups such as hydroxymethyl, hydroxyethyl, 3-hydroxypropyl, 2-hydroxypropyl, 4-hydroxybutyl, 3-hydroxybutyl and 2-hydroxybutyl; and hydroxyethoxy C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl and 2-hydroxyethoxybutyl.

Specific examples of combinations of $Z^1$, $Z^2$, $Z^3$ and $Z^4$ in preferable compounds represented by the formula (9) are shown in Table 1 below.

TABLE 1

| Compound No. | Z1 | Z2 | Z3 | Z4 |
|---|---|---|---|---|
| 1-1 | H | CH3 | CH3 | CH3 |
| 1-2 | CH3 | CH3 | CH3 | CH3 |
| 1-3 | H | —C2H4OH | —C2H4OH | —C2H4OH |
| 1-4 | CH3 | —C2H4OH | —C2H4OH | —C2H4OH |
| 1-5 | H | —CH2CH(OH)CH3 | —CH2CH(OH)CH3 | —CH2CH(OH)CH3 |
| 1-6 | CH3 | —CH2CH(OH)CH3 | —CH2CH(OH)CH3 | —CH2CH(OH)CH3 |
| 1-7 | H | —C2H4OH | H | —C2H4OH |
| 1-8 | CH3 | —C2H4OH | H | —C2H4OH |
| 1-9 | H | —CH2CH(OH)CH3 | H | —CH2CH(OH)CH3 |
| 1-10 | CH3 | —CH2CH(OH)CH3 | H | —CH2CH(OH)CH3 |
| 1-11 | CH3 | —C2H4OH | CH3 | —C2H4OH |
| 1-12 | CH3 | —CH2CH(OH)CH3 | CH3 | —CH2CH(OH)CH3 |

The trisazo compound represented by the above formula (1) may be synthesized according to, for example, the following method. Note that acidic functional groups of the compound in each step are represented in the form of their free acids for the sake of simplicity. Furthermore, in the following formulae (10) to (15), the group A, $R^1$ to $R^{10}$, the rings having substitution with $R^5$ to $R^{10}$ have the same meanings as those in the above formula (1), respectively, including rings represented by the dotted line.

The compound represented by the following formula (10) is diazotized according to a common procedure, and the product and a compound represented by the following formula (11) are subjected to a coupling reaction according to a common procedure to obtain a compound represented by the following formula (12). It is to be noted that the compound represented by the formula (10) can be synthesized according to a method disclosed in Patent Document 10.

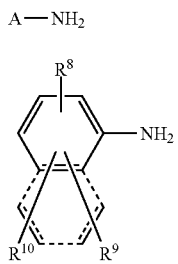

(10)

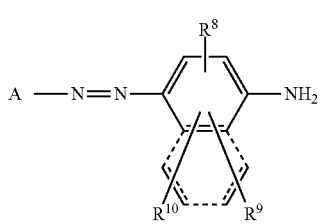

(12)

After the compound represented by the formula (12) obtained is diazotized according to a common procedure, the product and a compound represented by the following formula (13) are subjected to a coupling reaction according to a common procedure to obtain a compound represented by the following formula (14).

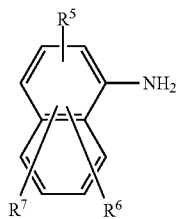

(13)

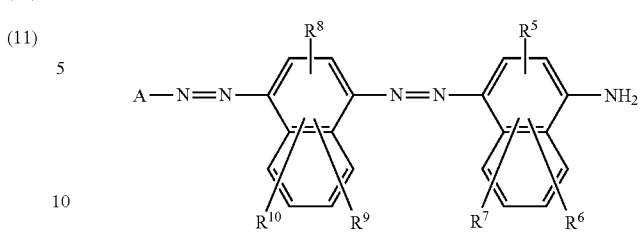

(14)

After the compound represented by the formula (14) obtained is diazotized according to a common procedure, the product and a compound represented by the following formula (15) are subjected to a coupling reaction according to a common procedure, whereby the trisazo compound represented by the above formula (1) can be obtained.

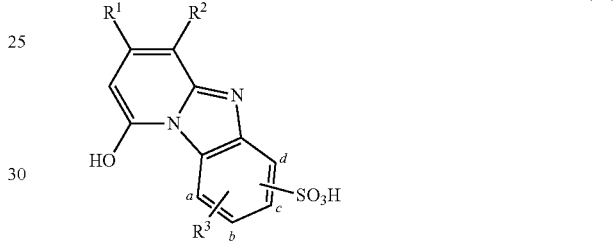

(15)

It is to be noted that the compound represented by the above formula (15) can be synthesized according to a method disclosed in Patent Document 5.

Specific examples of suitable compound of the present invention represented by the above formula (1) include compounds, etc., represented by the structural formulae shown in the following Tables 2 to Table 30, although not particularly limited thereto.

In each Table, the functional groups such as sulfo group and carboxy group are represented in the form of their free acids for the sake of simplicity.

TABLE 2

| Compound No. | Structural Formula |
|---|---|
| 1 | ![structure] |

TABLE 2-continued

| Compound No. | Structural Formula |
|---|---|
| 2 | (structure) |
| 3 | (structure) |
| 4 | (structure) |
| 5 | (structure) |

TABLE 2-continued
| Compound No. | Structural Formula |
|---|---|
| 6 | 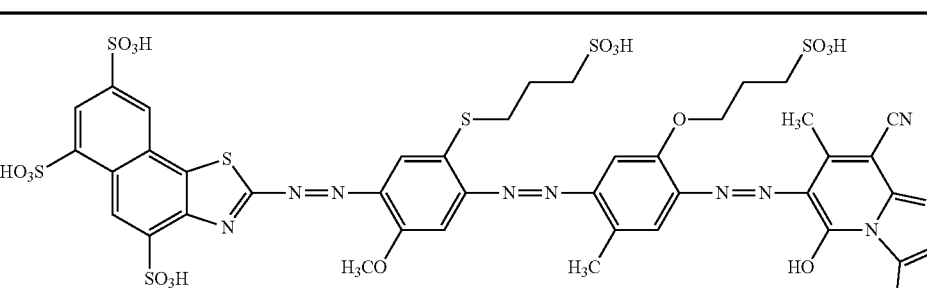 |
| 7 | |
TABLE 3
| Compound No. | Structural Formula |
|---|---|
| 8 | 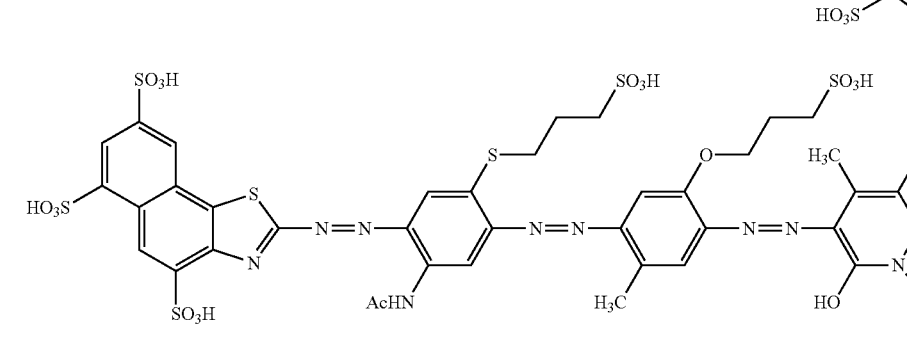 |
| 9 | |

TABLE 3-continued

| Compound No. | Structural Formula |
| --- | --- |
| 10 | |
| 11 | |
| 12 | |
| 13 | |

TABLE 3-continued

| Compound No. | Structural Formula |
|---|---|
| 14 | (structure) |

TABLE 4

| Compound No. | Structural Formula |
|---|---|
| 15 | (structure) |
| 16 | (structure) |
| 17 | (structure) |

TABLE 4-continued
| Compound No. | Structural Formula |
|---|---|
| 18 | 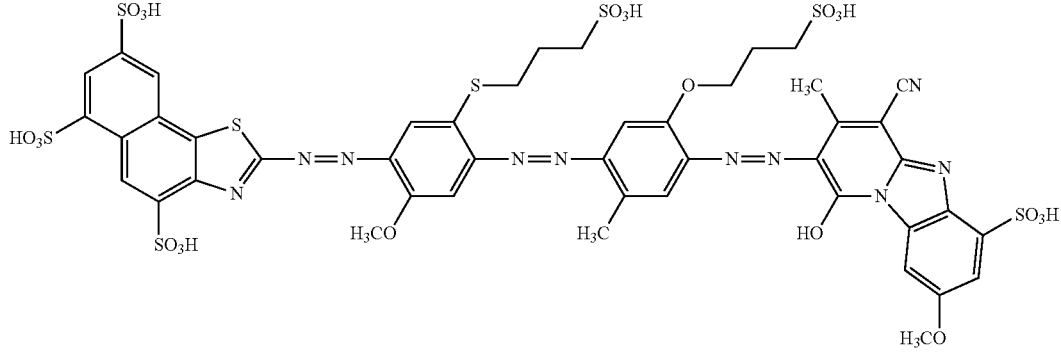 [SMILES: COc1cc(S(=O)(=O)O)c2nc3c(C#N)c(C)c(N=Nc4cc(C)c(N=Nc5cc(OC)c(N=Nc6nc7c(S(=O)(=O)O)cc8c(S(=O)(=O)O)cc(S(=O)(=O)O)cc8c7s6)cc5SCCCS(=O)(=O)O)cc4OCCCS(=O)(=O)O)c(O)n3c2c1] |
| 19 | 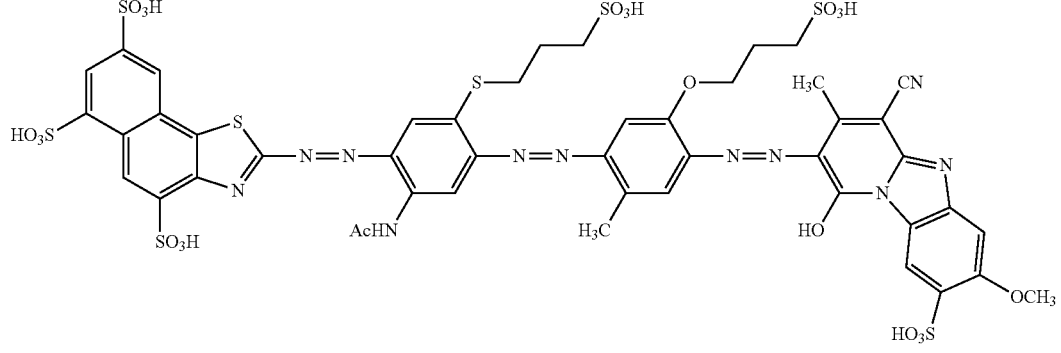 [SMILES: COc1cc2nc3c(C#N)c(C)c(N=Nc4cc(C)c(N=Nc5cc(NC(C)=O)c(N=Nc6nc7c(S(=O)(=O)O)cc8c(S(=O)(=O)O)cc(S(=O)(=O)O)cc8c7s6)cc5SCCCS(=O)(=O)O)cc4OCCCS(=O)(=O)O)c(O)n3c2cc1S(=O)(=O)O] |
| 20 | 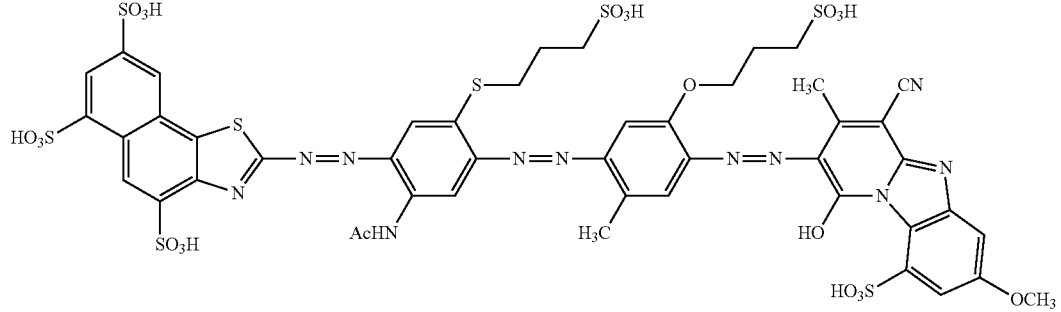 |
| 21 | 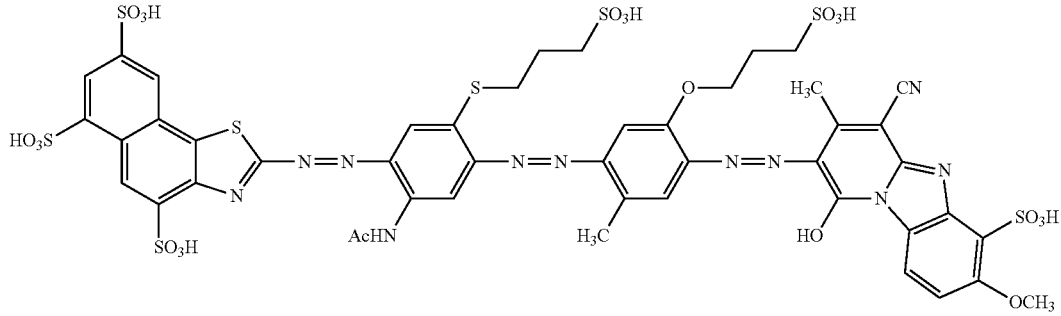 [SMILES: COc1ccc2c(nc3c(C#N)c(C)c(N=Nc4cc(C)c(N=Nc5cc(NC(C)=O)c(N=Nc6nc7c(S(=O)(=O)O)cc8c(S(=O)(=O)O)cc(S(=O)(=O)O)cc8c7s6)cc5SCCCS(=O)(=O)O)cc4OCCCS(=O)(=O)O)c(O)n32)c1S(=O)(=O)O] |

TABLE 5

| Compound No. | Structural Formula |
|---|---|
| 22 | |
| 23 | |
| 24 | |
| 25 | |

TABLE 5-continued
| Compound No. | Structural Formula |
|---|---|
| 26 | 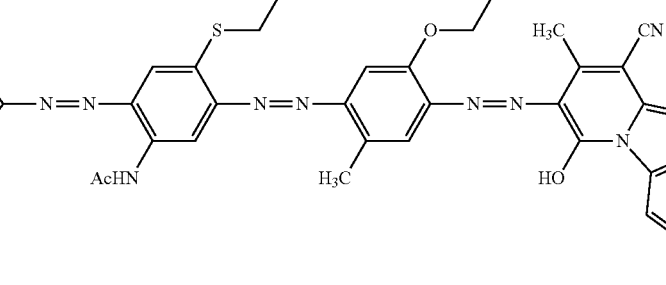 |
| 27 | |
| 28 | |
TABLE 6
| Compound No. | Structural Formula |
|---|---|
| 29 | |

TABLE 6-continued

| Compound No. | Structural Formula |
|---|---|
| 30 | |
| 31 | |
| 32 | |
| 33 | |

TABLE 6-continued

| Compound No. | Structural Formula |
| --- | --- |
| 34 | |
| 35 | |

TABLE 7

| Compound No. | Structural Formula |
| --- | --- |
| 36 | |
| 37 | |

TABLE 7-continued

| Compound No. | Structural Formula |
|---|---|
| 38 | |
| 39 | |
| 40 | |
| 41 | |

TABLE 7-continued

| Compound No. | Structural Formula |
|---|---|
| 42 | (structure) |

TABLE 8

| Compound No. | Structural Formula |
|---|---|
| 43 | (structure) |
| 44 | (structure) |
| 45 | (structure) |

TABLE 8-continued

| Compound No. | Structural Formula |
|---|---|
| 46 | |
| 47 | |
| 48 | |
| 49 | |

TABLE 9

| Compound No. | Structural Formula |
|---|---|
| 50 | |
| 51 | |
| 52 | |
| 53 | |

TABLE 9-continued

| Compound No. | Structural Formula |
|---|---|
| 54 | (chemical structure) |
| 55 | (chemical structure) |
| 56 | (chemical structure) |

TABLE 10

| Compound No. | Structural Formula |
|---|---|
| 57 | (chemical structure) |

TABLE 10-continued

| Compound No. | Structural Formula |
|---|---|
| 58 | |
| 59 | |
| 60 | |
| 61 | |

TABLE 10-continued

| Compound No. | Structural Formula |
|---|---|
| 62 | |
| 63 | |

TABLE 11

| Compound No. | Structural Formula |
|---|---|
| 64 | |
| 65 | |

TABLE 11-continued

| Compound No. | Structural Formula |
|---|---|
| 66 | |
| 67 | |
| 68 | |
| 69 | |

TABLE 11-continued
| Compound No. | Structural Formula |
|---|---|
| 70 | 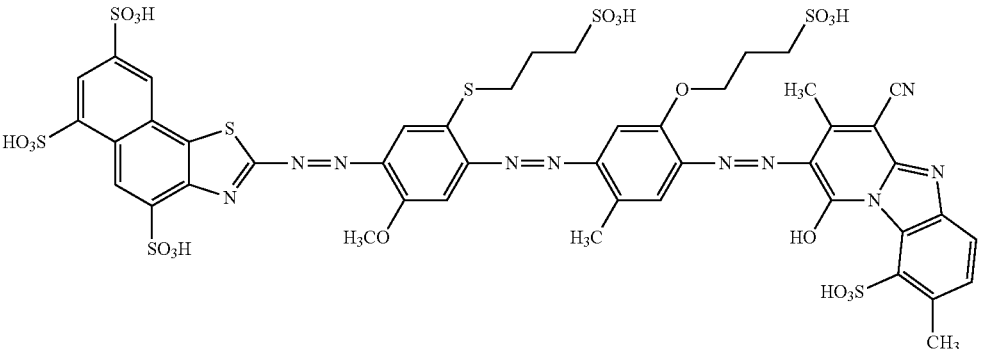 |
TABLE 12
| Compound No. | Structural Formula |
|---|---|
| 71 | 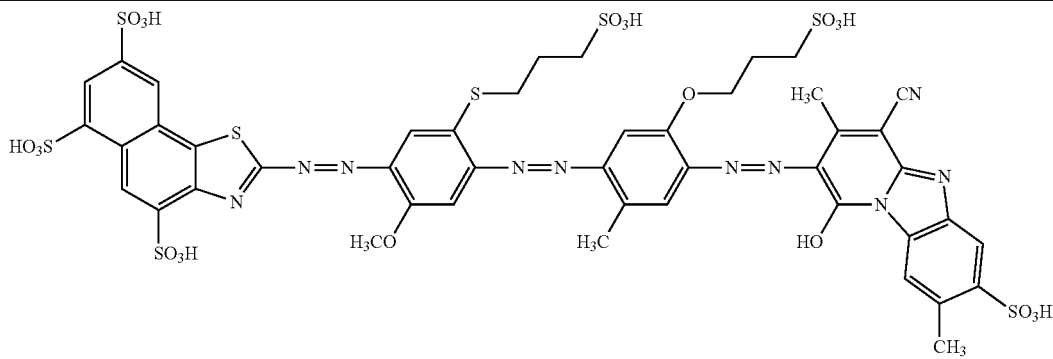 |
| 72 | 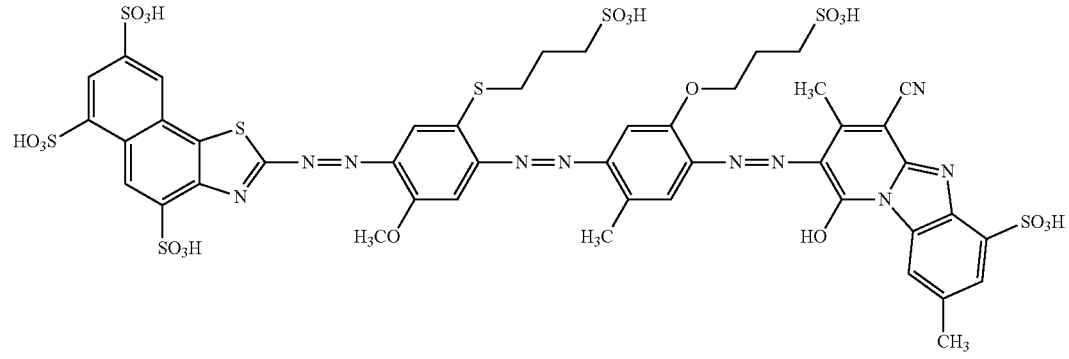 [SMILES: COc1cc(N=Nc2cc(OCCCS(=O)(=O)O)c(N=Nc3c(C)c(C#N)c4nc5c(S(=O)(=O)O)cc(C)cc5n4c3O)cc2C)c(SCCCS(=O)(=O)O)cc1N=Nc1nc2c(S(=O)(=O)O)cc3c(S(=O)(=O)O)cc(S(=O)(=O)O)cc3c2s1] |
| 73 | 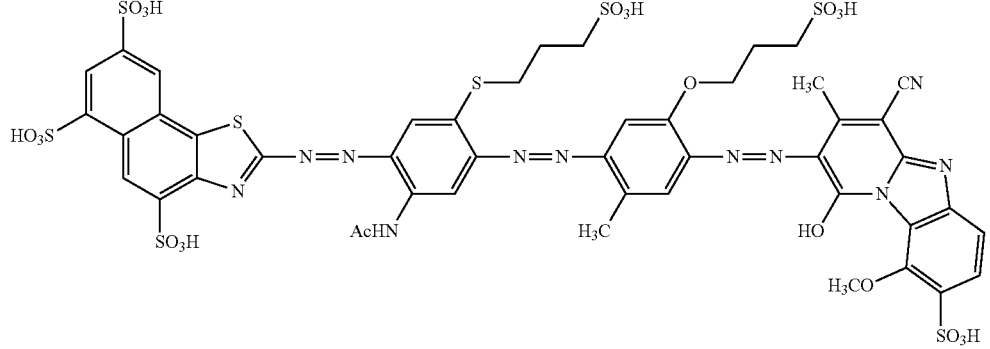 |

TABLE 12-continued
| Compound No. | Structural Formula |
|---|---|
| 74 | 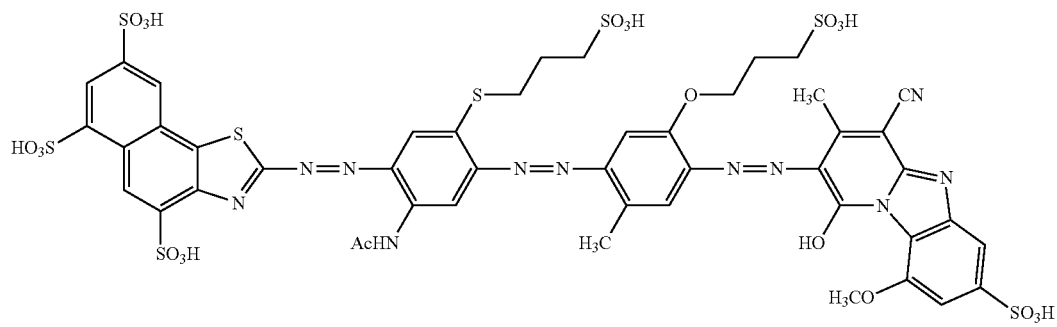 [SMILES: COc1cc(S(=O)(=O)O)cc2nc3c(C#N)c(C)c(N=Nc4cc(C)c(N=Nc5cc(NC(C)=O)c(N=Nc6nc7c(S(=O)(=O)O)cc8c(S(=O)(=O)O)cc(S(=O)(=O)O)cc8c7s6)cc5SCCCS(=O)(=O)O)cc4OCCCS(=O)(=O)O)c(O)n3c12] |
| 75 | 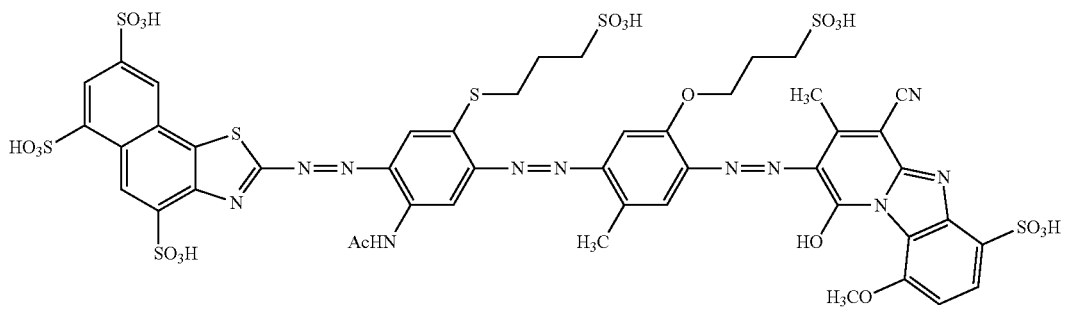 |
| 76 | 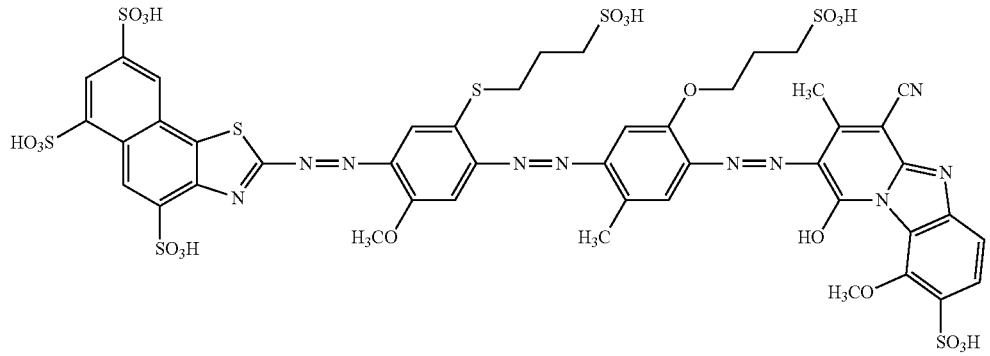 [SMILES: COc1cc(N=Nc2cc(OCCCS(=O)(=O)O)c(N=Nc3c(C)c(C#N)c4nc5ccc(S(=O)(=O)O)c(OC)c5n4c3O)cc2C)c(SCCCS(=O)(=O)O)cc1N=Nc1nc2c(S(=O)(=O)O)cc3c(S(=O)(=O)O)cc(S(=O)(=O)O)cc3c2s1] |
| 77 | 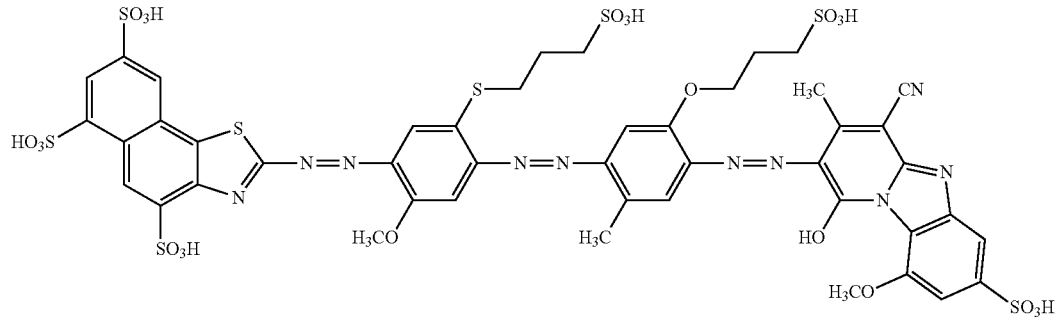 |

TABLE 13

| Compound No. | Structural Formula |
|---|---|
| 78 | |
| 79 | |
| 80 | |
| 81 | |

TABLE 13-continued

| Compound No. | Structural Formula |
|---|---|
| 82 | (structure) |
| 83 | (structure) |
| 84 | (structure) |

TABLE 14

| Compound No. | Structural Formula |
|---|---|
| 85 | (structure) |

TABLE 14-continued

| Compound No. | Structural Formula |
| --- | --- |
| 86 | |
| 87 | |
| 88 | |
| 89 | |

TABLE 14-continued

| Compound No. | Structural Formula |
| --- | --- |
| 90 | |
| 91 | |

TABLE 15

| Compound No. | Structural Formula |
| --- | --- |
| 92 | |
| 93 | |

TABLE 15-continued

| Compound No. | Structural Formula |
|---|---|
| 94 | |
| 95 | |
| 96 | |
| 97 | |

TABLE 15-continued

| Compound No. | Structural Formula |
|---|---|
| 98 | (chemical structure) |

TABLE 16

| Compound No. | Structural Formula |
|---|---|
| 99 | (chemical structure) |
| 100 | (chemical structure) |
| 101 | (chemical structure) |

TABLE 16-continued

| Compound No. | Structural Formula |
| --- | --- |
| 102 | |
| 103 | |
| 104 | |
| 105 | |

TABLE 17

| Compound No. | Structural Formula |
|---|---|
| 106 | (structure) |
| 107 | (structure) |
| 108 | (structure) |
| 109 | (structure) |

TABLE 17-continued

| Compound No. | Structural Formula |
| --- | --- |
| 110 | (structure) |
| 111 | (structure) |
| 112 | (structure) |

TABLE 18

| Compound No. | Structural Formula |
| --- | --- |
| 113 | (structure) |

TABLE 18-continued

| Compound No. | Structural Formula |
|---|---|
| 114 | |
| 115 | |
| 116 | |
| 117 | |

TABLE 18-continued

| Compound No. | Structural Formula |
|---|---|
| 118 | |
| 119 | |

TABLE 19

| Compound No. | Structural Formula |
|---|---|
| 120 | |
| 121 | |

TABLE 19-continued
| Compound No. | Structural Formula |
|---|---|
| 122 | 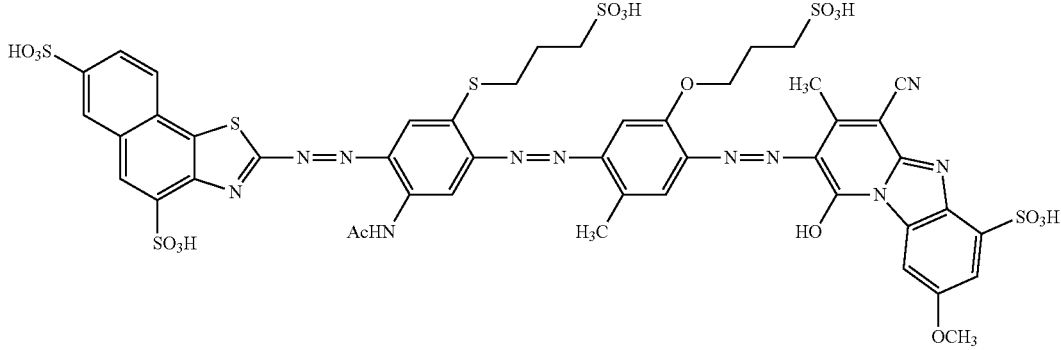 [SMILES: COc1cc(S(=O)(=O)O)c2nc3c(C#N)c(C)c(N=Nc4cc(C)c(N=Nc5cc(NC(C)=O)c(N=Nc6nc7c(S(=O)(=O)O)cc8cc(S(=O)(=O)O)ccc8c7s6)cc5SCCCS(=O)(=O)O)cc4OCCCS(=O)(=O)O)c(O)n3c2c1] |
| 123 | 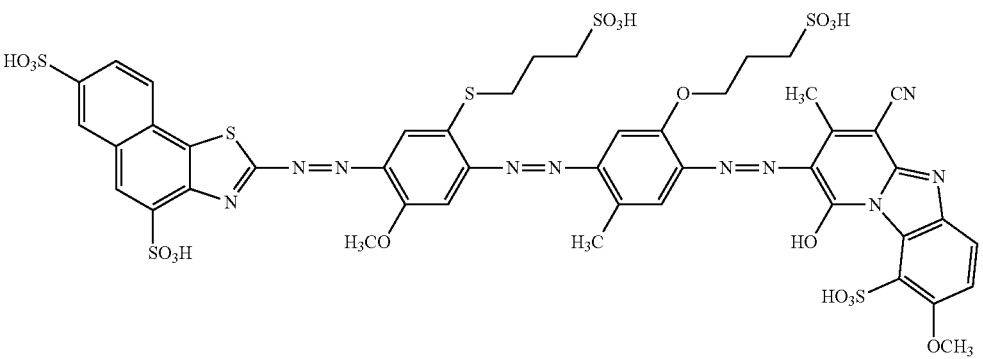 |
| 124 | 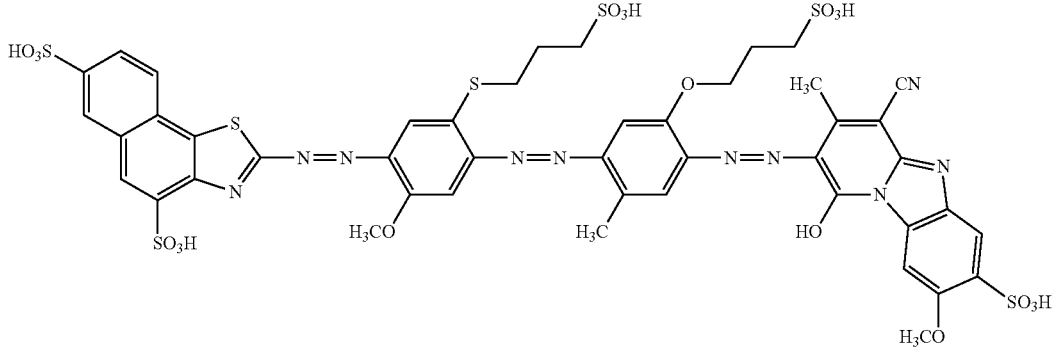 [SMILES: COc1cc2nc3c(C#N)c(C)c(N=Nc4cc(C)c(N=Nc5cc(NC(C)=O)c(N=Nc6nc7c(S(=O)(=O)O)cc8cc(S(=O)(=O)O)ccc8c7s6)cc5SCCCS(=O)(=O)O)cc4OCCCS(=O)(=O)O)c(O)n3c2cc1S(=O)(=O)O] |
| 125 | 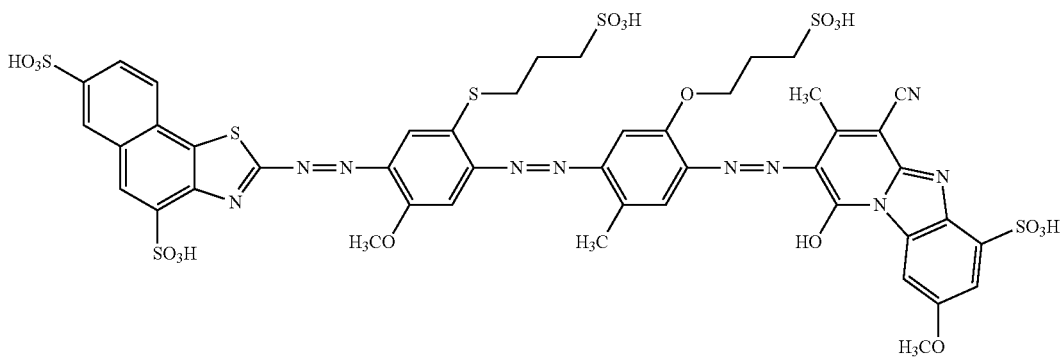 |

TABLE 19-continued

| Compound No. | Structural Formula |
|---|---|
| 126 | (structure) |

TABLE 20

| Compound No. | Structural Formula |
|---|---|
| 127 | (structure) |
| 128 | (structure) |
| 129 | (structure) |

TABLE 20-continued
| Compound No. | Structural Formula |
|---|---|
| 130 | 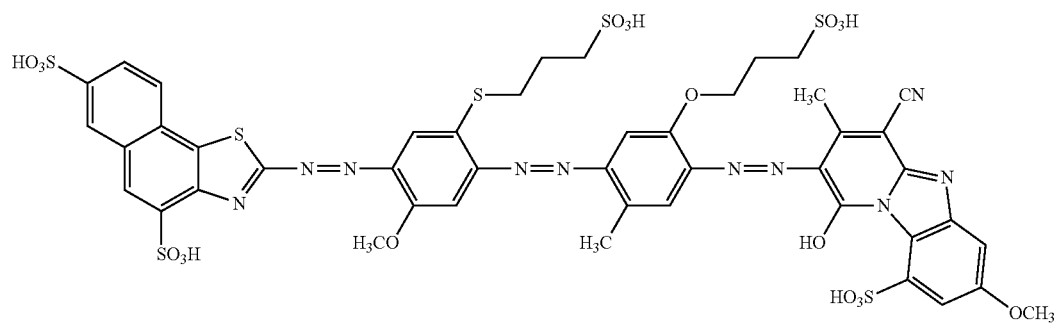 [SMILES: COc1cc(S(=O)(=O)O)c2c(c1)nc1c(C#N)c(C)c(N=Nc3cc(C)c(N=Nc4cc(OC)c(N=Nc5nc6c(S(=O)(=O)O)cc7cc(S(=O)(=O)O)ccc7c6s5)cc4SCCCS(=O)(=O)O)cc3OCCCS(=O)(=O)O)c(O)n12] |
| 131 | 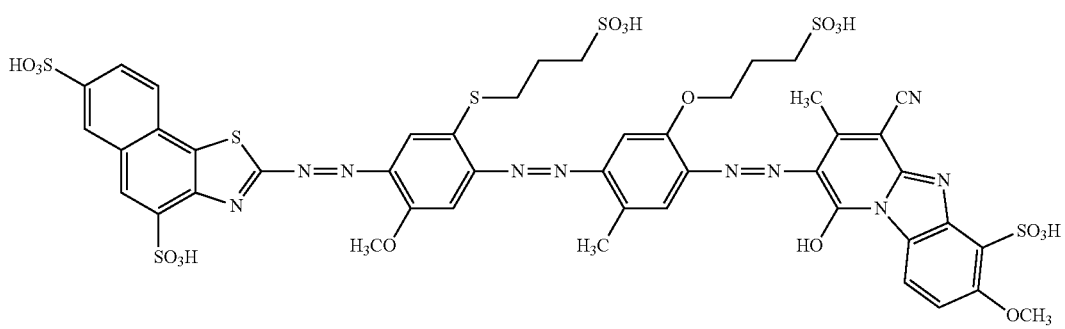 [SMILES: COc1cc(N=Nc2cc(OCCCS(=O)(=O)O)c(N=Nc3c(C)c(C#N)c4nc5c(S(=O)(=O)O)c(OC)ccc5n4c3O)cc2C)c(SCCCS(=O)(=O)O)cc1N=Nc1nc2c(S(=O)(=O)O)cc3cc(S(=O)(=O)O)ccc3c2s1] |
| 132 | 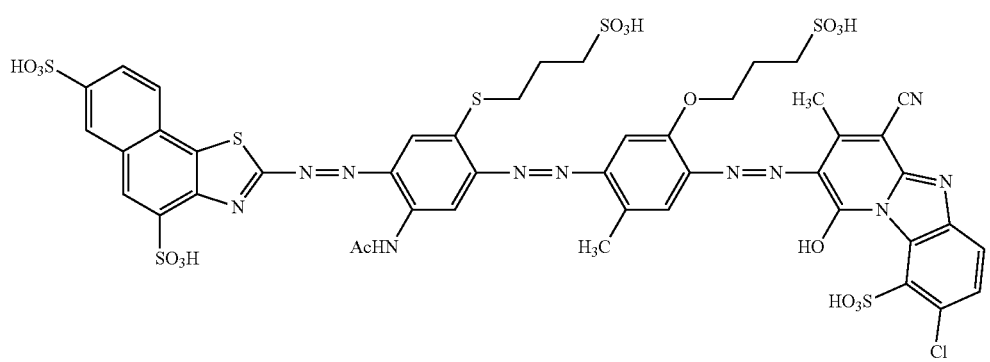 [SMILES: COc1cc(N=Nc2cc(OCCCS(=O)(=O)O)c(N=Nc3c(C)c(C#N)c4nc5ccc(Cl)c(S(=O)(=O)O)c5n4c3O)cc2C)c(SCCCS(=O)(=O)O)cc1N=Nc1nc2c(S(=O)(=O)O)cc3cc(S(=O)(=O)O)ccc3c2s1] |
| 133 | 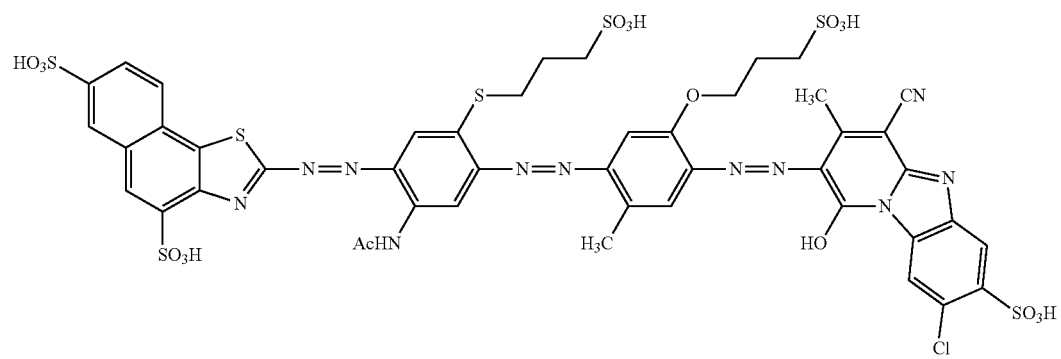 [SMILES: COc1cc(N=Nc2cc(OCCCS(=O)(=O)O)c(N=Nc3c(C)c(C#N)c4nc5cc(S(=O)(=O)O)c(Cl)cc5n4c3O)cc2C)c(SCCCS(=O)(=O)O)cc1N=Nc1nc2c(S(=O)(=O)O)cc3cc(S(=O)(=O)O)ccc3c2s1] |

TABLE 21

| Compound No. | Structural Formula |
|---|---|
| 134 | |
| 135 | |
| 136 | |
| 137 | |

TABLE 21-continued

| Compound No. | Structural Formula |
|---|---|
| 138 | |
| 139 | |
| 140 | |

TABLE 22

| Compound No. | Structural Formula |
|---|---|
| 141 | |

TABLE 22-continued

| Compound No. | Structural Formula |
| --- | --- |
| 142 | |
| 143 | |
| 144 | |
| 145 | |

TABLE 22-continued
| Compound No. | Structural Formula |
|---|---|
| 146 | 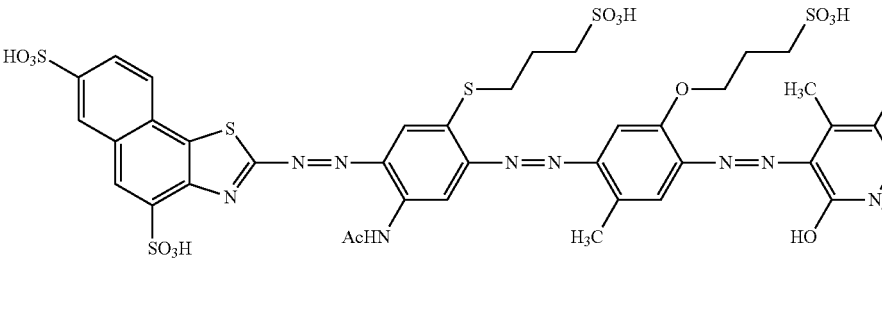 |
| 147 | |
TABLE 23
| Compound No. | Structural Formula |
|---|---|
| 148 | 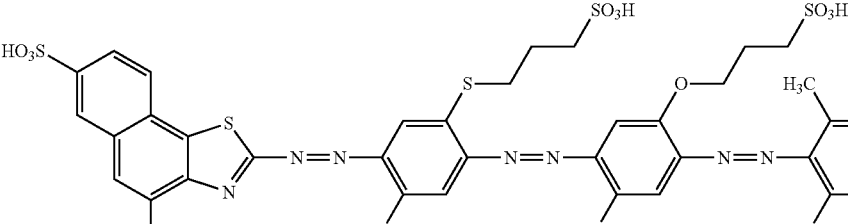 |

TABLE 23-continued

| Compound No. | Structural Formula |
|---|---|
| 149 | |
| 150 | |
| 151 | |
| 152 | |

TABLE 23-continued

| Compound No. | Structural Formula |
|---|---|
| 153 | (structure) |
| 154 | (structure) |

TABLE 24

| Compound No. | Structural Formula |
|---|---|
| 155 | (structure) |
| 156 | (structure) |

TABLE 25
| Compound No. | Structural Formula |
|---|---|
| 157 | 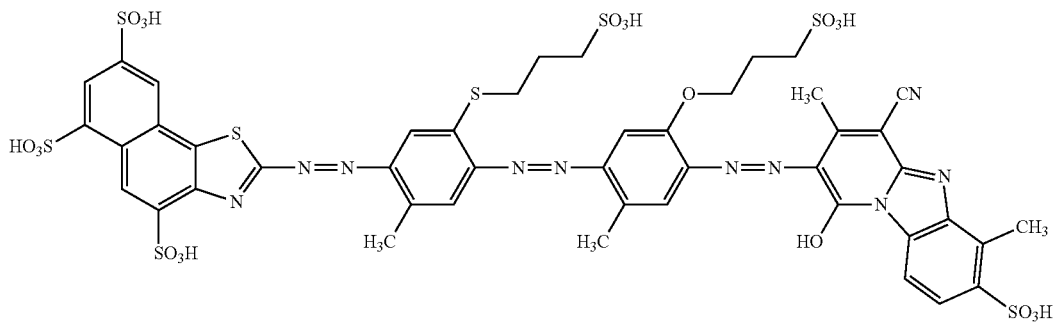 |
| 158 | 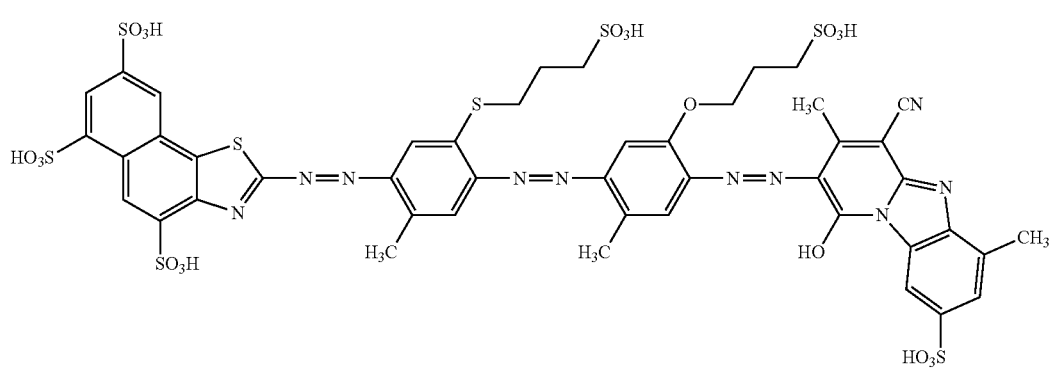 [SMILES: Cc1cc(N=Nc2cc(OCCCS(=O)(=O)O)c(N=Nc3c(C)c(C#N)c4nc5c(C)cc(S(=O)(=O)O)cc5n4c3O)cc2C)c(SCCCS(=O)(=O)O)cc1N=Nc1nc2c(S(=O)(=O)O)cc3c(S(=O)(=O)O)cc(S(=O)(=O)O)cc3c2s1] |
| 159 | 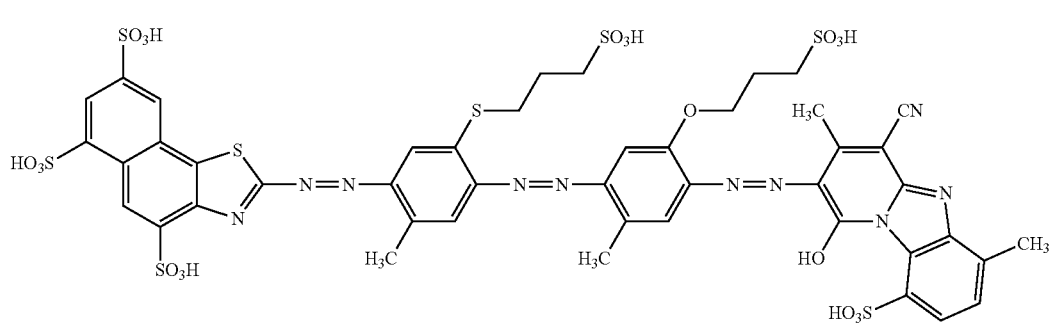 [SMILES: Cc1cc(N=Nc2cc(OCCCS(=O)(=O)O)c(N=Nc3c(C)c(C#N)c4nc5c(C)ccc(S(=O)(=O)O)c5n4c3O)cc2C)c(SCCCS(=O)(=O)O)cc1N=Nc1nc2c(S(=O)(=O)O)cc3c(S(=O)(=O)O)cc(S(=O)(=O)O)cc3c2s1] |
| 160 | 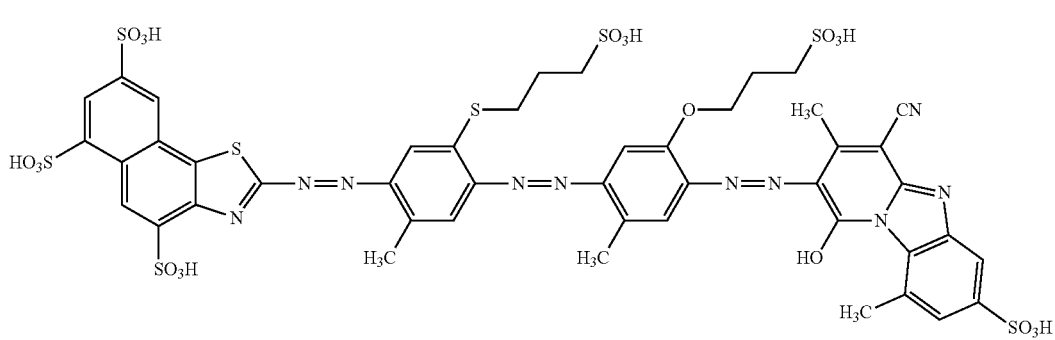 [SMILES: Cc1cc(N=Nc2cc(OCCCS(=O)(=O)O)c(N=Nc3c(C)c(C#N)c4nc5cc(S(=O)(=O)O)cc(C)c5n4c3O)cc2C)c(SCCCS(=O)(=O)O)cc1N=Nc1nc2c(S(=O)(=O)O)cc3c(S(=O)(=O)O)cc(S(=O)(=O)O)cc3c2s1] |

TABLE 25-continued
| Compound No. | Structural Formula |
|---|---|
| 161 | |
| 162 | |
| 163 | |
TABLE 26
| Compound No. | Structural Formula |
|---|---|
| 164 | |
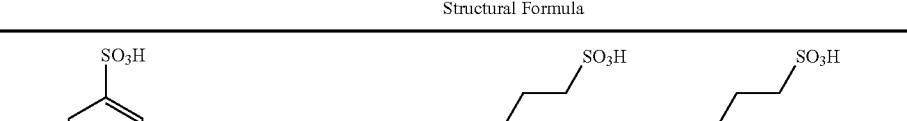

TABLE 26-continued

| Compound No. | Structural Formula |
|---|---|
| 165 | |
| 166 | |
| 167 | |
| 168 | |

TABLE 26-continued

| Compound No. | Structural Formula |
|---|---|
| 169 | (structure) |

TABLE 27

| Compound No. | Structural Formula |
|---|---|
| 170 | (structure) |
| 171 | (structure) |
| 172 | (structure) |

TABLE 27-continued

| Compound No. | Structural Formula |
| --- | --- |
| 173 | |
| 174 | |
| 175 | |

TABLE 28

| Compound No. | Structural Formula |
| --- | --- |
| 176 | |

TABLE 28-continued
| Compound No. | Structural Formula |
|---|---|
| 177 | 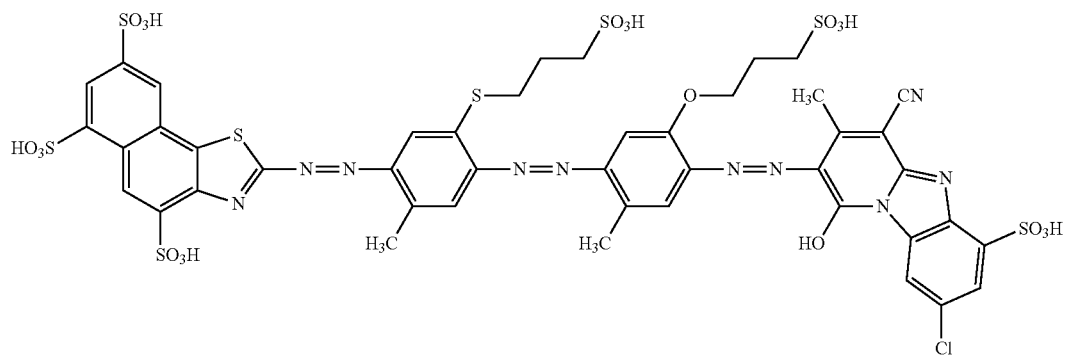 |
| 178 | 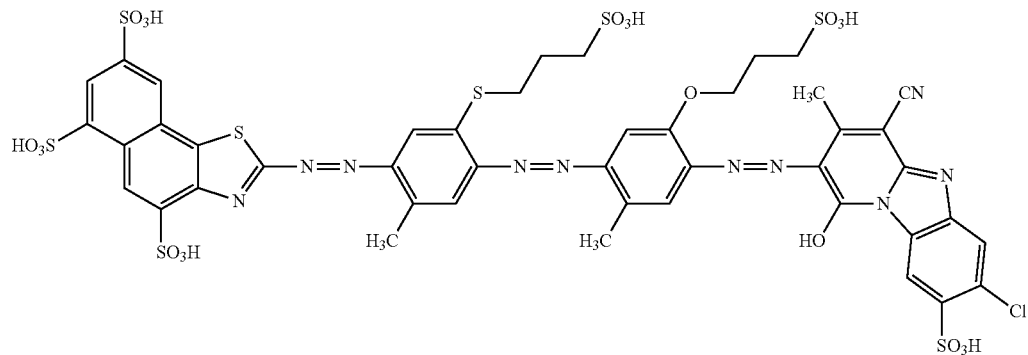 [SMILES: Cc1cc(N=Nc2cc(OCCCS(=O)(=O)O)c(N=Nc3c(C)c(C#N)c4nc5cc(Cl)c(S(=O)(=O)O)cc5n4c3O)cc2C)c(SCCCS(=O)(=O)O)cc1N=Nc1nc2c(S(=O)(=O)O)cc3c(S(=O)(=O)O)cc(S(=O)(=O)O)cc3c2s1] |
| 179 | 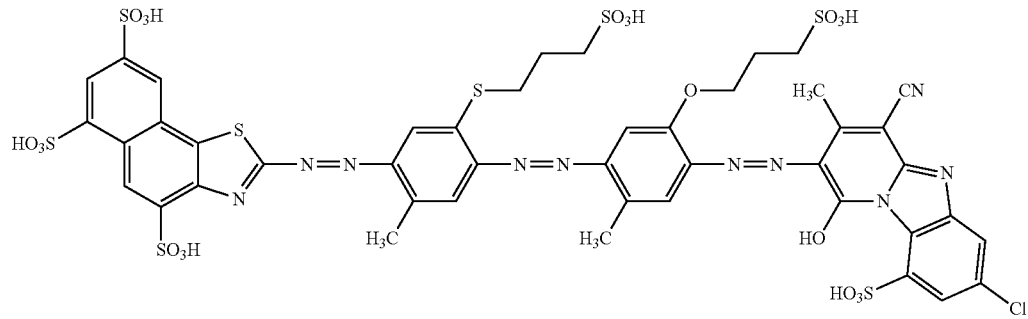 [SMILES: Cc1cc(N=Nc2cc(OCCCS(=O)(=O)O)c(N=Nc3c(C)c(C#N)c4nc5cc(Cl)cc(S(=O)(=O)O)c5n4c3O)cc2C)c(SCCCS(=O)(=O)O)cc1N=Nc1nc2c(S(=O)(=O)O)cc3c(S(=O)(=O)O)cc(S(=O)(=O)O)cc3c2s1] |
| 180 | 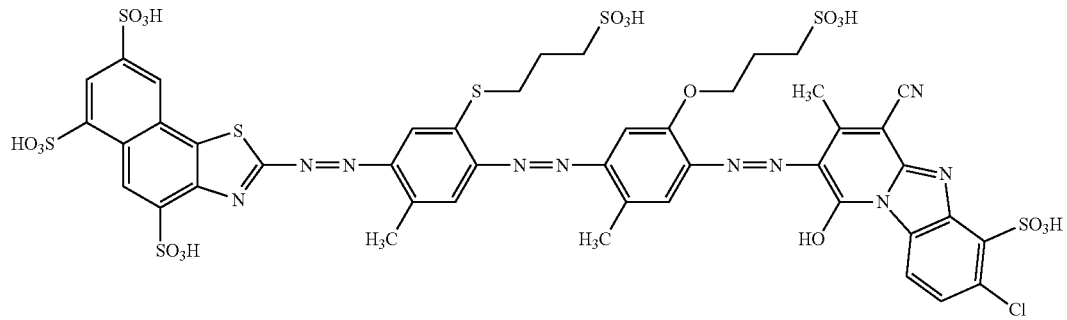 |

TABLE 28-continued

| Compound No. | Structural Formula |
|---|---|
| 181 | (structure) |

TABLE 29

| Compound No | Structural Formula |
|---|---|
| 182 | (structure) |
| 183 | (structure) |
| 184 | (structure) |

TABLE 29-continued
| Compound No | Structural Formula |
|---|---|
| 185 | 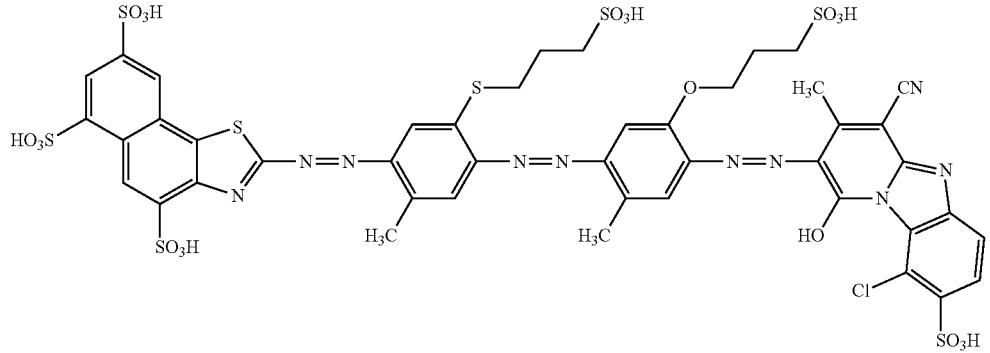 |
| 186 | 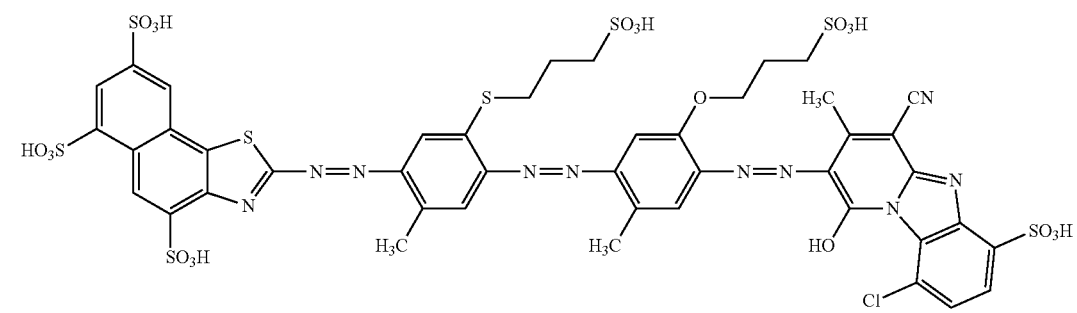 [SMILES: Cc1cc(N=Nc2cc(OCCCS(=O)(=O)O)c(N=Nc3c(C)c(C#N)c4nc5c(S(=O)(=O)O)ccc(Cl)c5n4c3O)cc2C)c(SCCCS(=O)(=O)O)cc1N=Nc1nc2c(S(=O)(=O)O)cc3c(S(=O)(=O)O)cc(S(=O)(=O)O)cc3c2s1] |
| 187 | 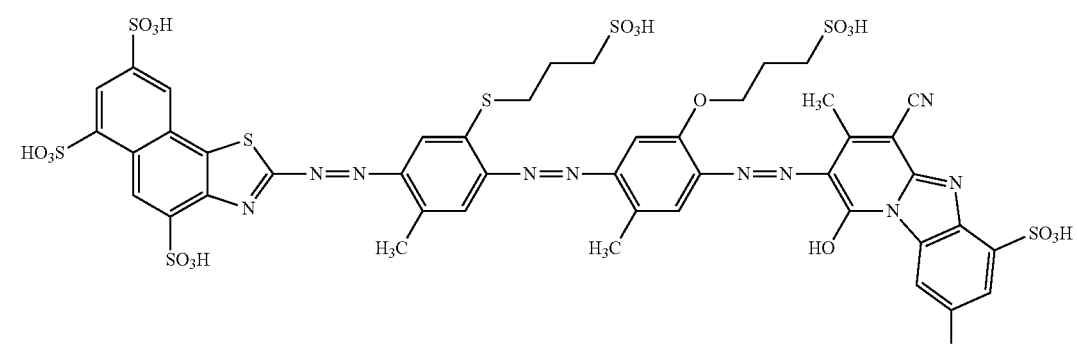 |
| 188 | 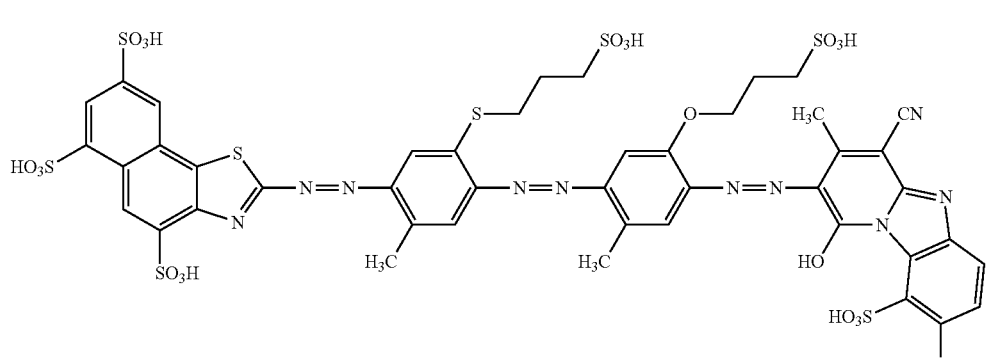 |

TABLE 30

| Compound No. | Structural Formula |
|---|---|
| 189 | 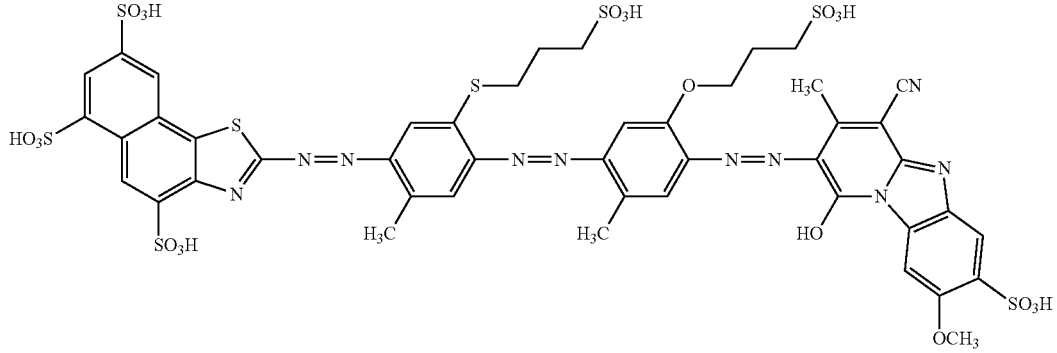 |
| 190 | 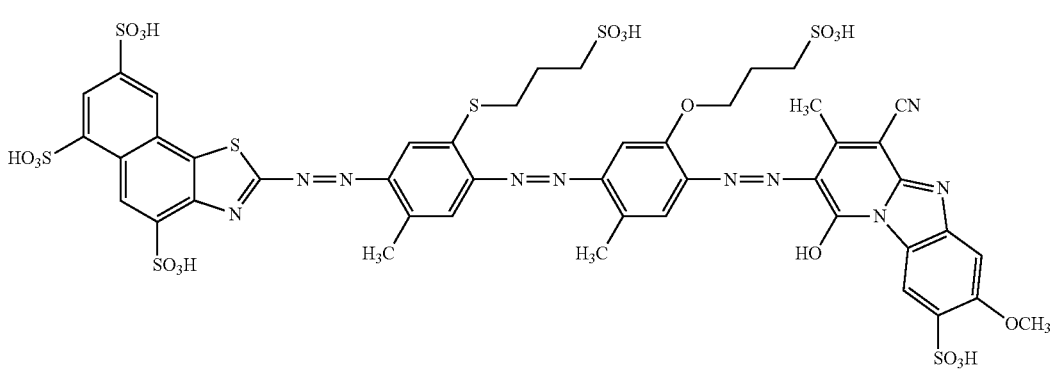 |
| 191 | 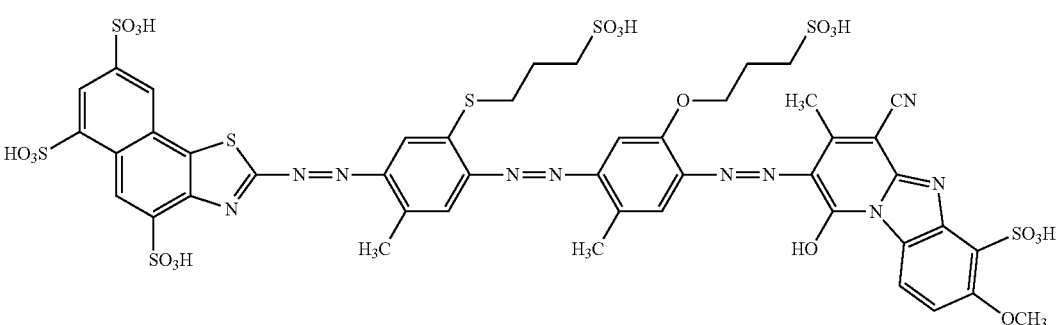 |
| 192 | 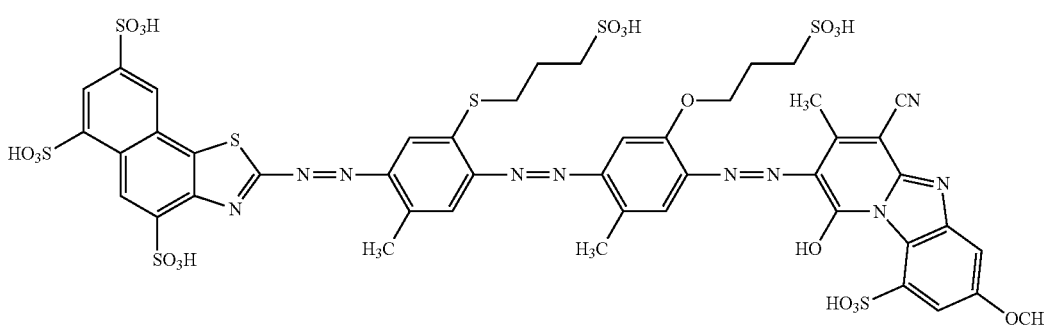 |

Diazotization of the compound represented by the above formula (10) is carried out according to a method well known per se. For example, diazotization is carried out in sulfuric acid, acetic acid or phosphoric acid, at a temperature of, for example −5 to 20° C., and preferably 5 to 10° C. using nitrosyl sulfuric acid. Coupling of the diazotized product of the compound represented by the formula (10) with the compound represented by the formula (11) is also carried out according to a method well known per se. For example, coupling is carried out in water or an aqueous organic medium (mixture of water with a water soluble organic solvent, etc.), at a temperature of, for example, −5 to 30° C., and preferably 10 to 30° C. The compound represented by the formula (10), and the compound represented by the formula (11) are used in approximately stoichiometric amounts.

Diazotization of the compound represented by the formula (12) is also carried out according to a method well known per se. For example, diazotization is carried out in the presence of an inorganic acid such as hydrochloric acid or sulfuric acid in water or an aqueous organic medium, at a temperature of, for example, −5 to 40° C., and preferably 5 to 30° C. using a nitrite salt, for example, a nitrous acid alkali metal salt such as sodium nitrite. Coupling of the diazotized product of the compound represented by the formula (12) with the compound represented by the formula (13) is also carried out under conditions well known per se. It is advantageous to carry out such a coupling reaction in water or an aqueous organic medium, at a temperature of, for example, −5 to 50° C., and preferably 10 to 30° C., and at a pH value of from weakly acidic to alkaline. Preferably coupling is carried out at a pH value of from weakly acidic to weakly alkaline, for example, at a pH of 6 to 10. Since the diazotization reaction liquid is acidic, and the reaction system is further acidified as the coupling reaction proceeds, adjustment to the aforementioned pH value is preferably conducted by adding a base. As the base, for example, an alkali metal hydroxide such as lithium hydroxide or sodium hydroxide, an alkali metal carbonate such as lithium carbonate, sodium carbonate or potassium carbonate, an acetic acid salt such as sodium acetate, ammonia, an organic amine or the like may be used. The compound represented by the formula (12) and the compound represented by the formula (13) are used in approximately stoichiometric amounts.

Diazotization of the compound represented by the formula (14) is also carried out according to a method well known per se. For example, diazotization is carried out in the presence of an inorganic acid such as hydrochloric acid or sulfuric acid in water or an aqueous organic medium (mixture of water with a water soluble organic solvent, etc.), at a temperature of, for example, −5 to 40° C., and preferably 10 to 30° C. using a nitrite salt, for example, a nitrous acid alkali metal salt such as sodium nitrite. Coupling of the diazotized product of the compound represented by the formula (14) with the compound represented by the formula (15) is also carried out under conditions well known per se. For example, it is advantageous to carry out such coupling in water or an aqueous organic medium, at a temperature of, for example, −5 to 50° C., and preferably 10 to 30° C., and at a pH value of from weakly acidic to alkaline. Preferably coupling is carried out at a pH value of from weakly acidic to weakly alkaline, for example, at a pH of 6 to 10, and adjustment of the pH value is conducted by adding a base. As the base, those described above may be used. The compound represented by the formula (14) and the compound represented by the formula (15) are used in approximately stoichiometric amounts.

In order to produce a desired salt of the trisazo compound represented by the above formula (1), after completing the coupling reaction, salting-out may be carried out by adding a desired inorganic salt or organic cation salt to the reaction liquid. Alternatively, a mineral acid such as hydrochloric acid is added to isolate the compound in the form of a free acid, which is washed with water, acidic water, an aqueous organic medium or the like as needed to remove the inorganic salt, and thereafter the free acid is neutralized with a desired inorganic or organic base in an aqueous medium, thereby giving a solution of the corresponding salt. The acidic water referred to herein is, for example, prepared by dissolving a mineral acid such as sulfuric acid or hydrochloric acid, or an organic acid such as acetic acid in water to be acidic. In addition, the aqueous organic medium may be exemplified by organic substances that are miscible with water, or mixtures of water and a so-called organic solvent that is miscible with water and the like (specific examples including water-soluble organic solvents described later, etc.). Examples of the inorganic salt include alkali metal salts such as lithium chloride, sodium chloride and potassium chloride, ammonium salts such as ammonium chloride and ammonium bromide. Examples of the organic cation salt include halogen salts of the quaternary ammonium represented by the formula (9) described above, and the like. Examples of the inorganic base include, for example, hydroxides of alkali metals such as lithium hydroxide, sodium hydroxide and potassium hydroxide, ammonium hydroxides, as well as carbonates of alkali metals such as lithium carbonate, sodium carbonate and potassium carbonate. Examples of the organic base include organic amines, for example, quaternary ammoniums represented by the formula (9) such as diethanolamine and triethanolamine described above, and the like, but not limited thereto.

The ink composition of the present invention is explained below. The ink composition containing the coloring matter of the present invention consisting of at least one type of the trisazo compound represented by the above formula (1) is an aqueous ink composition, and is capable of staining materials composed of cellulose. In addition, staining of materials having a carbon amide bond is also possible, and thus the ink composition can be used extensively for staining leather, textile fabric and paper.

A reaction liquid containing the trisazo compound represented by the above formula (1), for example, a reaction liquid and the like after completing the final step in the process of synthesizing the compound may be used directly for producing the ink composition of the present invention. Additionally, the liquid is first subjected to: drying, for example, spray drying to permit isolation; salting-out by adding an inorganic salt such as sodium chloride, potassium chloride, calcium chloride or sodium sulfate; acid precipitation by adding a mineral acid such as hydrochloric acid, sulfuric acid or nitric acid; or acid-salt precipitation in which the aforementioned salting-out and the acid precipitation are carried out in combination; or the like to isolate the trisazo compound, and an ink composition may be prepared using the same.

The ink composition of the present invention contains the coloring matter of the present invention in an amount of usually 0.1 to 20% by mass, preferably 1 to 10% by mass, and more preferably 2 to 8% by mass. The ink composition of the present invention may further contain a water soluble organic solvent in an amount of, for example, 0 to 30% by mass, and an ink preparation agent in an amount of, for example, 0 to 10% by mass, with the rest being water.

Moreover, other coloring matter may be also contained for the purpose of adjusting black hue, i.e., for the purpose of color toning, generally referred to, and the like as desired, within the range not to impair the effects of the present invention. Also in this case, the total mass of the coloring matters including the coloring matter for adjusting the color contained in the total mass of the ink composition may fall within the above range.

It is to be noted that the pH of the ink composition is preferably 5 to 11, and more preferably 7 to 10 in light of improvement of the storage stability. Moreover, the surface tension of the ink composition is preferably 25 to 70 mN/m, and more preferably 25 to 60 mN/m. Furthermore, the viscosity of the ink composition is preferably no greater than 30 mPa·s, and more preferably no greater than 20 mPa·s. The pH and the surface tension of the ink composition of the present invention may be adjusted appropriately with the pH adjusting agent or surfactant as described later.

The ink composition of the present invention is prepared by dissolving the coloring matter of the present invention in water or a water soluble organic solvent (organic solvent that is miscible with water), and adding thereto an ink preparation agent as needed. For the purpose of preparing a black ink composition that is purely black and neutral, and the like, other coloring matter for adjusting the color, etc., may be added appropriately as described above. When the ink composition is used as an ink for ink jet recording, one having the content of inorganic impurities such as metal cation chlorides (for example, sodium chloride) and sulfuric acid salts (for example, sodium sulfate) in the coloring matter of the present invention as low as possible is preferably used. The reference standard of the content of the inorganic impurities is about no greater than 1% by mass relative to the total mass of the coloring matter, and the lower limit may be no greater than the detection limit of the analytical instrument, i.e., 0%. For producing the coloring matter of the present invention having a lower content of inorganic impurities, a desalting treatment may be carried out by, for example, a common method with a reverse osmosis membrane, a method in which a dried matter or wet cake of the coloring matter is stirred in a mixed solvent of an alcohol such as methanol with water, and separating the deposited matter by filtration, followed by drying, or the like.

Specific examples of the water soluble organic solvent which can be used in preparing the ink composition include, for example, C1-C4 alkanols such as methanol, ethanol, propanol, isopropanol, butanol, isobutanol, secondary butanol and tertially butanol; carboxylic amides such as N,N-dimethyl formamide and N,N-dimethylacetamide; lactams such as 2-pyrrolidone, N-methyl-2-pyrrolidone and N-methylpyrrolidin-2-one; cyclic ureas such as 1,3-dimethylimidazolidin-2-one and 1,3-dimethylhexahydropyrimid-2-one; ketones or ketoalcohols such as acetone, methyl ethyl ketone and 2-methyl-2-hydroxypentan-4-one; cyclic ethers such as tetrahydrofuran and dioxane; mono-, oligo-, or poly-alkylene glycols or thioglycols having a C2-C6 alkylene unit such as ethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene glycol, polypropylene glycol, thiodiglycol and dithiodiglycol; polyol (triol) such as glycerin and hexane-1,2,6-triol; C1-C4 alkyl ethers of polyhydric alcohols such as ethylene glycol monomethyl ether, ethylene glycol monoethyl ether, diethylene glycol monomethyl ether, diethylene glycol monoethyl ether, diethylene glycol monobutyl ether(butylcarbitol)triethylene glycol monomethyl ether and triethylene glycol monoethyl ether; γ-butyrolactone, dimethyl sulfoxide, and the like. These organic solvents may be used alone, or two or more of them may be used in combination.

Of these, isopropanol, N-methyl-2-pyrrolidone, glycerin, butylcarbitol and the like are preferred.

As the ink preparation agent which may be appropriately used in preparing the ink composition, for example, a preservative and fungicide, a pH adjusting agent, a chelating agent, a rust-preventive agent, a water soluble ultraviolet ray absorbing agent, a water soluble polymer compound, a coloring matter solubilizer, an antioxidant, a surfactant, and the like may be included. These agents are explained in the following.

Specific examples of the fungicide include sodium dehydroacetate, sodium benzoate, sodium pyridinethion-1-oxide, p-hydroxybenzoic acid ethyl ester, 1,2-benzisothiazolin-3-one and salts thereof, and the like.

Specific examples of the preservative include, for example, organic sulfur based, organic nitrogen sulfur based, organic halogen based, haloaryl sulfone based, iodopropargyl based, N-haloalkylthio based, nitrile based, pyridine based, 8-oxyquinoline based, benzothiazole based, isothiazoline based, dithiol based, pyridineoxide based, nitropropane based, organic tin based, phenol based, quaternary ammonium salt based, triazine based, triazine based, anilide based, adamantane based, dithiocarbamate based, brominated indanone based, benzyl bromo acetate based, or inorganic salt based compounds, and the like. Specific examples of the organic halogen based compound include, for example, pentachlorophenol sodium; specific examples of the pyridineoxide based compound include, for example, 2-pyridinethiol-1-oxide sodium; and specific examples of the isothiazoline based compound include, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride, and the like. Specific examples of the other preservative and fungicide include anhydrous sodium acetate, sodium sorbate, sodium benzoate, and the like.

As the pH adjusting agent, any arbitrary substance may be used as long as it can adjust the pH of the ink to fall within the range of, for example, 5 to 11 without adversely affecting the prepared ink. Specific examples thereof include, for example, alkanolamines such as diethanolamine, triethanolamine and N-methyldiethanolamine; hydroxides of alkali metals such as lithium hydroxide, sodium hydroxide and potassium hydroxide; ammonium hydroxide (aqueous ammonia); carbonates of alkali metals such as lithium carbonate, sodium carbonate, sodium bicarbonate and potassium carbonate; alkali metal salts of organic acids such as sodium silicate and potassium acetate; inorganic bases such as disodium phosphate, and the like.

Specific examples of the chelating agent include, for example, sodium ethylenediamine tetraacetate, sodium nitrilotriacetate, sodium hydroxyethylethylenediamine triacetate, sodium diethylenetriamine pentaacetate, sodium uracil diacetate, and the like.

Specific examples of the rust-preventive include, for example, acidic sulfite, sodium thiosulfate, ammonium thioglycolate, diisopropylammonium nitrite, pentaerythritol tetranitrate, dicyclohexylammonium nitrite, and the like.

Specific examples of the water soluble ultraviolet ray absorbing agent include, for example, sulfonated benzophenone based compounds, benzotriazole based compounds, salicylic acid based compounds, cinnamic acid based compounds, and triazine based compounds.

Specific examples of the water soluble polymer compound include polyvinyl alcohols, cellulose derivatives, polyamines, polyimines, and the like.

Specific examples of the coloring matter solubilizer include, for example, ε-caprolactam, ethylene carbonate, urea, and the like.

Specific examples of the antioxidant which may be used include, for example, various types of organic and metal complex based discoloration-preventive agents. Examples of the organic discoloration-preventive agent include hydroquinones, alkoxyphenols, dialkoxyphenols, phenols, anilines, amines, indanes, chromanes, alkoxyanilines, hetero rings, and the like.

Specific examples of the surfactant include, for example, anion based, cation based, or nonionic well-known surfactants, and the like.

Specific examples of the anionic surfactant include alkylsulfonic acid salts, alkylcarboxylic acid salts, α-olefin sulfonic acid salts, polyoxyethylenealkyl ether acetic acid salts, N-acylamino acid and salts thereof, N-acylmethyltaurine salts, alkylsulfuric acid salts, polyoxyalkyl ether sulfuric acid salts, alkylsulfuric acid salts, polyoxyethylenealkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, dioctyl sulfosuccinic acid salts, and the like.

Specific examples of the cationic surfactant include 2-vinylpyridine derivatives, poly(4-vinylpyridine) derivatives, and the like.

Specific examples of the amphoteric surfactant include lauryldimethylamino acetate betaine, 2-alkyl-N-carboxymethyl-N-hydroxyethylimidazolinium betaine, coconut oil fatty acid amidopropyldimethylamino acetate betaine, polyoctylpolyaminoethylglycine, imidazoline derivatives, and the like.

Specific examples of the nonionic surfactant include: ether based surfactants such as polyoxyethylene nonylphenyl ether, polyoxyethylene octylphenyl ether, polyoxyethylene dodecyl phenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene alcohol based surfactants such as 2,4,7,9-tetramethyl-5-decyne-4,7-diol, 3,6-dimethyl-4-octyne-3,6-diol and 3,5-dimethyl-1-hexin-3-ol; and other specific examples include trade names Surfynol 104, 105, 82, 465, Olfin STG manufactured by Nissin Chemical Co., Ltd., and the like.

These ink preparation agents may be used either alone or as a mixture.

The ink composition of the present invention is obtained by mixing the aforementioned each component in an arbitrary order, followed by stirring. Thus obtained ink composition may be filtrated through a membrane filter or the like if necessary in order to eliminate contaminants. Moreover, for the purpose of adjusting the black color and the like, the ink composition of the present invention may contain in addition to the coloring matter of the present invention other coloring matter having a variety of hues. In such an instance, a coloring matter of black having other hue, as well as yellow (for example, C.I. Direct Yellow 34, C.I. Direct Yellow 58, C.I. Direct Yellow 86, C.I. Direct Yellow 132, C.I. Direct Yellow 161, etc.), orange (for example, C.I. Direct Orange 17, C.I. Direct Orange 26, C.I. Direct Orange 29, C.I. Direct Orange 39, C.I. Direct Orange 49, etc.), brown, scarlet (for example, C.I. Direct Red 89, etc.), red (for example, C.I. Direct Red 62, C.I. Direct Red 75, C.I. Direct Red 79, C.I. Direct Red 80, C.I. Direct Red 84, C.I. Direct Red 225, C.I. Direct Red 226, etc.), magenta (for example, C.I. Direct Red 227, etc.), violet, blue, navy, cyan, green, or the other colors may be used by mixing. The ink composition of the present invention can be used in a variety of fields, and is suitable for aqueous writing inks, aqueous printing inks, information recording inks and the like.

The ink composition of the present invention can be used in a variety of fields, and is suitable for aqueous writing inks, aqueous printing inks, information recording inks and the like. In particular, the ink composition is preferably used as an ink for ink jet recording, and is suitably used in the ink jet recording method of the present invention described below.

The ink jet recording method of the present invention is explained below. In the ink jet recording method of the present invention, recording is carried out using as an ink the ink composition of the present invention by discharging ink droplets of the ink in response to recording signals to attach on a record-receiving material. The ink nozzle etc., used in recording is not particularly limited, and may be selected appropriately in accordance with the purpose.

Well-known methods, for example, a charge control system in which an ink is discharged using an electrostatic attractive force; a drop-on-demand system (pressure pulse system) in which a vibration pressure of a piezo element is used; an acoustic ink jet system in which electric signals are converted into acoustic beam, which is irradiated onto an ink, and allowing the ink to be discharged utilizing the irradiation pressure; a thermal ink jet, i.e., a bubble-jet (registered trademark) system in which an ink is heated to from bubbles and the resulting pressure is utilized; and the like may be employed as the recording method.

It is to be noted that the ink jet recording method also includes a system in which an ink having a low coloring matter concentration (coloring matter content) in the ink referred to as photo ink is ejected in a large number of droplets having a small volume; a system in which a plurality of inks having substantially the same hue and different coloring matter concentration in the ink are used to improve the image quality; a system in which a colorless transparent ink is used, and the like.

The colored body of the present invention is a substance that was colored with the coloring matter of the present invention or the ink composition containing the same, and is preferably a record-receiving material which was colored with the ink composition of the present invention according to the ink jet recording method using an ink jet printer.

The record-receiving materials which can be colored are not particularly limited, but, for example, communication sheets such as a paper or film, a fiber or cloth (cellulose, nylon, wool, etc.), leather, substrates for color filters are exemplified, and of these, communication sheets are preferred.

The communication sheet is preferably obtained by subjecting a base material to a surface treatment, and specifically obtained by providing an ink receiving layer on a base material such as paper, synthetic paper, films and the like. The ink receiving layer is provided by, for example: a method in which a cation based polymer is impregnated in or coated on the aforementioned base material; a method in which inorganic fine particles that can absorb a coloring matter in an ink such as porous silica, alumina sol or special ceramics are coated on the surface of the aforementioned base material together with a hydrophilic polymer such as polyvinyl alcohol or polyvinylpyrrolidone; or the like. Such sheets provided with an ink receiving layer are generally referred to as ink jet exclusive paper, ink jet exclusive film, glossy paper, glossy film, and the like.

Among the aforementioned communication sheets, sheets coated with a porous white inorganic substance on the surface thereof have particularly high surface glossiness, as well as superior water resistance, and thus particularly suited for recording of photographic images. On the other hand, it is known that the images recorded thereon are subject to significant discoloration due to ozone gas. However, since the ink composition of the present invention has superior ozone gas resistance, a particularly significant effect is achieved when used for ink jet recording on such record-receiving materials.

Examples of typical commercially available product of the sheets coated with the porous white inorganic substance as described above on the surface thereof include trade names: Professional Photo Paper, Super Photo Paper, Gloss Gold and Matte Photo Paper manufactured by Canon, Inc.; trade names: Photo Paper CRISPIA (Super Glossy), Photo Paper (Glossy), and Photo Matte Paper manufactured by Seiko Epson Corporation; trade name: Advanced Photo Paper (Glossy) manufactured by Hewlett-Packard Japan, Ltd.; trade name: KASSAI SHASHIN-SHIAGE Pro manufactured by FUJIFILM Corporation; and the like.

For recording on a record-receiving material such as a communication sheet with the ink jet recording method of the present invention, for example, a vessel containing the ink composition is attached at a specified position of an ink jet printer, and the recording may be executed by a conventional method on the record-receiving material.

In the ink jet recording method of the present invention, the black ink composition of the present invention, and, for example, also ink compositions of each well-known color such as magenta, cyan, yellow, and if necessary, green, blue (or violet), red (or orange) and the like may be used in combination.

The ink compositions of each color are filled in each of the vessels, respectively, and each of the vessels is loaded on prescribed position of an ink jet printer similarly to the vessel containing the black ink composition of the present invention, and used for ink jet recording.

The coloring matter of the present invention can be easily synthesized at low costs. In addition, it is highly soluble in media containing water as a principal component and is superior in water solubility; therefore, favorable filterability through membrane filters can be achieved in the process of producing ink compositions.

The ink composition containing the coloring matter or the ink prepared from the ink composition can be superior in stability during storage and discharge stability. In other words, the ink composition of the present invention containing the coloring matter exhibits favorable storage stability, without occurrence of solid deposition, physical property alteration, hue change and the like even though stored for a long period of time.

Also, the ink composition containing the coloring matter is suitably used for ink jet recording, for use in writing instruments. In particular, when recorded on an exclusive ink jet paper, very high print density of the recorded image is achieved without occurrence of bronzing of the image even if printed with a high-concentration solution, and further various types of fastness properties, particularly both light resistance and ozone gas resistance, are attained.

Additionally, by using in combination with other ink compositions each containing magenta, cyan, and yellow coloring matters, full-color ink jet recording that is superior in various types of fastness and also superior in storability is enabled, and use on a plain paper is permitted as a matter of course.

Accordingly, the coloring matter and the ink composition of the present invention are extremely useful as a black ink for ink jet recording.

EXAMPLES

Hereinafter, the present invention is explained in more detail by way of Examples, but the present invention is not in any way limited to the following Examples.

In Examples, the expressions "part" and "%" are on the basis of the mass unless otherwise stated particularly, and each operation of synthetic reaction, crystallization and the like was carried out while stirring also unless otherwise stated particularly. When the intended compound in a required amount was not obtained by carrying out the synthesis reaction once, the reaction was repeated until the compound in the required amount was obtained.

Furthermore, in each of the following formulae, functional groups such as sulfo and carboxy are represented in the form of their free acids for the sake of simplicity.

In addition, any of pH values and reaction temperatures described in Examples represents the value measured in the reaction system.

Furthermore, the wavelength of maximum absorption (λmax) of synthesized compounds was measured in an aqueous solution having a pH of 7 to 8, and thus measured value is appended to the measured compounds described in Examples.

It should be noted that any of the synthesized trisazo compound exhibited a solubility in water of no less than 100 g/L.

Example 1

(Step 1)

To 60 parts of N-methylpyrrolidone were added 17.3 parts of 4-chloro-3-nitroaniline, and 12.3 parts of acetic anhydride were added thereto dropwise at 10° C. to 20° C. over about 5 min. After the reaction was allowed at the same temperature for 1 hour, the reaction liquid was added dropwise to 70 parts of ice water over about 5 min. The deposited solid was separated by filtration, and dried to obtain a compound represented by the following formula (16). To the obtained compound were added 22.0 parts of sodium 3-mercaptopropane sulfonate and 60 parts of dimethyl sulfoxide, and the mixture was heated to 60° C. and thereto were added 11.2 parts of sodium carbonate. Subsequently, the reaction liquid was heated to 120 to 130° C., and the mixture was stirred at the same temperature for 6 hrs. After the reaction liquid was cooled to room temperature, the liquid was added to 330 parts of 2-propanol. The deposited solid was separated by filtration, and washed with 100 parts of 2-propanol. After thus obtained solid were added to 300 parts of water, the pH value was adjusted to 7.0 to 7.5 with 35% hydrochloric acid. Then, salting-out was carried out by adding sodium chloride, and the precipitated matter was separated by filtration to obtain 80.6 parts of a wet cake containing a compound represented by the following formula (17). To the obtained wet cake were added 170 parts of water, 1.8 parts of activated charcoal and 0.4 parts of anhydrous ferric chloride, and 15 parts of 80% hydrazine monohydrate were added thereto dropwise at 70° C. to 80° C. over about 30 min. After completing the dropwise addition, the temperature of the reaction liquid was elevated to 85° C. to 95° C., and the reaction liquid was stirred for 3 hrs, followed by cooling to room temperature. After the insoluble matter was separated by filtration, acid precipitation was carried out by adding 50% sulfuric acid to the filtrate, and the resulting deposited solid was separated by filtration to obtain 68.0 parts of a wet cake containing a compound represented by the following formula (18).

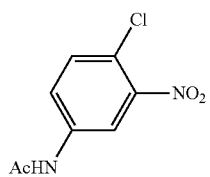

(16)

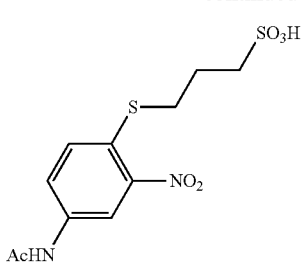

(17)

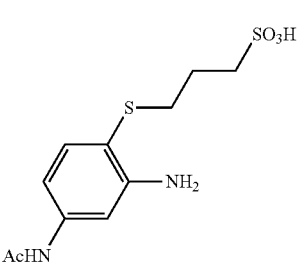

(18)

(Step 2)

In 260 parts of methanol was dissolved 29.2 parts of potassium thiocyanate, and then 26 parts of sulfuric acid and 30.4 parts of 2-aminonaphthalene-5,7-disulfonic acid were added thereto. To the obtained solution were added dropwise 34 parts of 35% hydrogen peroxide water, and the mixture was stirred at 55 to 60° C. for 1 hour. After cooling to 20° C., 70 parts of 28% aqueous ammonia were added, and the deposited solid was separated by filtration to obtain 28.8 parts of a compound represented by the following formula (19).

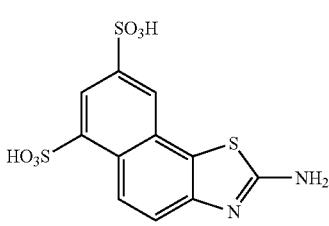

(19)

(Step 3)

After 18.1 parts of the compound represented by the above formula (19) were slowly added into 180 parts of 30% fuming sulfuric acid at 20 to 25° C., the temperature was elevated to 160° C., and then the mixture was stirred at the same temperature for 1 hour. The reaction liquid was added dropwise into 158 parts of ice water over about 15 min to obtain a solution containing a compound represented by the following formula (20). To this solution were added 6.3 parts of 60% nitric acid, and 19.1 parts of 40% nitrosyl sulfuric acid were added dropwise at 5 to 10° C. over about 10 min, followed by allowing for the reaction for 1 hour to obtain a diazo reaction liquid.

An aqueous solution was obtained by adding 44.0 parts of the wet cake containing the compound represented by the above formula (18) and 2.0 parts of sulfamic acid to water 200 parts, and then adding sodium hydroxide to adjust the pH to 5.0 to 5.5.

To thus obtained aqueous solution was added dropwise the aforementioned diazo reaction liquid at a reaction temperature of 20 to 30° C. over about 20 min.

After completing the dropwise addition, the liquid was stirred at the same temperature for 1 hour, and 800 parts of acetone were added thereto. Then, the deposited solid was separated by filtration to obtain a wet cake containing a compound represented by the following formula (21).

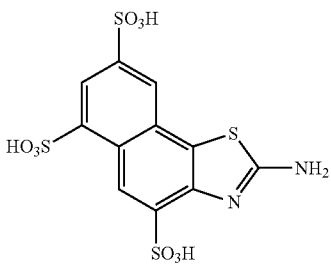

(20)

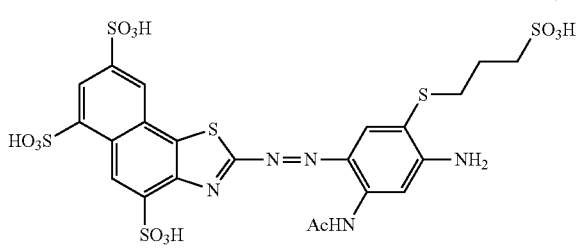

(21)

(Step 4)

An aqueous solution was obtained by adding the entirety of the wet cake containing the compound represented by the formula (21) obtained in the above Step 3 to 110 parts of water, and adjusting the pH to 7.0 to 7.5 with sodium hydroxide. To thus obtained aqueous solution were added dropwise 4.6 parts of 35% hydrochloric acid, and subsequently 4.6 parts of a 40% aqueous sodium nitrite solution at a reaction temperature of 15 to 20° C. over about 5 min, followed by allowing for the reaction for 1 hour to obtain a diazo reaction liquid. To the obtained diazo reaction liquid were added 1.2 parts of sulfamic acid, and the mixture was stirred for about 5 min.

On the other hand, an aqueous solution was obtained by adding 4.9 parts of a compound represented by the following formula (22) to 35 parts of water, and subsequently adjusting the pH to 5.0 to 5.5 by adding sodium hydroxide. To this aqueous solution was added dropwise the diazo reaction liquid obtained as described above at a reaction temperature of 20° C. to 30° C. over 20 min. During this procedure, sodium carbonate was added into the reaction system to maintain the pH value at 5.0 to 6.0.

After completing the dropwise addition, the mixture was stirred at the same temperature for 2 hrs. Then, salting-out was carried out by adding sodium chloride, and the deposited solid was separated by filtration to obtain 24.4 parts of a wet cake containing a compound represented by the following formula (23).

The compound represented by the following formula (22) was obtained according to a method disclosed in Japanese Unexamined Patent Application, Publication No. 2004-083492.

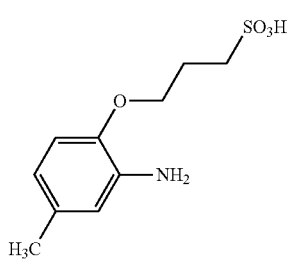

(22)

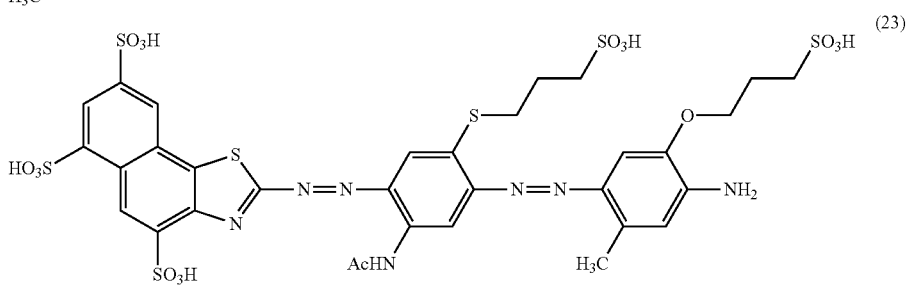

(23)

(Step 5)

In 300 parts of methanol were dissolved 15.2 parts of 2-methyl-6-nitroaniline. The solution thus obtained was transferred into an autoclave, and thereto were added 2.0 parts of 5% Pd/carbon. After allowing for the reaction while stirring at 20° C. to 30° C. under a hydrogen partial pressure of 0.2-0.5 MPa until absorption of hydrogen ceased, the reaction was further continued for 30 min at the same temperature. The catalyst (5% Pd/carbon) was separated by filtration to obtain a solution (filtrate) containing a compound represented by the following formula (24).

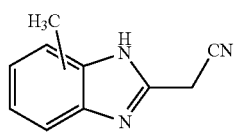

(24)

(Step 6)

To 200 parts of the solution containing the compound represented by the above formula (24) were added 13.0 parts of a compound represented by the formula (25), and the mixture was refluxed for 30 min while stirring. Thereafter, the reaction liquid was vacuum-concentrated, and 150 parts of water, then sodium carbonate were added thereto, whereby the pH was adjusted to 7.0 to 7.5. The deposited solid was separated by filtration and dried to obtain 8.4 parts of a compound represented by the following formula (26).

The compound represented by the following formula (25) was obtained by a method disclosed in Patent Document 11.

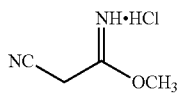

(25)

-continued

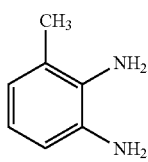

(26)

(Step 7)

To 100 parts of ethanol were added 8.4 parts of the compound represented by the above formula (26) and 12.3 parts of 28% sodium methoxide, and then 7.4 parts of methyl acetoacetate. The mixture was refluxed for 30 min, followed by vacuum concentration of ethanol. Thereto were added 150 parts of water, and then the pH was adjusted to 7.0 to 7.5 by adding 35% hydrochloric acid. The deposited solid was separated by filtration and dried to obtain 10.0 parts of a compound represented by the following formula (27). In the compound represented by the following formula (27), a methyl group is substituted at position "a".

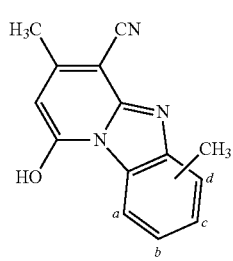

(27)

(Step 8)

After 5.0 parts of the compound represented by the above formula (27) were slowly added into 102 parts of 3% fuming sulfuric acid at 5 to 10° C., the mixture was stirred at the same temperature for 1 hour. The reaction liquid was added dropwise into 240 parts of ice water over about 10 min, and the deposited solid was separated by filtration to obtain 14.7 parts of a wet cake containing a compound represented by the following formula (28). In the compound represented by the following formula (28), a methyl group is substituted at position "a", and the sulfo group is substituted at position of "c".

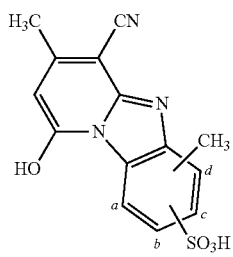

(28)

(Step 9)

In 90 parts of water were dissolved 19.5 parts of the wet cake containing the compound represented by the formula (23) obtained in the above Step 4, and thereto were added dropwise 8.4 parts of 35% hydrochloric acid, and subsequently 1.8 parts of a 40% aqueous sodium nitrite solution at a reaction temperature of 20 to 25° C. over about 5 min, followed by allowing for the reaction for 30 min to obtain a diazo reaction liquid. To the obtained diazo reaction liquid were added 0.5 parts of sulfamic acid, and the mixture was stirred for about 5 min.

On the other hand, a liquid was obtained by adding 6.5 parts of the wet cake containing the compound represented by the above formula (28) to 55 parts of water, and adjusting the pH to 7.5 to 8.0 with sodium hydroxide. To this liquid was added dropwise the diazo reaction liquid obtained as described above at a reaction temperature of 20 to 30° C. over 30 min. During this procedure, sodium carbonate was added into the reaction system to maintain the pH value at 7.0 to 8.0.

After completing the dropwise addition, the mixture was stirred at the same temperature for 2 hrs. Then, salting-out was carried out by adding sodium chloride, and the deposited solid was separated by filtration to obtain a wet cake. Thus obtained wet cake was dissolved in 100 parts of water, and thereto were added 200 parts of methanol, followed by separation of the deposited solid by filtration to obtain a wet cake. Thus obtained wet cake was again dissolved in 120 parts of water, and 200 parts of methanol were added thereto. Thereafter, the deposited solid was separated by filtration, and dried to obtain the coloring matter of the present invention consisting of 7.2 parts of a sodium salt of a compound represented by the following formula (29). The obtained coloring matter consisted of the compound represented by the following formula (29) in which a methyl group is substituted at position "a", and the sulfo group is substituted at position "c". λmax: 588.5 nm.

Example 2

(Step 1)

In 300 parts of methanol were dissolved 15.2 parts of 2-methyl-6-nitroaniline. The solution thus obtained was transferred into an autoclave, and thereto were added 2.0 parts of 5% Pd/carbon. After allowing for the reaction at 20° C. to 30° C. under a hydrogen partial pressure of 0.2-0.5 MPa until absorption of hydrogen ceased, the reaction was further continued for 30 min at the same temperature. The catalyst (5% Pd/carbon) was separated by filtration to obtain a solution (filtrate) containing a compound represented by the following formula (30).

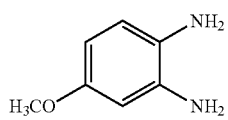

(30)

(Step 2)

To 200 parts of a solution containing the compound represented by the above formula (30) obtained in the above Step 1 were added 13.0 parts of the compound represented by the above formula (25), and the mixture was refluxed for 30 min. Thereafter, methanol was vacuum-concentrated, and 100 parts of water, then sodium carbonate were added thereto, whereby the pH was adjusted to 7.0 to 7.5. The deposited solid was separated by filtration and dried to obtain 8.3 parts of a compound represented by the following formula (31).

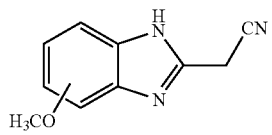

(31)

(Step 3)

To 100 parts of ethanol were added 8.3 parts of the compound represented by the above formula (31), and 12.0 parts of 28% sodium methoxide, and then 7.2 parts of methyl acetoacetate. The mixture was refluxed for 30 min, followed by vacuum concentration of ethanol. Thereto were added 100 parts of water, and then the pH was adjusted to 7.0 to 7.5 by adding 35% hydrochloric acid. The deposited solid was separated by filtration and dried to obtain 11.1 parts of the com-

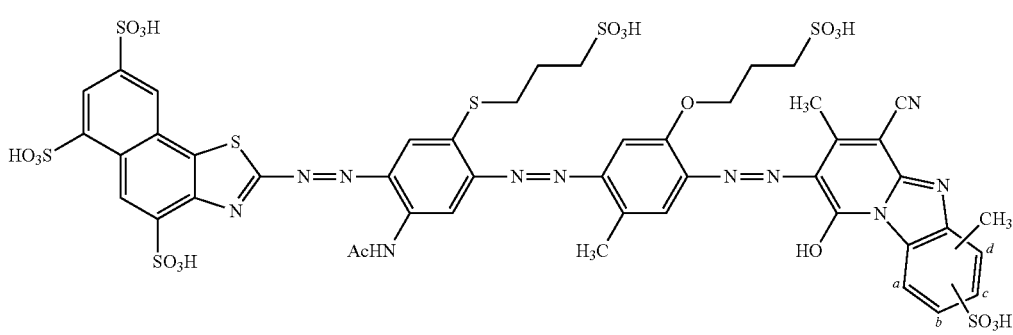

(29)

pound represented by the following formula (32). The obtained compound represented by the following formula (32) was a mixture of compounds in which a methoxy group is substituted each at position "b" or "c".

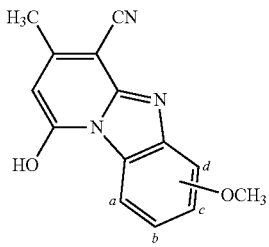

(32)

(Step 4)

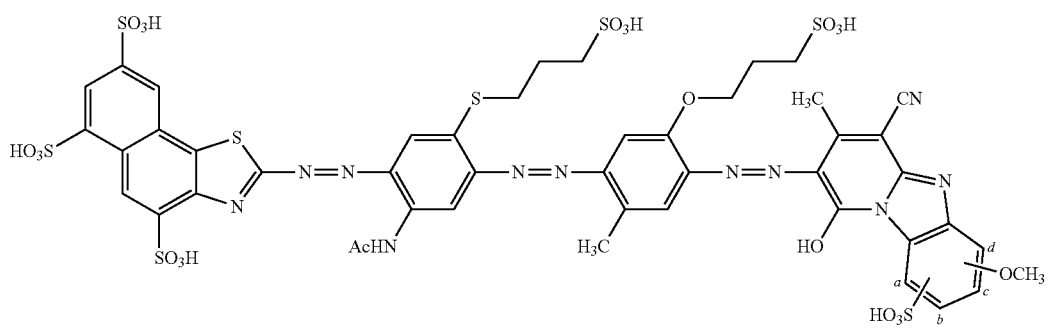

After 5.6 parts of the compound represented by the above formula (32) were slowly added into 77 parts of 8% fuming sulfuric acid at 5 to 10° C., the reaction was allowed at the same temperature for 1.5 hrs. The reaction liquid was added dropwise into 150 parts of ice water over about 10 min, and the mixture was stirred at 65 to 70° C. for 30 min. Thereafter, the deposited solid was separated by filtration to obtain 24.4 parts of a wet cake containing a compound represented by the following formula (33). The compound represented by the following formula (33) was a mixture of compounds in which a methoxy group is substituted at position "b", and the sulfo group is substituted at position "a", "c" or "d", or a methoxy group is substituted at position "c", and the sulfo group is substituted at position "a", "b" or "d".

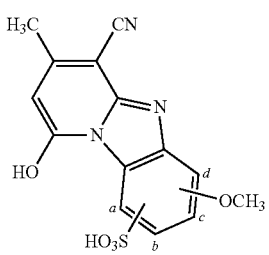

(33)

(Step 5)

The coloring matter of the present invention consisting of 7.0 parts of a sodium salt of a compound represented by the following formula (34) was obtained in a similar manner to Example 1 (Step 9) except that 7.2 parts of the wet cake containing the compound represented by the formula (33) obtained in the above Step 4 were used in place of 6.5 parts of the wet cake containing the compound represented by the formula (28) in the Step 9 of Example 1. The obtained coloring matter was a mixed coloring matter consisting of 2 to 6 types of compounds represented by the following formula (34) in which a methoxy group is substituted at position "b", and the sulfo group is substituted at position "a", "c" or "d", or a methoxy group is substituted at position "c", and the sulfo group is substituted at position "a", "b" or "d". λmax: 602.5 nm.

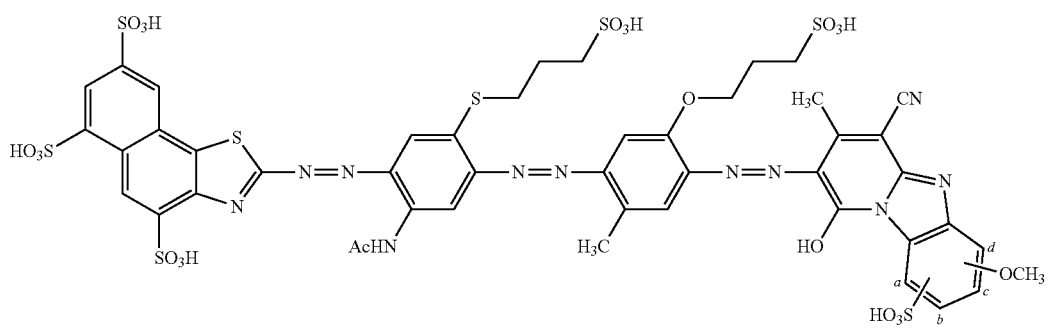

Example 3

(Step 1)

To 7.4 parts of 4-chloro-1,2-phenylenediamine were added 25.0 parts of the compound represented by the above formula (25), and the mixture was refluxed for 1 hour. Thereafter, methanol was vacuum-concentrated, and 250 parts of water, then sodium carbonate were added thereto, whereby the pH was adjusted to 7.0 to 7.5. The supernatant liquid was removed by decantation, and the residue was dried to obtain 7.7 parts of a compound represented by the following formula (35).

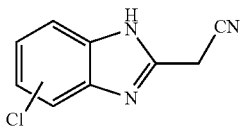

(35)

(Step 2)

To 100 parts of isopropanol were added 7.7 parts of the compound represented by the above formula (35), 10.5 parts of 28% sodium methoxide, and then 6.3 parts of methyl acetoacetate. The mixture was refluxed for 30 min while stirring, and then the deposited solid was separated by filtration to obtain 16.7 parts of a wet cake containing a compound represented by the following formula (36). The compound represented by the following formula (36) was a mixture of compounds in which a chlorine atom is substituted at position "b" or "c".

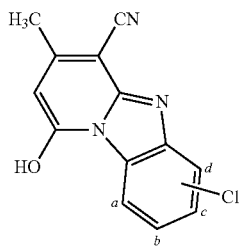
(36)

(Step 3)

After 4.5 parts of the compound represented by the above formula (36) were slowly added into 80 parts of 10% fuming sulfuric acid at 10 to 20° C., the mixture was stirred at the same temperature for 2 hrs. The reaction liquid was added dropwise into 160 parts of ice water over about 10 min, and the reaction was allowed at 65 to 70° C. for 30 min. Thereafter, the deposited solid was separated by filtration to obtain a wet cake. The obtained wet cake was added to 100 parts of water, and the pH was adjusted to 7.5 to 8.0 by adding sodium hydroxide. After 200 parts of methanol were added, impurities were separated by filtration to obtain an aqueous solution containing a compound represented by the following formula (37). The compound represented by the following formula (37) was a mixture of compounds in which a chlorine atom is substituted at position "b", and the sulfo group is substituted at position "a", "c" or "d", or a chlorine atom is substituted at position "c", and the sulfo group is substituted at position "a", "b" or "d".

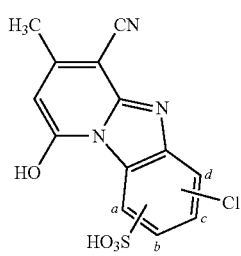
(37)

(Step 4)

The coloring matter of the present invention consisting of 4.5 parts of a sodium salt of a compound represented by the following formula (38) was obtained in a similar manner to Example 1 (Step 9) except that the entirety of the aqueous solution containing the compound represented by the formula (37) obtained in the above Step 3 were used in place of 6.5 parts of the wet cake containing the compound represented by the formula (28) in the Step 9 of Example 1. The obtained coloring matter was a mixed coloring matter consisting of 2 to 6 types of compounds represented by the following formula (38) in which a chlorine atom is substituted at position "b", and the sulfo group is substituted at position "a", "c" or "d", or a chlorine atom is substituted at position "c", and the sulfo group is substituted at position "a", "b" or "d". λmax: 603.5 nm.

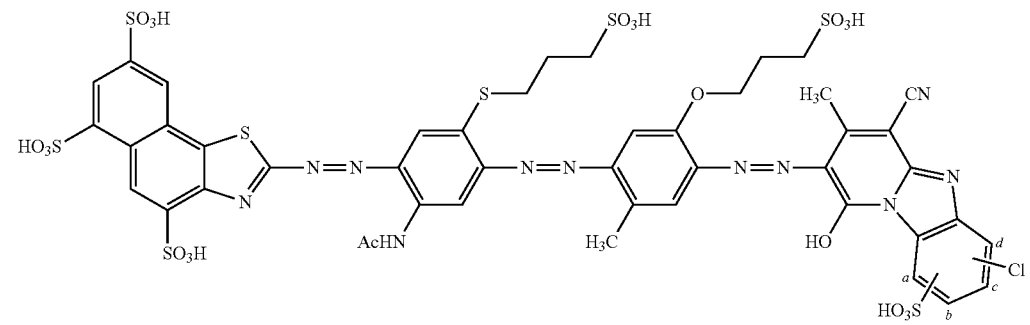
(38)

Example 4

(Step 1)

A mixture of 18.8 parts of 4-chloro-3-nitroanisole, 22.0 parts of sodium 3-mercaptopropane sulfonate, and 60 parts of dimethyl sulfoxide was heated to 60° C. while stirring, and 11.2 parts of sodium carbonate were added thereto. The reaction liquid was heated to 120 to 130° C., and the reaction was allowed at the same temperature for 6 hrs. The reaction liquid was cooled to room temperature, and added into 330 parts of 2-propanol. The deposited solid was separated by filtration and washed with 100 parts of 2-propanol. After the obtained solid was added to 300 parts of water, the pH value was adjusted to 7.0 to 7.5 with 35% hydrochloric acid. Salting-out was carried out by adding sodium chloride, and the deposited solid was separated by filtration to obtain 52.5 parts of a wet cake containing a compound represented by the following formula (39). To 52.5 parts of the obtained wet cake containing the compound represented by the formula (39) were added 170 parts of water, 1.8 parts of activated charcoal and 0.4 parts of anhydrous ferric chloride, and after elevating the temperature of the liquid to 70° C. to 80° C., 15 parts of 80% hydrazine monohydrate were added thereto dropwise over about 30 min. The temperature of the reaction liquid was elevated to 85 to 95° C., and the reaction was allowed for 3 hrs, followed by cooling to room temperature. After the insoluble matter was separated by filtration, acid precipitation was carried out by adding 50% sulfuric acid to the filtrate, and the resulting deposited solid was separated by filtration to obtain 51.6 parts of a wet cake containing a compound represented by the following formula (40).

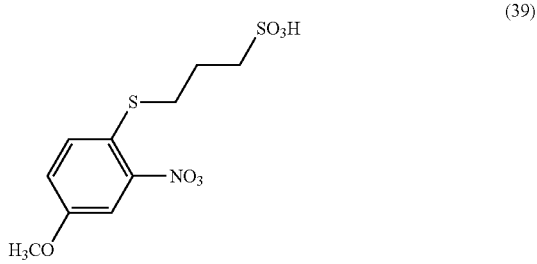
(39)

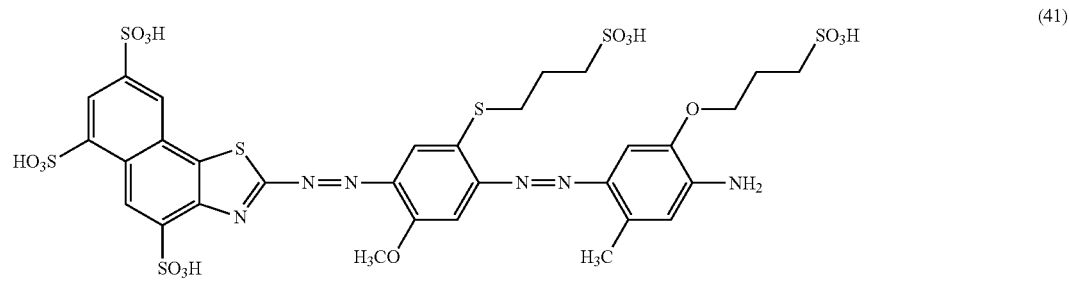
(41)

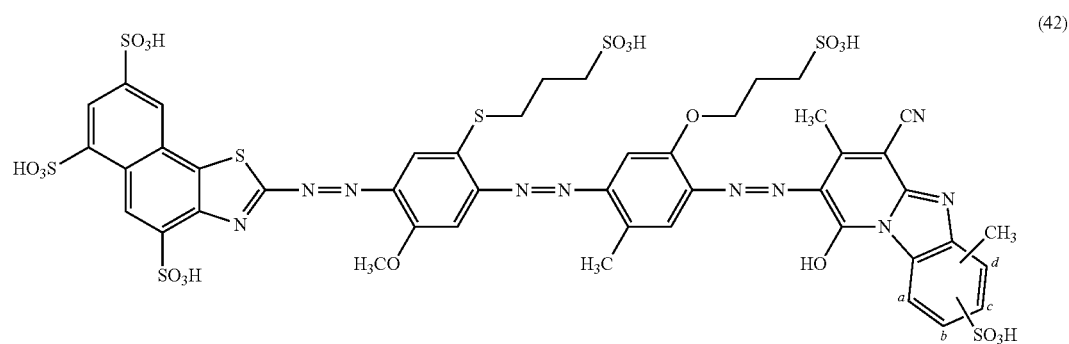
(42)

-continued

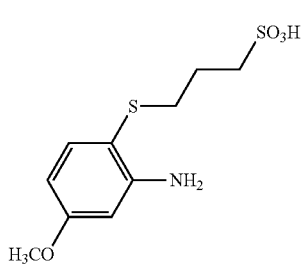
(40)

(Step 2)

In a similar manner to Example 1 (Step 3) and (Step 4) except that 30.3 parts of the wet cake containing the compound represented by the formula (40) obtained in the Step 1 were used in place of 44.0 parts of the wet cake containing the compound represented by the formula (18) in Example 1, (3), 23.4 parts of a wet cake containing a compound represented by the following formula (41) were obtained.

Next, in a similar manner to Example 1 (Step 5) to (Step 9) except that 18.7 parts of the wet cake represented by the formula (41) were used in place of the compound represented by the formula (23) in Example 1 (Step 9), the coloring matter of the present invention consisting of 6.3 parts of a sodium salt of a compound represented by the following formula (42) was obtained. The obtained coloring matter consisted of the compound represented by the following formula (42) in which a methyl group is situated at position "a", and the substitution position of the sulfo group is "c". λmax: 611.5 nm.

Example 5

(Step 1)

In a similar manner to Example 1 (Step 9) except that 18.7 parts of the wet cake containing the compound represented by the above formula (41) were used in place of the wet cake containing the compound represented by the formula (23) in Example 1 (Step 9), and that the compound represented by the above formula (33) was used in place of the compound represented by the formula (28), the coloring matter of the present invention consisting of 6.0 parts of a sodium salt of a compound represented by the following formula (43) was obtained. The obtained coloring matter was a mixed coloring matter consisting of 2 to 6 types of compounds represented by the formula (43) in which a methoxy group is situated at position "b", and the substitution position of the sulfo group is "a", "c", or "d", or a methoxy group is situated at position "c", and the substitution position of the sulfo group is "a", "b" or "d". λmax: 610.0 nm.

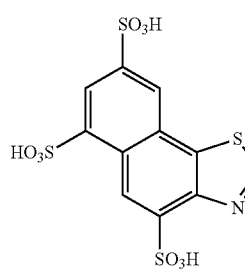
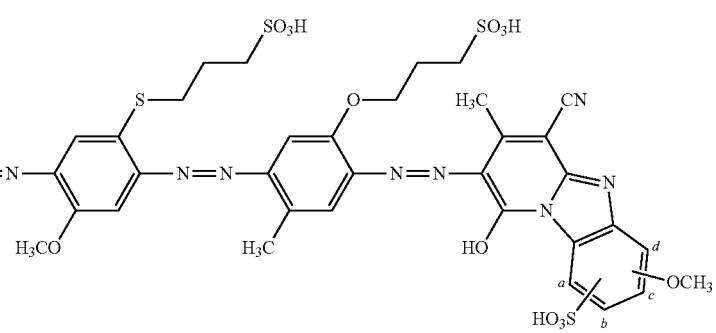

(43)

Example 6

(A) Preparation of Ink

After the ink composition of the present invention was obtained by mixing the coloring matter obtained in Example 1 and each component shown in the following Table 31, contaminants were filtered off using a 0.45-μm membrane filter to obtain an ink for testing. The preparation of this ink is designated as Example 6.

Water employed for preparing the ink was ion exchanged water. In preparing the ink, the pH of the ink was adjusted to 7 to 9 with sodium hydroxide, and the total amount was adjusted to 100 parts by adding ion exchanged water. The aqueous black ink composition of the present invention, and the ink obtained by filtration with a membrane filter, including those prepared in the following Examples 7 to 10, did not result in separation by precipitation during storage, and physical properties were unchanged even after storage for a long period of time.

TABLE 31

| | |
|---|---|
| compound obtained in Example 1 | 3.5 parts |
| glycerin | 5.0 parts |
| urea | 5.0 parts |
| N-methyl-2-pyrrolidone | 4.0 parts |
| isopropyl alcohol | 3.0 parts |
| butylcarbitol | 2.0 parts |

TABLE 31-continued

| | |
|---|---|
| surfactant (trade name: Surfynol 104, manufactured by Nissin Chemical Co., Ltd.) | 0.1 parts |
| water + sodium hydroxide | 77.4 parts |
| total | 100.0 parts |

Examples 7 to 10

Inks for testing were prepared, respectively, in a similar manner to Example 6 except that each compound obtained in Examples 2 to 5 was used in place of the coloring matter obtained in Example 1. The ink prepared using the coloring matter of Example 2 is referred to as Example 7; the ink prepared using the coloring matter of Example 3 is referred to as Example 8; the ink prepared using the coloring matter of Example 4 is referred to as Example 9; and the ink prepared using the coloring matter of Example 5 is referred to as Example 10.

Comparative Example 1

An ink for comparison was prepared in a similar manner to Example 6 except that a coloring matter represented by the following formula (44) disclosed in Examples 2 to 6 of Patent Document 8 was used in place of the coloring matter obtained in Example 1. This preparation of the ink is designated as Comparative Example 1.

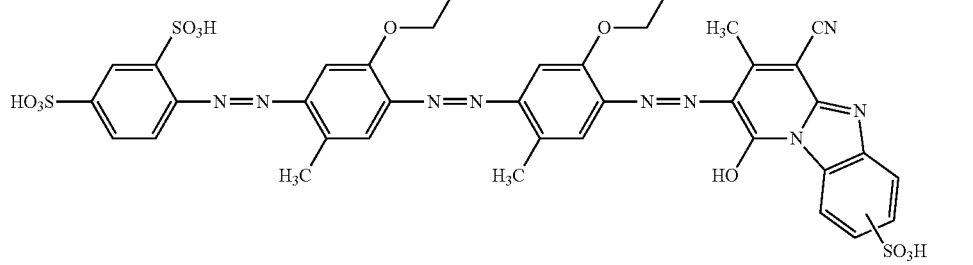

(44)

Comparative Example 2

An ink for comparison was prepared in a similar manner to Example 6 except that a coloring matter represented by the following formula (45) disclosed in Examples 1 and 2 of Patent Document 9 (WO 2005/054374) was used in place of the coloring matter obtained in Example 1. This preparation of the ink is designated as Comparative Example 2.

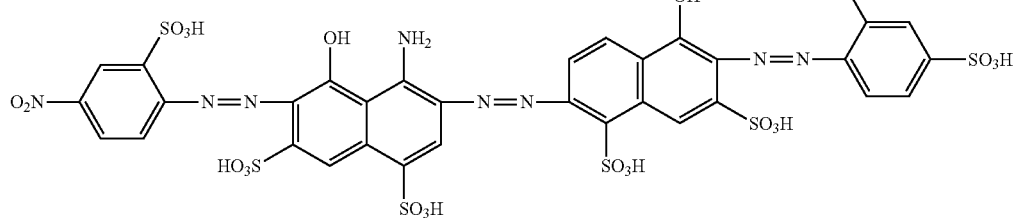

(B) Ink Jet Recording

Using each ink obtained in the above Examples 6 to 10, and Comparative Examples 1 and 2, ink jet recording was carried out by an ink jet printer PIXUS iP4100 (trade name, manufactured by Canon, Inc.) on three kinds of communication sheets (exclusive ink jet paper) of: glossy paper 1 (manufactured by FUJIFILM Corporation, trade name: KASSAI SHASHIN-SHIAGE Pro WPA430PRO); glossy paper 2 (manufactured by Canon, Inc., trade name: Photo Paper Gold Glossy GL-101 A50); and glossy paper 3 (manufactured by Brother Industries, Ltd., Glossy Photo Paper BP61GLA). Upon the recording, an image pattern was produced such that the reflected density was obtained in several-step gradation, whereby a dark black to faint black gradational recorded matter was obtained. Using thus obtained recorded matter as a test piece, the following evaluation tests were performed.

(C) Evaluation of Recorded Image

Alteration of density of the recorded image before and after the test in connection with each of the light resistance or the ozone gas resistance was evaluated using each test piece obtained as described above and dried at room temperature for 24 hrs or longer after the preparation.

The alteration of density of the recorded image was determined with a spectrophotometer, SpectroEye (trade name, manufactured by Gretag Macbeth Co.,) by colorimetry on a gradation portion having a black reflected density (Dk value) of the recorded image falling within the range of 0.9 to 1.0 before the test. In the determination of the black reflected density Dk value, DIN was used as a density standard, and setting of the viewing angle was 2°.

Specific test methods are as in the following.

1) Ozone Gas Resistance Test

The test piece was set in an Ozone Weather Meter (trade name, manufactured by Suga Test Instruments Co., Ltd.), and left to stand under a condition of: an ozone concentration of 10 ppm; a humidity of 60% RH; and a temperature of 24° C. for 24 hrs. With respect to the recorded image on each test piece before and after exposure to ozone, L*, a* and b* according to CIE were measured, and the color difference ΔE was calculated by the following formula. Upon measurement of L*, a* and b*, D65 was used as a light source, with the setting of the viewing angle of 2°. ΔL*, Δa* and Δb* in the following formula mean, respectively, the differences between values of each L*, a* and b* before and after the exposure, respectively.

$$\Delta E = (\Delta L^{*2} + \Delta a^{*2} + \Delta b^{*2})^{1/2}$$

Evaluation was made according to the following criteria to give test results. A smaller ΔE indicates a superior result. The evaluation results are shown in Table 32.

A: ΔE being less than 15
B: ΔE being no less than 15 and less than 25
C: ΔE being no less than 25

2) Light Resistance Test

Each test piece was set in a Low-Temperature Cycle Xenon Weather Meter XL75 (trade name, manufactured by Suga Test Instruments Co., Ltd.), and irradiation was carried out under a condition of: an irradiance of 100,000 Lux; a humidity of 60% RH; and a temperature of 24° C. for 168 hrs. With respect to the recorded image on each test piece before and after exposure to xenon light, L*, a* and b* according to CIE were measured, and the color difference ΔE was calculated by the following formula. Upon measurement of L*, a* and b*, D65 was used as a light source, with the setting of the viewing angle of 2°. ΔL*, Δa* and Δb* in the following formula mean, respectively, the differences between values of each L*, a* and b* before and after the exposure, respectively.

$$\Delta E = (\Delta L^{*2} + \Delta a^{*2} + \Delta b^{*2})^{1/2}$$

Evaluation was made according to the following criteria to give test results. A smaller ΔE indicates a superior result. The evaluation results are shown in Table 33 below.

A: ΔE being less than 15
B: ΔE being no less than 15 and less than 25
C: ΔE being no less than 25

3) Evaluation of Color Density

A reflected density Dk value as black was measured using the aforementioned colorimetric system on a part where printed with the highest density. The value was evaluated according to the following criteria. The evaluation results are shown in Table 34. A greater Dk value is superior since a higher print density is indicated.

A: Dk value being no less than 2.1
B: Dk value being less than 2.1 and no less than 1.9
C: Dk value being less than 1.9

4) Evaluation of Chroma Saturation

In order to evaluate the quality of black hue, a chroma saturation C* value was evaluated on a part in a region having a Dk value of 0.9 to 1.0. C* was calculated by the following formula. Upon measurement of a* and b*, D65 was used as a light source, with the setting of the viewing angle of 2°.

$$C^* = (a^{*2} + b^{*2})^{1/2}$$

Evaluation was made according to the following criteria to give test results. The evaluation results are shown in Table 35. A smaller C* value, i.e., approximate to zero, is superior since it approximates to a more achromatic colorless and high-quality black.

A: C* value being less than 40
B: C* value being no less than 40 and less than 50
C: C* value being no less than 50

TABLE 32

Results of ozone gas resistance test

| | Glossy paper 1 | Glossy paper 2 | Glossy paper 3 |
|---|---|---|---|
| Example 6 | A | A | A |
| Example 7 | A | A | A |
| Example 8 | A | A | A |
| Example 9 | A | A | A |
| Example 10 | A | A | A |
| Comparative Example 1 | A | A | A |
| Comparative Example 2 | B | B | B |

TABLE 33

Results of light resistance test

| | Glossy paper 1 | Glossy paper 2 | Glossy paper 3 |
|---|---|---|---|
| Example 6 | A | A | A |
| Example 7 | A | A | A |
| Example 8 | A | A | A |
| Example 9 | A | A | A |
| Example 10 | A | A | A |
| Comparative Example 1 | A | A | A |
| Comparative Example 2 | C | C | C |

TABLE 34

Evaluation results of color density

| | Glossy paper 1 | Glossy paper 2 | Glossy paper 3 |
|---|---|---|---|
| Example 6 | A | A | A |
| Example 7 | A | A | A |
| Example 8 | A | A | A |
| Example 9 | A | A | A |
| Example 10 | A | A | A |
| Comparative Example 1 | C | C | C |
| Comparative Example 2 | A | A | A |

TABLE 35

Evaluation results of chroma saturation

| | Glossy paper 1 | Glossy paper 2 | Glossy paper 3 |
|---|---|---|---|
| Example 6 | A | A | A |
| Example 7 | A | A | A |
| Example 8 | A | A | A |
| Example 9 | A | A | A |
| Example 10 | A | A | A |
| Comparative Example 1 | C | C | C |
| Comparative Example 2 | A | A | A |

As is clear from the results shown in Table 32 to Table 35, the ink of each Example exhibited significantly superior results for all test items on all glossy papers. To the contrary, Comparative Example 1 revealed problems of significantly inferior color density and chroma saturation, suggesting that each Example of the present invention provides printed matter having higher print density, and a black color that is approximate to achromatic, although the light resistance and the ozone gas resistance were favorable being comparative to all Examples.

In addition, Comparative Example 2 revealed a problem of significantly inferior light resistance and ozone gas resistance, suggesting that each Example of the present invention achieved significantly superior ozone gas resistance in comparison with Comparative Example 2, although the color optical density and the chroma saturation were favorable being comparative to each Example.

From the foregoing results, it is proven that the fastness of the printed image obtained with the ink containing the coloring matter of the present invention is significantly superior as compared with that of the image obtained using conventional trisazo compounds in Comparative Examples, and in particular, extremely favorable color optical density, hue, light resistance, and ozone gas resistance as black coloring matters demanded for ink jet printed images are achieved.

Example 11

(Step 1)

A mixture of 17.2 parts of 4-chloro-3-nitrotoluene, 28.0 parts of sodium 3-mercaptopropane sulfonate, and 60 parts of dimethyl sulfoxide was heated to 60° C. while stirring, and 16.5 parts of sodium carbonate were added thereto. The reaction liquid was heated to 120 to 130° C., and the reaction was allowed at the same temperature for 6 hrs. The reaction liquid was cooled to room temperature, and added into 330 parts of 2-propanol. The deposited solid was separated by filtration and washed with 100 parts of 2-propanol. After the obtained solid was added to 200 parts of water, the pH of the liquid was adjusted to 7.0 to 7.5 with 35% hydrochloric acid. Salting-out was carried out by adding sodium chloride, and the deposited solid was separated by filtration to obtain 74.3 parts of a wet cake containing a compound represented by the following formula (46). The entirety of the obtained wet cake containing the compound represented by the formula (46), 1.8 parts of activated charcoal and 0.4 parts of anhydrous ferric chloride were added to 120 parts of water, and after elevating the temperature of the liquid to 70° C. to 80° C., 15 parts of 80% hydrazine monohydrate were added thereto dropwise over about 30 min. The temperature of the reaction liquid was elevated to 85 to 95° C., and the reaction was allowed for 3 hrs, followed by cooling to room temperature. After the insoluble matter was filtered off, acid precipitation was carried out by adding 50% sulfuric acid to the filtrate, and the resulting deposited solid was separated by filtration to obtain 47.9 parts of a wet cake containing a compound represented by the following formula (47).

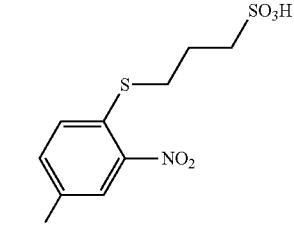

(46)

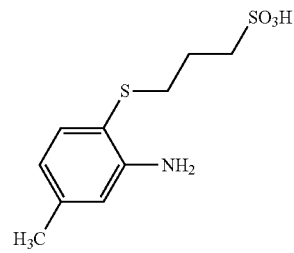

(47)

(Step 2)

In a similar manner to Example 1 (Step 3) and (Step 4) except that 28.2 parts of the wet cake containing the compound represented by the formula (47) obtained in the Step 1 were used in place of 44.0 parts of the wet cake containing the compound represented by the formula (18) in Example 1 (Step 3), 21.7 parts of a wet cake containing a compound represented by the following formula (48) were obtained.

Next, in a similar manner to Example 1 (Step 5) to (Step 9) except that 17.4 parts of the wet cake represented by the formula (48) were used in place of the compound represented by the formula (23) in Example 1 (Step 9), the coloring matter of the present invention consisting of 6.5 parts of a sodium salt of a compound represented by the following formula (49) was obtained. The obtained coloring matter consisted of the compound represented by the following formula (49) in which a methyl group is substituted at position "a", and sulfo group is substituted at position "c". λmax: 587.5 nm.

Example 12

(Step 1)

In a similar manner to Example 1 (Step 9) except that 17.4 parts of the wet cake containing the compound represented by the above formula (48) were used in place of the wet cake containing the compound represented by the formula (23) in Example 1 (Step 9), and that the compound represented by the above formula (33) was used in place of the compound represented by the formula (28), the coloring matter of the present invention consisting of 6.2 parts of a sodium salt of a compound represented by the following formula (50) was obtained. The obtained coloring matter was a mixed coloring matter consisting of 2 to 6 types of compounds represented by the formula (50) in which a methoxy group is substituted at position "b", and the sulfo group is substituted at position "a",

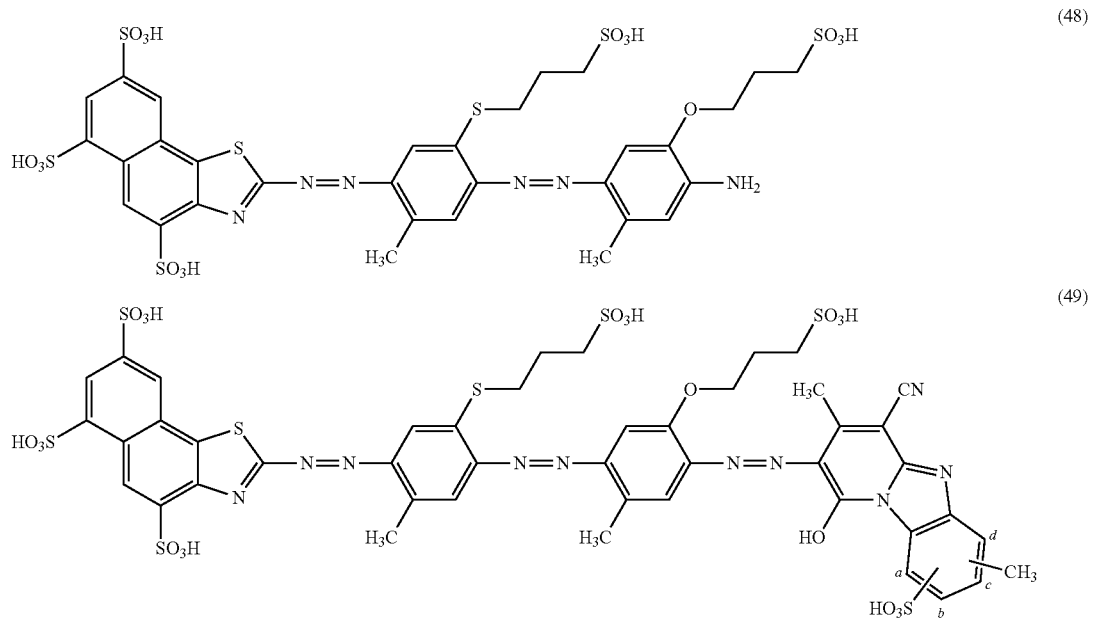

"c" or "d", or a methoxy group is substituted at position "c", and the sulfo group is substituted at position "a", "b" or "d". λmax: 597.0 nm.

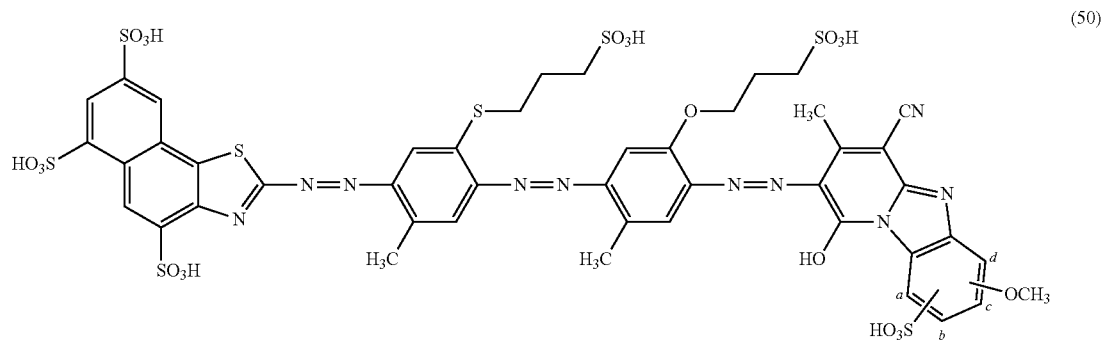

Example 13

(Step 1)

The compound represented by the above formula (32) in an amount of 5.5 parts was dissolved in 29.4 parts of 20% fuming sulfuric acid, and the mixture was heated to 60° C., followed by stirring for 1.5 hrs. After cooling to room temperature, the reaction liquid was added dropwise to 65 parts of ice water, and the solid deposited by adding sodium chloride was separated by filtration. The solid was washed with dilute aqueous hydrochloric acid that dissolves sodium chloride to obtain 10.5 parts of a wet cake containing a compound represented by the following formula (51).

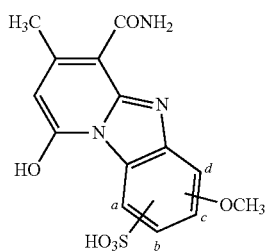

(51)

(Step 2)

In a similar manner to Example 12 (Step 1) except that 6.2 parts of the wet cake containing the compound represented by the formula (51) in the above Step 1 were used in place of 7.2 parts of the wet cake containing the compound represented by the above formula (33) in Example 12 (Step 1), the coloring matter of the present invention consisting of 5.8 parts of a sodium salt of a compound represented by the following formula (52) of the present invention was obtained. The obtained coloring matter was a mixed coloring matter consisting of 2 to 6 types of compounds represented by the formula (52) in which a methoxy group is substituted at position "b", and the sulfo group is substituted at position "a", "c" or "d", or a methoxy group is substituted at position "c", and the sulfo group is substituted at position "a", "b" or "d". λmax: 589.0 nm.

Examples 14 to 16

Inks for testing were prepared, respectively, in a similar manner to Example 6 except that each compound obtained in Examples 11 to 13 was used in place of the coloring matter obtained in Example 1. The ink prepared using the coloring matter of Example 11 is referred to as Example 14; the ink prepared using the coloring matter of Example 12 is referred to as Example 15; and the ink prepared using the coloring matter of Example 13 is referred to as Example 16.

Ink jet recording was carried out under a condition similar to that in the above "(B) Ink Jet Recording" to obtain dark black to faint black gradational recorded matters colored with the ink of Examples 14 to 16, respectively.

Using the gradational recorded matter that was colored with each of the ink of Examples 14 to 16 as a test piece, evaluation of each test piece was made similarly to the aforementioned "(C) Evaluation of Recorded Image", "(1) Ozone Gas Resistance Test", "(3) Evaluation of Color Density", and "(4) Evaluation of Chroma Saturation". The results of each test are shown in Table 36 to Table 38 below. In is to be noted that in each Table, Comparative Example 1 and Comparative Example 2 employed were similarly to those described above.

TABLE 36

Results of ozone gas resistance test

|  | Glossy paper 1 | Glossy paper 2 | Glossy paper 3 |
|---|---|---|---|
| Example 14 | A | A | A |
| Example 15 | A | A | A |
| Example 16 | A | A | A |
| Comparative Example 1 | A | A | A |
| Comparative Example 2 | B | B | B |

TABLE 37

Evaluation results of color density

|  | Glossy paper 1 | Glossy paper 2 | Glossy paper 3 |
|---|---|---|---|
| Example 14 | A | A | A |
| Example 15 | A | A | A |
| Example 16 | A | A | A |
| Comparative Example 1 | C | C | C |
| Comparative Example 2 | A | A | A |

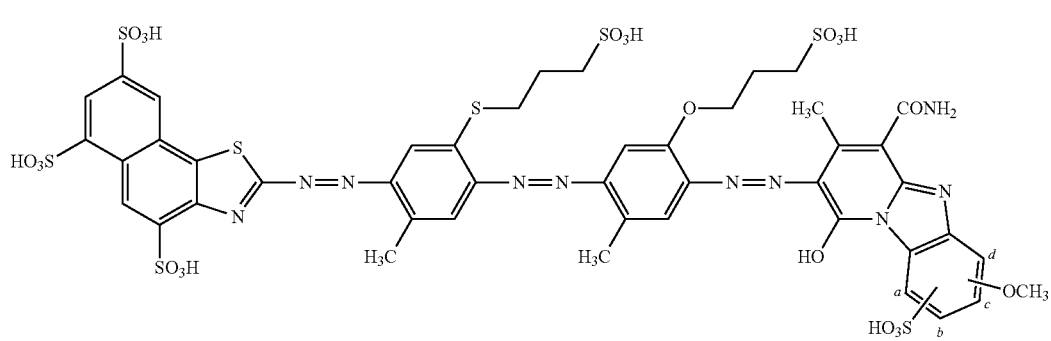

(52)

TABLE 38

| | Glossy paper 1 | Glossy paper 2 | Glossy paper 3 |
|---|---|---|---|
| Example 14 | A | A | A |
| Example 15 | A | A | A |
| Example 16 | A | A | A |
| Comparative Example 1 | C | C | C |
| Comparative Example 2 | A | A | A |

As is clear from the results shown in Table 36 to Table 38, the inks of Examples 14 to 16 were significantly superior on all glossy papers as compared with those of images obtained using the conventional trisazo compounds used in Comparative Examples, and in particular, it is revealed that the inks are extremely superior in color optical density, hue, and ozone gas resistance as a black coloring matter demanded for ink jet print images.

INDUSTRIAL APPLICABILITY

The coloring matter of the present invention and the ink composition of the present invention containing the same are suitably used as a black ink liquid for ink jet recording and for various types of recording such as for use in writing tools, and particularly for ink jet recording.

The invention claimed is:
1. A coloring matter consisting of at least one trisazo compound represented by the following formula (1) or a tautomer of the same, or a salt thereof

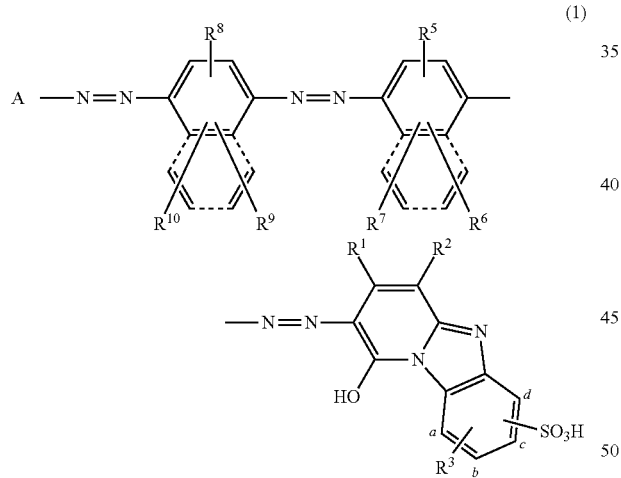

(1)

wherein,
$R^1$ represents a carboxy group; an unsubstituted C1-C4 alkyl group; a C1-C4 alkyl group substituted with a carboxy group; an unsubstituted phenyl group; or a phenyl group substituted with a sulfo group,
$R^2$ represents a cyano group; a carbamoyl group; or a carboxy group,
$R^3$ represents a chlorine atom; an unsubstituted C1-C6 alkyl group; an unsubstituted C1-C6 alkoxy group; or an unsubstituted C1-C4 alkylcarbonylamino group,
the ring having substitution with $R^5$ to $R^7$ is a benzene ring provided that the ring represented by the dotted line is not present; or a naphthalene ring provided that the ring represented by the dotted line is present,
$R^5$ to $R^7$ each independently represent a hydrogen atom; a chlorine atom; a hydroxy group; a sulfo group; a carboxy group; a sulfamoyl group; a carbamoyl group; an unsubstituted C1-C4 alkyl group; an unsubstituted C1-C4 alkoxy group; a C1-C4 alkoxy group substituted with a hydroxy group, an unsubstituted C1-C4 alkoxy group, a hydroxy C1-C4 alkoxy group, a sulfo group or a carboxy group; an unsubstituted mono- or di-C1-C4 alkylamino group; a mono- or di-C1-C4 alkylamino group substituted with a hydroxy group, a sulfo group or a carboxy group; an unsubstituted C1-C4 alkylcarbonylamino group; a C1-C4 alkylcarbonylamino group substituted with a hydroxy group or a carboxy group; an unsubstituted N'-C1-C4 alkylureide group; an N'-C1-C4 alkylureide group substituted with a hydroxy group, a sulfo group or a carboxy group; an unsubstituted phenylamino group; a phenylamino group having a benzene ring substituted with a chlorine atom, an unsubstituted C1-C4 alkyl group, a nitro group, a sulfo group or a carboxy group; an unsubstituted benzoylamino group; a benzoylamino group having a benzene ring substituted with a chlorine atom, an unsubstituted C1-C4 alkyl group, a nitro group, a sulfo group or a carboxy group; an unsubstituted phenylsulfonylamino group; or a phenylsulfonylamino group having a benzene ring substituted with a chlorine atom, an unsubstituted C1-C4 alkyl group, a nitro group, a sulfo group or a carboxy group,
the ring having substitution with $R^8$ to $R^{10}$ is a benzene ring provided that the ring represented by the dotted line is not present; or a naphthalene ring provided that the ring represented by the dotted line is present,
$R^8$ to $R^{10}$ each independently represent a hydrogen atom; a chlorine atom; a hydroxy group; a sulfo group; a carboxy group; a sulfamoyl group; a carbamoyl group; an unsubstituted C1-C4 alkyl group; an unsubstituted C1-C4 alkoxy group; a C1-C4 alkoxy group substituted with a hydroxy group, an unsubstituted C1-C4 alkoxy group, a hydroxy C1-C4 alkoxy group, a sulfo group or a carboxy group; a C1-C4 alkylthio group substituted with a hydroxy group, a sulfo group or a carboxy group; an unsubstituted mono- or di-C1-C4 alkylamino group; a mono- or di-C1-C4 alkylamino group substituted with a hydroxy group, a sulfo group or a carboxy group; an unsubstituted C1-C4 alkylcarbonylamino group; a C1-C4 alkylcarbonylamino group substituted with a hydroxy group or a carboxy group; an unsubstituted N'-C1-C4 alkylureide group; an N'-C1-C4 alkylureide group substituted with a hydroxy group, a sulfo group or a carboxy group; an unsubstituted phenylamino group; a phenylamino group having a benzene ring substituted with a chlorine atom, an unsubstituted C1-C4 alkyl group, a nitro group, a sulfo group or a carboxy group; an unsubstituted benzoylamino group; a benzoylamino group having a benzene ring substituted with a chlorine atom, an unsubstituted C1-C4 alkyl group, a nitro group, a sulfo group or a carboxy group; an unsubstituted phenylsulfonylamino group; or a phenylsulfonylamino group having a benzene ring substituted with a chlorine atom, an unsubstituted C1-C4 alkyl group, a nitro group, a sulfo group or a carboxy group, the group A is an unsubstituted 2-naphthothiazolyl group; or a 2-naphthothiazolyl group having a substituent selected from the group consisting of a chlorine atom; a sulfo group; a nitro group; a hydroxy group; a sulfamoyl group; an unsubstituted C1-C4 alkyl group; an unsubstituted C1-C4 alkoxy group; a C1-C4 alkoxy group substituted with a hydroxy group, an unsubstituted C1-C4 alkoxy group, a sulfo group or a carboxy group; an unsubstituted C1-C4 alkylsulfonyl group; a C1-C4 alkylsulfonyl group substituted with a hydroxy group, a sulfo group or a carboxy group; an unsubstituted phenylsulfonyl group; and a phenylsulfonyl group having a benzene ring substituted with a chlorine atom, an unsubstituted C1-C4 alkyl group, a nitro group, a sulfo group or a carboxy group, a to d each represent the substitution position of $R^3$ and the sulfo group the substitution position of which is not specified.

2. The coloring matter according to claim 1, wherein the trisazo compound represented by the above formula (1) is a trisazo compound represented by the following formula (2):

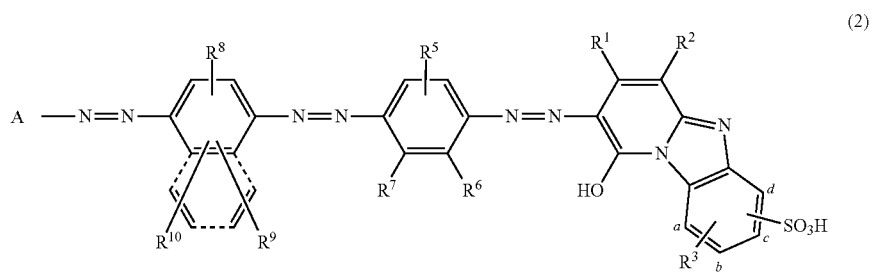

(2)

wherein, the group A, $R^1$ to $R^3$, $R^5$ to $R^{10}$, and the ring having substitution with $R^8$ to $R^{10}$ have the same meanings as those in the formula (1) including the ring represented by the dotted line.

3. The coloring matter according to claim 1, wherein the trisazo compound represented by the above formula (1) is a trisazo compound represented by the following formula (3):

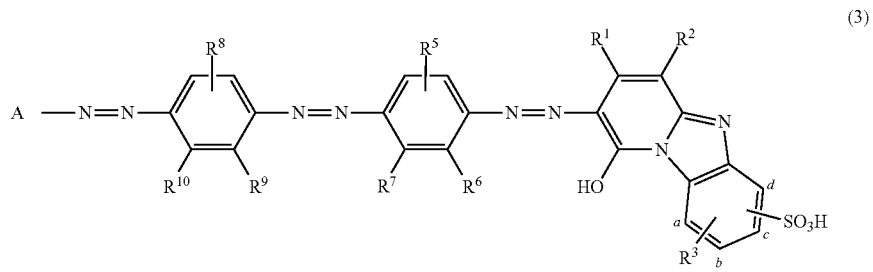

(3)

wherein, the group A, $R^1$ to $R^3$, and $R^5$ to $R^{10}$ have the same meanings as those in the formula (1).

4. The coloring matter according to claim 1, wherein the trisazo compound represented by the above formula (1) is a trisazo compound represented by the following formula (4):

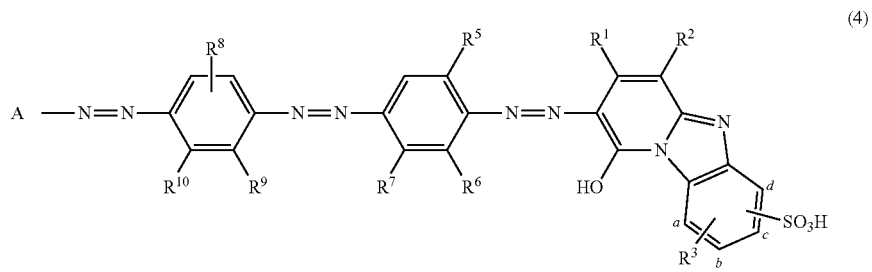

(4)

wherein, the group A, $R^1$ to $R^3$, and $R^5$ to $R^{10}$ have the same meanings as those in the formula (1).

5. The coloring matter according to claim 1, wherein the trisazo compound represented by the above formula (1) is a trisazo compound represented by the following formula (5):

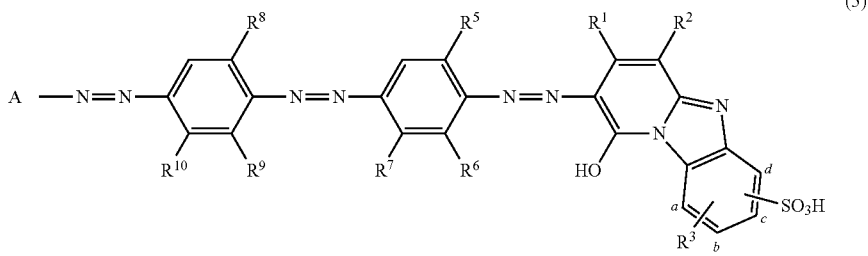

(5)

wherein, the group A, $R^1$ to $R^3$, and $R^5$ to $R^{10}$ have the same meanings as those in the formula (1).

6. The coloring matter according to claim 1, wherein the group A is represented by the following formula (6):

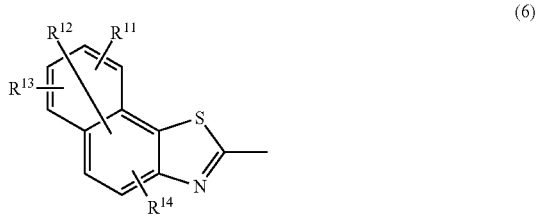

(6)

wherein, $R^{11}$ to $R^{14}$ each independently represents a group selected from the group consisting of a hydrogen atom; chlorine atom; a sulfo group; a nitro group; a hydroxy group; a sulfamoyl group; an unsubstituted C1-C4 alkoxy group; a C1-C4 alkoxy group substituted with a hydroxy group, an unsubstituted C1-C4 alkoxy group, a sulfo group or a carboxy group; an unsubstituted C1-C4 alkylsulfonyl group; and a C1-C4 alkylsulfonyl group substituted with a hydroxy group, a sulfo group or a carboxy group.

7. The coloring matter according to claim 1, wherein in the above formula (1),
$R^1$ represents an unsubstituted C1-C4 alkyl group;
$R^2$ represents a cyano group;
$R^3$ represents a chlorine atom, an unsubstituted C1-C6 alkyl group, or an unsubstituted C1-C6 alkoxy group;
the ring having substitution with $R^5$ to $R^7$ is a benzene ring without being coupled to the ring represented by the dotted line,
$R^5$ represents a C1-C4 alkoxy group substituted with a sulfo group;
$R^6$ represents a hydrogen atom;
$R^7$ represents an unsubstituted C1-C4 alkyl group;
the ring having substitution with $R^8$ to $R^{10}$ is a benzene ring without being coupled to the ring represented by the dotted line,
$R^8$ represents a C1-C4 alkylthio group substituted with a sulfo group;
$R^9$ represents a hydrogen atom;
$R^{10}$ represents a chlorine atom, an unsubstituted C1-C4 alkoxy group, or an unsubstituted C1-C4 alkylcarbonylamino group; and the group A is a 2-naphthothiazolyl group having two or three sulfo groups; or two sulfo groups and one unsubstituted C1-C4 alkoxy group.

8. The coloring matter according to claim 2, wherein in the above formula (2),

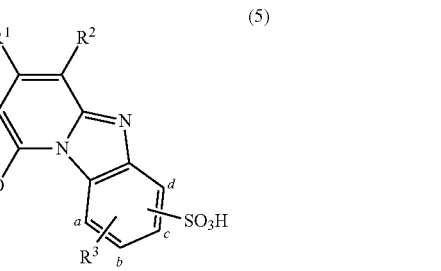

$R^1$ represents an unsubstituted C1-C4 alkyl group;
$R^2$ represents a cyano group;
$R^3$ represents a chlorine atom, an unsubstituted C1-C6 alkyl group, or an unsubstituted C1-C6 alkoxy group;
$R^5$ represents a C1-C4 alkoxy group substituted with a sulfo group;
$R^6$ represents a hydrogen atom;
$R^7$ represents an unsubstituted C1-C4 alkyl group;
the ring having substitution with $R^8$ to $R^{10}$ is a benzene ring without being coupled to the ring represented by the dotted line,
$R^8$ represents a C1-C4 alkylthio group substituted with a sulfo group;
$R^9$ represents a hydrogen atom;
$R^{10}$ represents a chlorine atom, an unsubstituted C1-C4 alkoxy group, or an unsubstituted C1-C4 alkylcarbonylamino group; and
the group A is a 2-naphthothiazolyl group having two or three sulfo groups; or two sulfo groups and one unsubstituted C1-C4 alkoxy group.

9. The coloring matter according to claim 3, wherein $R^1$ represents an unsubstituted C1-C4 alkyl group;
$R^2$ represents a cyano group;
$R^3$ represents a chlorine atom, an unsubstituted C1-C6 alkyl group, or an unsubstituted C1-C6 alkoxy group;
$R^5$ represents a C1-C4 alkoxy group substituted with a sulfo group;
$R^6$ represents a hydrogen atom;
$R^7$ represents an unsubstituted C1-C4 alkyl group;
$R^8$ represents a C1-C4 alkylthio group substituted with a sulfo group;
$R^9$ represents a hydrogen atom;
$R^{10}$ represents a chlorine atom, an unsubstituted C1-C4 alkoxy group, or an unsubstituted C1-C4 alkylcarbonylamino group; and
the group A is a 2-naphthothiazolyl group having two or three sulfo groups; or two sulfo groups and one unsubstituted C1-C4 alkoxy group.

10. The coloring matter according to claim 1, wherein the group A is represented by the following formula (101):

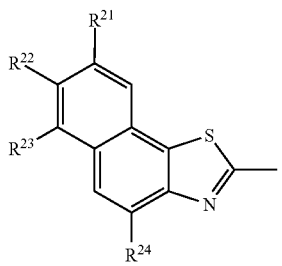

(101)

wherein, $R^{24}$ represents a sulfo group, and any one of $R^{21}$ to $R^{23}$ represents a sulfo group and the remaining two represent a hydrogen atom; $R^{21}$, $R^{23}$ and $R^{24}$ represent a sulfo group, and $R^{22}$ represents a hydrogen atom; or $R^{21}$ and $R^{24}$ represent a sulfo group, $R^{22}$ represents a hydrogen atom, and $R^{23}$ represents an unsubstituted C1-C4 alkoxy group.

11. The coloring matter according to claim 1, wherein in the above formula (1), $R^1$ represents an unsubstituted C1-C4 alkyl group;
$R^2$ represents a cyano group or a carbamoyl group,
$R^3$ represents an unsubstituted C1-C6 alkyl group, or an unsubstituted C1-C6 alkoxy group,
the ring having substitution with $R^5$ to $R^7$ is a benzene ring without being coupled to the ring represented by the dotted line,
$R^5$ represents a C1-C4 alkoxy group substituted with a sulfo group;
$R^6$ represents a hydrogen atom;
$R^7$ represents an unsubstituted C1-C4 alkyl group;
the ring having substitution with $R^8$ to $R^{10}$ is a benzene ring without being coupled to the ring represented by the dotted line,
$R^8$ represents a C1-C4 alkylthio group substituted with a sulfo group;
$R^9$ represents a hydrogen atom;
$R^{10}$ represents an unsubstituted C1-C4 alkyl group; and
the group A is a 2-naphthothiazolyl group having two or three sulfo groups; or two sulfo groups and one unsubstituted C1-C4 alkoxy group.

12. The coloring matter according to claim 2, wherein in the above formula (2), $R^1$ represents an unsubstituted C1-C4 alkyl group;
$R^2$ represents a cyano group or a carbamoyl group,
$R^3$ represents an unsubstituted C1-C6 alkyl group, or an unsubstituted C1-C6 alkoxy group,
the ring having substitution with $R^5$ to $R^7$ is a benzene ring without being coupled to the ring represented by the dotted line,
$R^5$ represents a C1-C4 alkoxy group substituted with a sulfo group;
$R^6$ represents a hydrogen atom;
$R^7$ represents an unsubstituted C1-C4 alkyl group;
the ring having substitution with $R^8$ to $R^{10}$ is a benzene ring without being coupled to the ring represented by the dotted line,
$R^8$ represents a C1-C4 alkylthio group substituted with a sulfo group;
$R^9$ represents a hydrogen atom;
$R^{10}$ represents an unsubstituted C1-C4 alkyl group; and
the group A is a 2-naphthothiazolyl group having two or three sulfo groups; or two sulfo groups and one unsubstituted C1-C4 alkoxy group.

13. The coloring matter according to claim 3, wherein $R^1$ represents an unsubstituted C1-C4 alkyl group;

$R^2$ represents a cyano group or a carbamoyl group,
$R^3$ represents an unsubstituted C1-C6 alkyl group, or an unsubstituted C1-C6 alkoxy group,
$R^5$ represents a C1-C4 alkoxy group substituted with a sulfo group;
$R^6$ represents a hydrogen atom;
$R^7$ represents an unsubstituted C1-C4 alkyl group;
$R^8$ represents a C1-C4 alkylthio group substituted with a sulfo group;
$R^9$ represents a hydrogen atom;
$R^{10}$ represents an unsubstituted C1-C4 alkyl group; and
the group A is a 2-naphthothiazolyl group having two or three sulfo groups; or two sulfo groups and one unsubstituted C1-C4 alkoxy group.

14. An ink composition comprising the coloring matter according to claim 1.

15. An ink jet recording method comprising recording using the ink composition according to claim 14 by discharging ink droplets of the ink in response to recording signals to attach on a record-receiving material.

16. The ink jet recording method according to claim 15, wherein the record-receiving material is a communication sheet.

17. The ink jet recording method according to claim 16, wherein the communication sheet is a sheet having an ink-receiving layer containing a porous white inorganic substance.

18. An ink jet printer equipped with a vessel containing the ink composition according to claim 14.

19. A colored body which is colored with the coloring matter according to claim 1.

20. A colored body which is colored with the ink composition according to claim 14.

* * * * *

UNITED STATES PATENT AND TRADEMARK OFFICE
CERTIFICATE OF CORRECTION

| | |
|---|---|
| PATENT NO. | : 8,556,406 B2 |
| APPLICATION NO. | : 13/377400 |
| DATED | : October 15, 2013 |
| INVENTOR(S) | : Takashi Yoshimoto et al. |

It is certified that error appears in the above-identified patent and that said Letters Patent is hereby corrected as shown below:

Title Page (Item 57) Abstract, Line 5, Change "fastness" to --light fastness--.

In the Specification

In Column 7, Line 61, Change "$R^2$" to --$R^7$--.

In Column 10, Line 2, Change "the" to --to the--.

In Column 10, Line 20, Change "the" to --to the--.

In Column 15, Line 8, Change "C1-C4alkylcarbonylamino" to --C1-C4 alkylcarbonylamino--.

In Column 27, Line 36-44, Change " 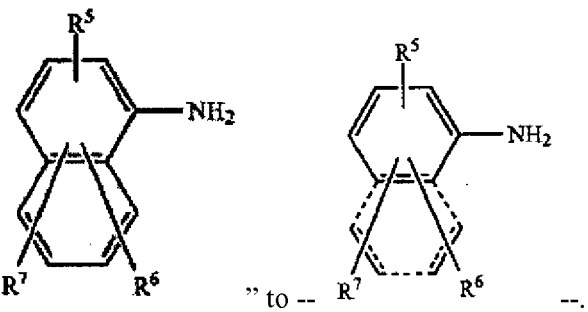 " to -- --.

In Column 28, Lines 3-12, Change " 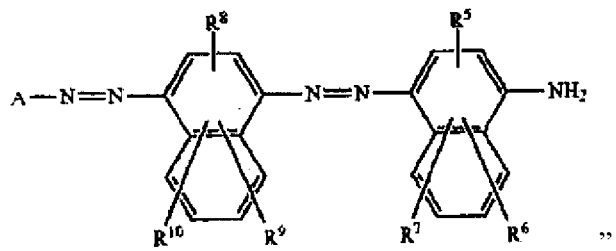 "

Signed and Sealed this
Twentieth Day of May, 2014

Michelle K. Lee
*Deputy Director of the United States Patent and Trademark Office* to --
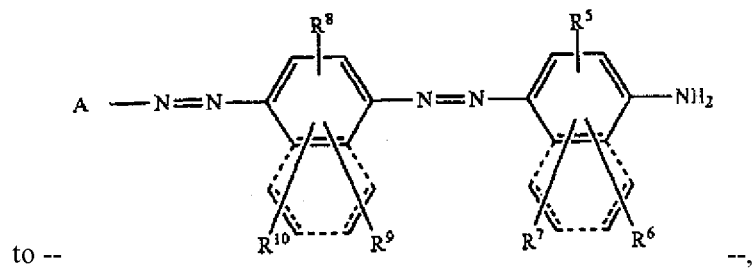
--,
In Column 127, Line 32, Change "tertially" to --tertiary--.
In Column 128, Line 8, Change "triazine" to --thiazine--. (Second occurrence)